US009884475B2

(12) United States Patent
Nally et al.

(10) Patent No.: US 9,884,475 B2
(45) Date of Patent: Feb. 6, 2018

(54) MACHINE FOR OPTICAL BONDING, SYSTEM AND METHOD OF USE THEREOF

(75) Inventors: Andrew John Nally, Greenfield, NY (US); Jonathan Neal Urquhart, Saratoga Springs, NY (US); Jeffrey James VanNorden, Clifton Park, NY (US); William Edward Berkheiser, III, Albany, NY (US)

(73) Assignee: PRECISION VALVE & AUTOMATION, INC., Cohoes, NY (US)

( * ) Notice: Subject to any disclaimer, the term of this patent is extended or adjusted under 35 U.S.C. 154(b) by 200 days.

(21) Appl. No.: 13/487,448

(22) Filed: Jun. 4, 2012

(65) Prior Publication Data

US 2012/0234459 A1    Sep. 20, 2012

Related U.S. Application Data

(63) Continuation-in-part of application No. 13/009,385, filed on Jan. 19, 2011.

(51) Int. Cl.
*B29C 65/52*    (2006.01)
*B32B 37/14*    (2006.01)
(Continued)

(52) U.S. Cl.
CPC ........ *B32B 37/14* (2013.01); *B32B 17/10807* (2013.01); *B32B 37/12* (2013.01);
(Continued)

(58) Field of Classification Search
USPC ...... 156/379.6, 99, 102, 108, 356, 556, 571, 156/572, 578
See application file for complete search history.

(56) References Cited

U.S. PATENT DOCUMENTS 4,215,802 A * 8/1980 Ornsteen ........... B05C 17/00543
222/146.2
4,406,247 A * 9/1983 Baughman et al. .......... 118/684
(Continued)

FOREIGN PATENT DOCUMENTS

JP    2002126965        5/2002
JP    2004314004 A *   11/2004
WO   2008126893       10/2008

OTHER PUBLICATIONS

JP 2004/314004 English abstract, Nov. 2004.*
(Continued)

*Primary Examiner* — Michael N Orlando
*Assistant Examiner* — Elizabeth Bradford
(74) *Attorney, Agent, or Firm* — Schmeiser, Olsen & Watts, LLP

(57) ABSTRACT

An adhesive application valve comprising an applicator, a Z-axis actuator operably connected to the applicator, wherein the Z-axis actuator and the rotation device are each capable of moving independently of each other to position the applicator in a position to apply an amount of adhesive to a top substrate prior to bonding with a bottom substrate is provided. Furthermore, a machine comprising an end effector, and an adhesive application valve configured to apply an amount of adhesive onto the top substrate, the end effector configured to place the top substrate into a position of engagement with the adhesive application valve, and place the top substrate onto the bottom substrate to facilitate initial contact between the adhesive applied to the top substrate and a fill material applied to the bottom substrate is also provided. A method of optical bonding is further provided.

18 Claims, 41 Drawing Sheets

(51) Int. Cl.
  *B32B 17/10* (2006.01)
  *B32B 37/12* (2006.01)
  *B32B 38/18* (2006.01)
  *B05C 5/02* (2006.01)

(52) U.S. Cl.
  CPC ............ *B32B 38/18* (2013.01); *B05C 5/0279* (2013.01); *B32B 2551/00* (2013.01); *Y10T 156/10* (2015.01); *Y10T 156/17* (2015.01)

(56) References Cited

U.S. PATENT DOCUMENTS

| | | |
|---|---|---|
| 5,827,394 A | 10/1998 | Lu |
| 5,852,484 A | 12/1998 | Inoue et al. |
| 5,854,664 A | 12/1998 | Inoue et al. |
| 5,948,194 A * | 9/1999 | Hill et al. ................ 156/108 |
| 5,978,065 A | 11/1999 | Kawasumi et al. |
| 6,531,329 B2 | 3/2003 | Asakara |
| 7,038,758 B2 | 5/2006 | Suzuki |
| 7,295,279 B2 | 11/2007 | Byun et al. |
| 7,349,059 B2 | 3/2008 | Jiang |
| 7,450,213 B2 | 11/2008 | Kim et al. |
| 7,710,534 B2 | 5/2010 | Byun et al. |
| 8,855,818 B2 | 10/2014 | Hashimoto |
| 2003/0011205 A1 | 1/2003 | Mori et al. |
| 2006/0043747 A1 * | 3/2006 | Kniss ............... B25J 13/086 294/65 |
| 2006/0216137 A1 | 9/2006 | Sakata et al. |
| 2008/0213077 A1 | 9/2008 | Tanaka et al. |
| 2008/0241508 A1 | 10/2008 | Kuwabara et al. |
| 2009/0168006 A1 | 7/2009 | Chen et al. |
| 2009/0218034 A1 | 9/2009 | Kawabe |
| 2010/0098839 A1 | 4/2010 | Toyoda et al. |
| 2010/0197187 A1 | 8/2010 | Naraba et al. |
| 2011/0061406 A1 * | 3/2011 | Kleber ............... B21D 26/055 62/64 |
| 2011/0155318 A1 | 6/2011 | Shibata et al. |
| 2012/0180935 A1 | 7/2012 | VanNorden et al. |

OTHER PUBLICATIONS

JP 2004-314004 English machine translation, Nov. 2004.*
Office Action (dated Jul. 19, 2012) for U.S. Appl. No. 13/009,385, filed Jan. 29, 2011.
Office Action (dated Jan. 16, 2013) for U.S. Appl. No. 13/009,385, filed Jan. 29, 2011.
Office Action (dated Apr. 10, 2015) for U.S. Appl. No. 13/845,978, filed Mar. 18, 2013.
Final Office Action (dated Dec. 22, 2015) for U.S. Appl. No. 13/845,978, filed Mar. 18, 2013.

* cited by examiner

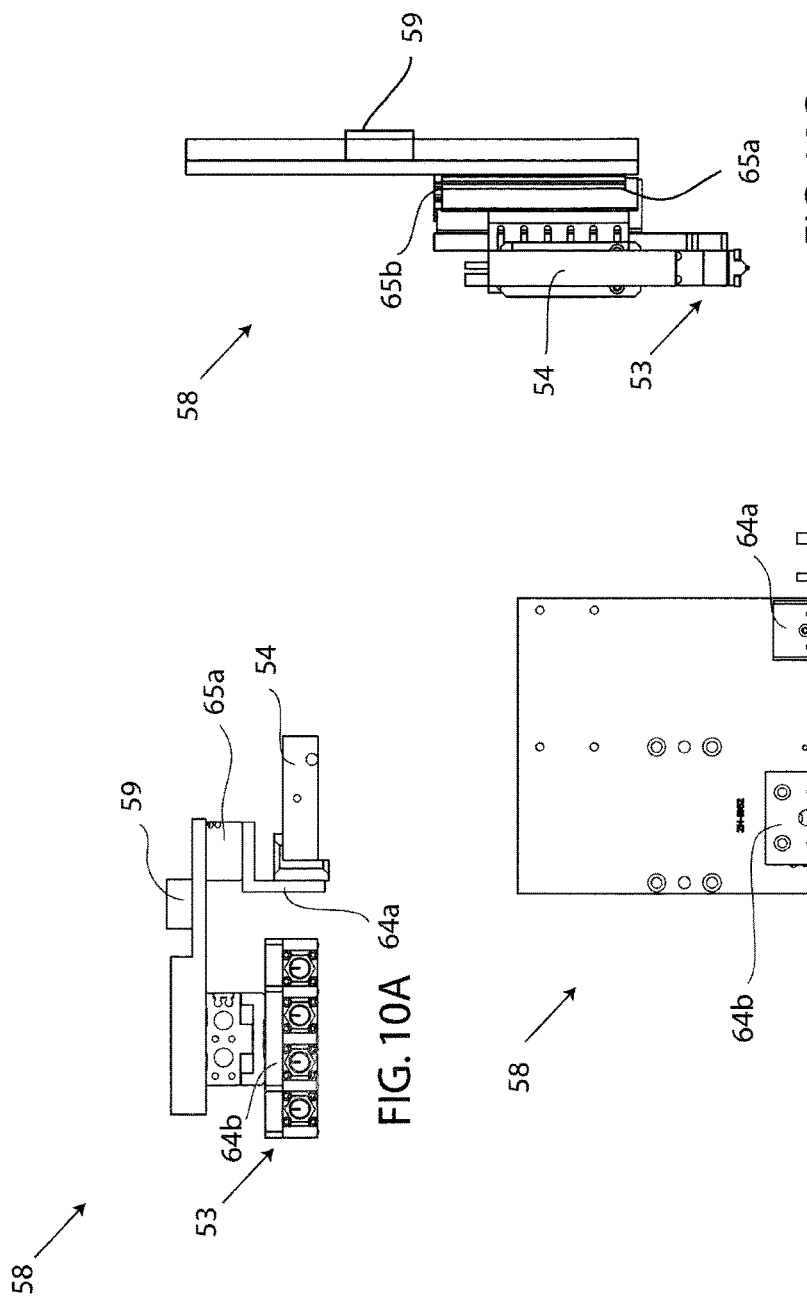
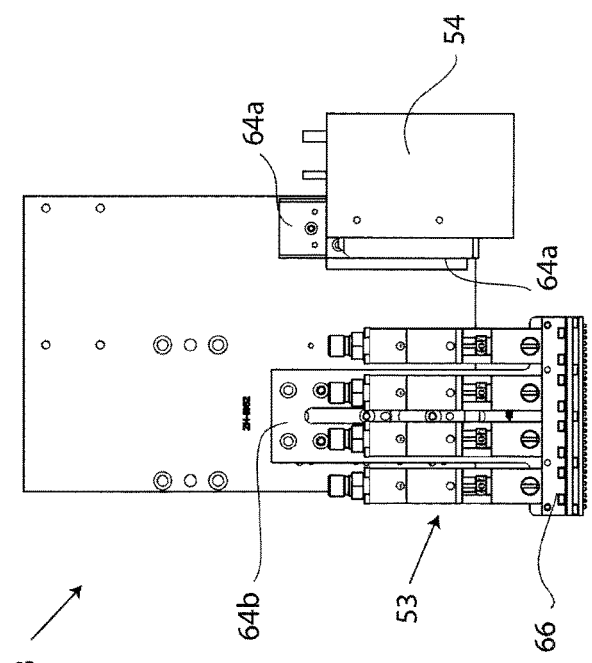

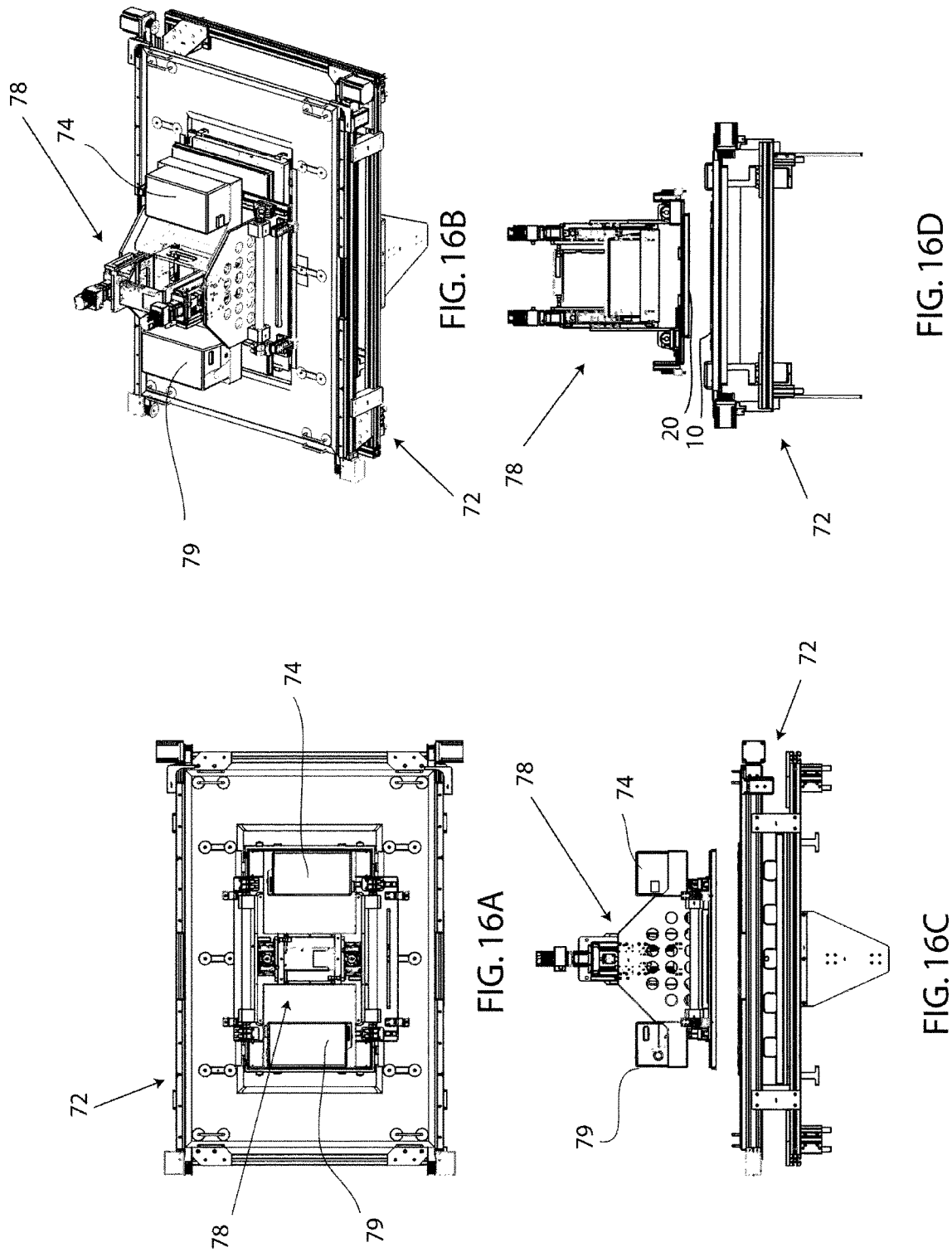

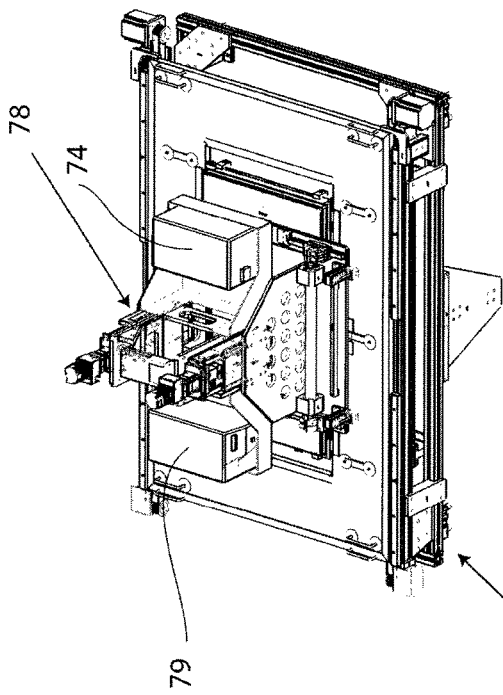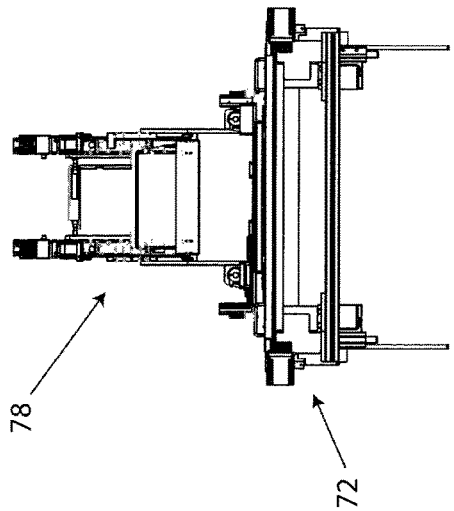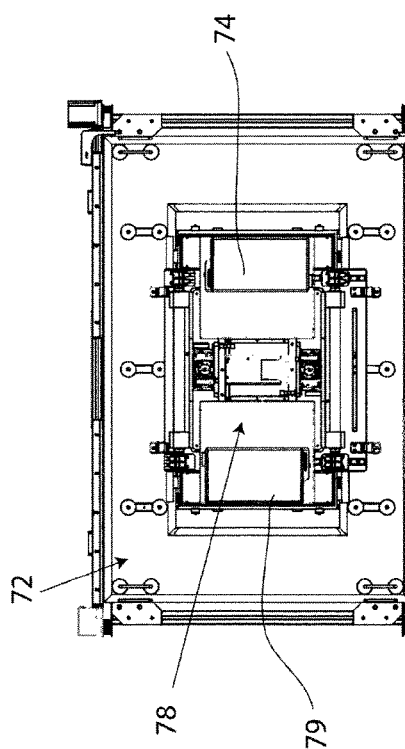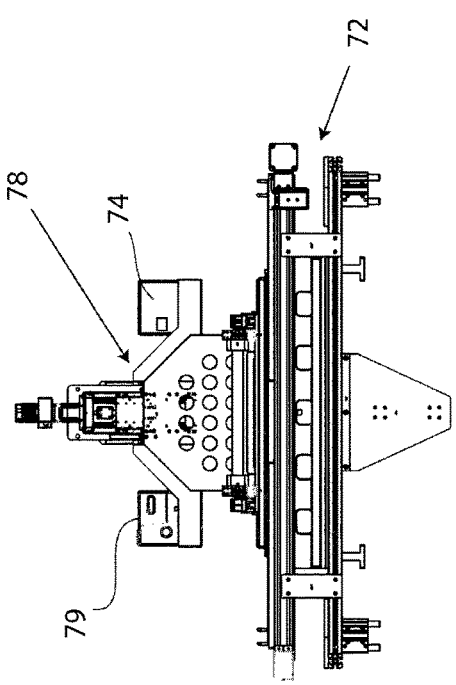

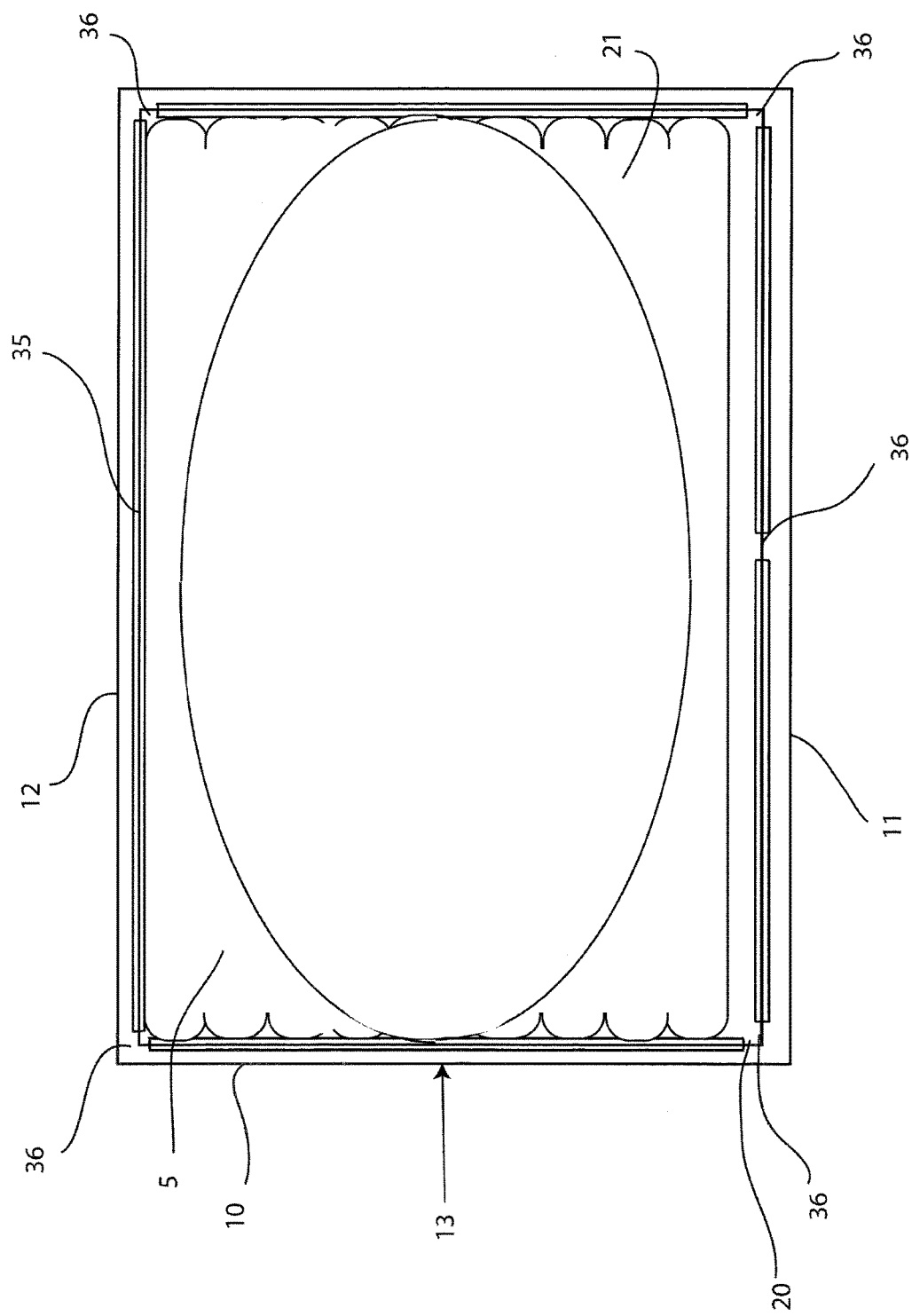

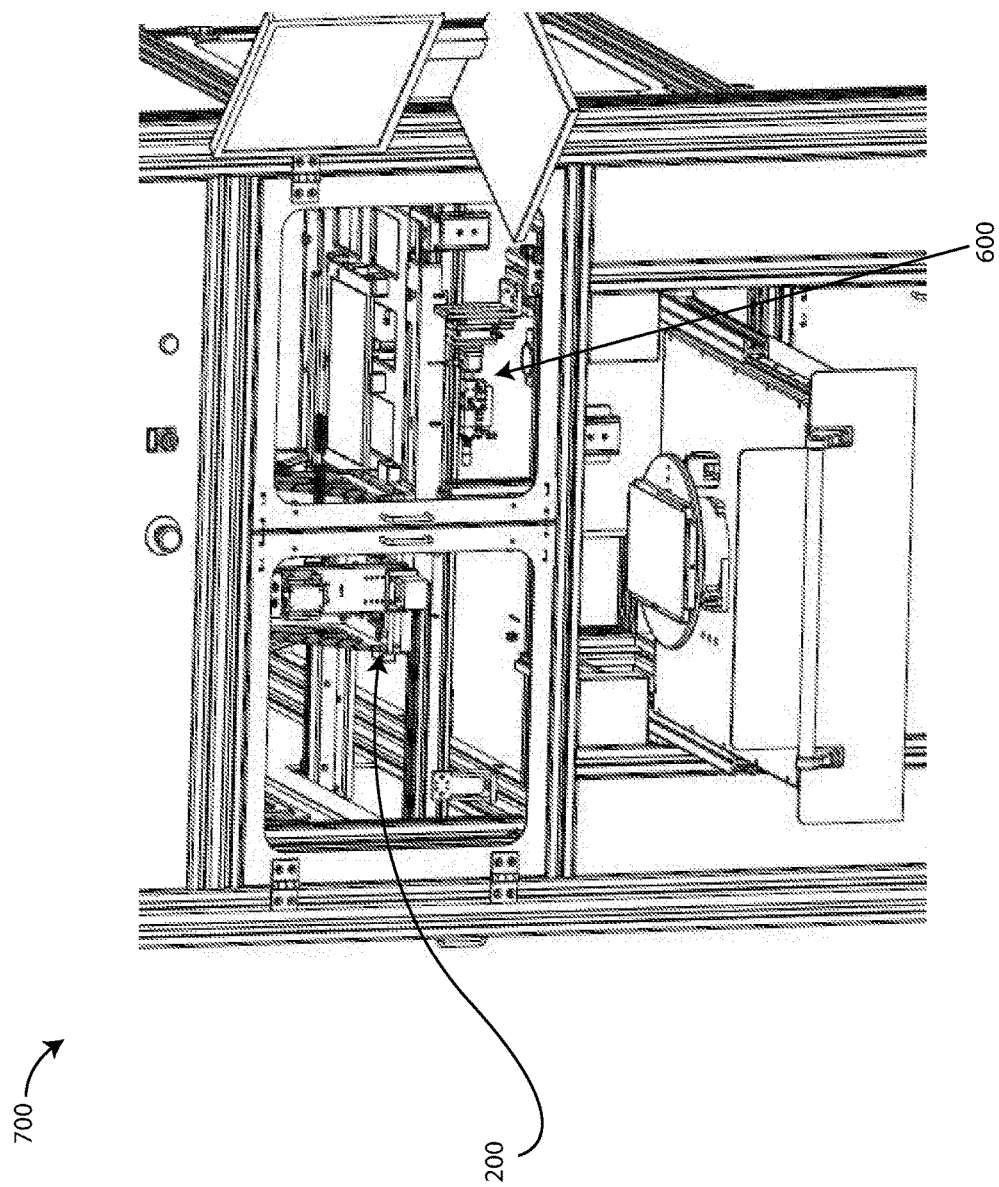

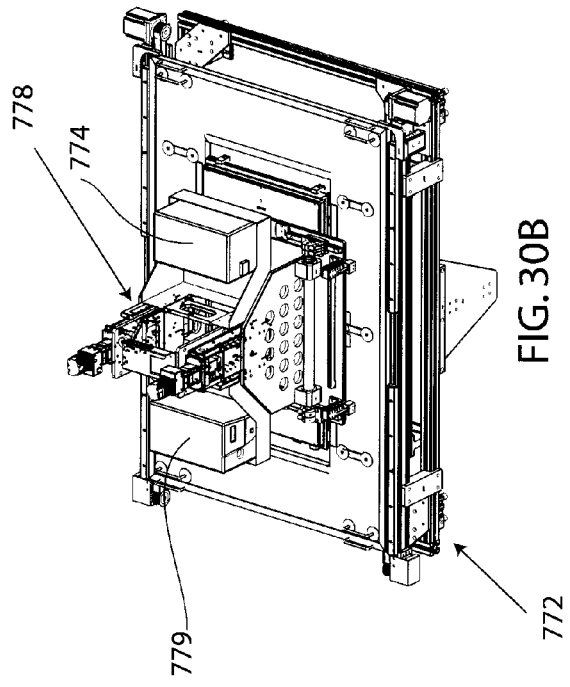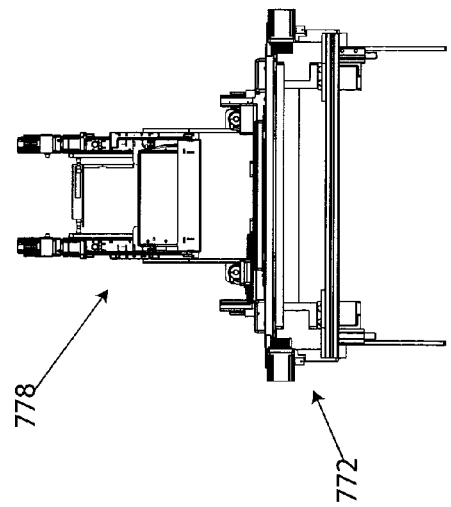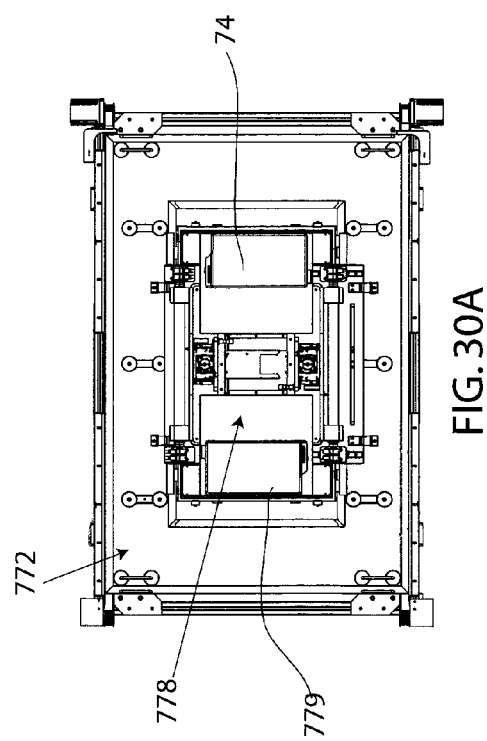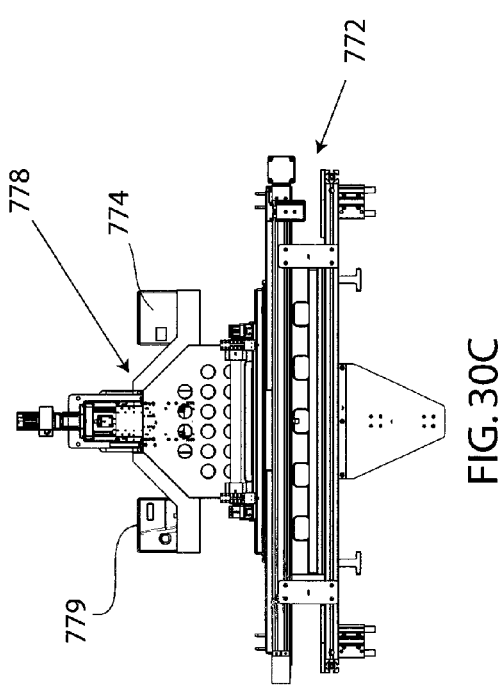

MACHINE FOR OPTICAL BONDING, SYSTEM AND METHOD OF USE THEREOF

CROSS-REFERENCE TO RELATED APPLICATIONS

This application is a continuation-in-part to U.S. application Ser. No. 13/009,385, filed on Jan. 19, 2011, entitled, "Robotic Placement Machine for Optical Bonding, System, and Method of Use Thereof."

FIELD OF TECHNOLOGY

The following relates to optical bonding of substrates and more specifically to embodiments of a machine, system, and method of automated optical bonding of substrates.

BACKGROUND

Optical bonding of a transparent substrate, such as a sheet of glass, to another transparent substrate, or to a video screen such as an electronic display, may improve the ruggedness and enhance the optical clarity in ambient light. Bonding transparent substrates to each other presents many difficulties, including maintaining the structural integrity of the bonded substrates and manipulating the fill material used to bond the substrates. Specifically, air pockets may form in the fill material between the two substrates during the placement and bonding process. One cause of air pockets is attributed to the placement of a glass sheet onto another sheet of glass. Another cause is the inability to manipulate and work with the fill materials used in the optical bonding processes. The presence of air pockets between the bonded substrates results in cracks at locations where air pockets are present.

Accordingly, a need exists for an optical bonding machine, system, and method that address the difficulties in the art.

SUMMARY

A first general aspect relates to a robotic placement machine configured to attach to a Y-axis actuator for moving left and right along an Y-axis and a X-axis actuator for moving back and forth along an X-axis, the robotic placement machine comprising a base operably connectable to at least one of the Y-axis actuator and the X-axis actuator, the base having a first end and a second end, a first Z axis actuator coupled to the first end of the base, the first Z axis actuator capable of moving up and down a first Z axis, a second Z axis actuator coupled to the second end of the base, the second Z axis actuator capable of moving up and down a second Z axis, and a pick and place plate operably connected to the first Z axis actuator and the second Z axis actuator, wherein the first Z axis actuator and the second Z axis actuator are each capable of moving independently of each other to tilt the pick and place plate.

A second general aspect relates to system comprising a first machine, wherein the first machine includes a valve coupled to a first end effector, the valve applying a material around a perimeter of a first substrate to form a dam, a second machine, wherein the second machine includes a custom head coupled to a second end effector, the custom head dispensing a fill material across a surface of the first substrate, wherein the dispensed fill material has a variable fill height, and a third machine, wherein the third machine includes a third end effector, the third end effector configured to pick a second substrate and controllably lower the second substrate onto the first substrate, wherein each of the first machine, second machine, and third machine are operably connected.

A third general aspect relates to an optical bonding method comprising dispensing dam material around a perimeter of the first substrate to form a dam, dispensing a fill material across a surface of the first substrate to achieve a largest fill height proximate a rear edge of the first substrate and a lowest fill height proximate a front edge of the first substrate, placing a second substrate into contact with the fill material proximate the rear edge of the first substrate at an angle relative to the first substrate, and controllably lowering the second substrate onto the first substrate until the second substrate is bonded to the first substrate to prevent and eliminate air bubbles between the first and second substrates.

A fourth general aspect relates to an optical bonding method comprising dispensing dam material around a perimeter of the first substrate to form a dam, dispensing a fill material across a surface of the first substrate to achieve a largest fill height proximate a middle portion of the first substrate, placing a second substrate into contact with the fill material proximate the middle portion of the first substrate, and controllably lowering the second substrate onto the first substrate substantially parallel to the first substrate until the second substrate is bonded to the first substrate to prevent and eliminate air bubbles between the first and second substrates.

A fifth general aspect relates to an adhesive application valve comprising an applicator, a Z-axis actuator operably connected to the applicator, and a rotation device operably connected to the applicator, wherein the Z-axis actuator and the rotation device are each capable of moving independently of each other to position the applicator in a position to apply an amount of adhesive to a top substrate prior to bonding with a bottom substrate.

A sixth general aspect relates to a machine for optical bonding comprising an end effector, the end effector configured to pick up a top substrate and controllably lower the top substrate into a bonding engagement with a bottom substrate, and an adhesive application valve proximate the machine, the adhesive application valve configured to apply an amount of adhesive onto the top substrate, wherein the end effector is configured to place the top substrate into a position of engagement with the adhesive application valve, and then place the top substrate onto the bottom substrate to facilitate initial contact between the adhesive applied to the top substrate and a fill material applied to the bottom substrate.

A seventh general aspect relates to a method of optical bonding comprising dispensing a fill material across a surface of a first substrate to achieve a largest fill height proximate a center portion of the first substrate and a lowest fill height proximate one or more corners of the first substrate, placing a second substrate into contact with the fill material proximate center portion of the first substrate, and controllably lowering the second substrate onto the first substrate until the second substrate is bonded to the first substrate to prevent and eliminate air bubbles between the first substrate and second substrates.

An eighth general aspect relates to a method of optical bonding comprising dispensing a fill material across a surface of the first substrate, applying an amount of adhesive on a surface of a second substrate configured to engage the fill material on the surface of the first substrate, and contacting the adhesive on the second substrate with the fill material on the first substrate to optically bond the first substrate and the second substrate.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 10A depicts a top view of an embodiment of the second end effector;

FIG. 10B depicts a front view of an embodiment of the second end effector;

FIG. 10C depicts a side view of an embodiment of the second end effector;

FIG. 16A depicts a top view of an embodiment of the third end effector a distance above an underside assembly;

FIG. 16B depicts a perspective view of an embodiment of the third end effector a distance above an underside assembly;

FIG. 16C depicts a front view of an embodiment of the third end effector a distance above an underside assembly;

FIG. 16D depicts a side view of an embodiment of the third end effector a distance above an underside assembly;

FIG. 19A depicts a top view of an embodiment of the third end effector as the first substrate and the second substrate are bonded;

FIG. 19B depicts a perspective view of an embodiment of the third end effector as the first substrate and the second substrate are bonded;

FIG. 19C depicts a front view of an embodiment of the third end effector as the first substrate and the second substrate are bonded;

FIG. 19D depicts a side view of an embodiment of the third end effector as the first substrate and the second substrate are bonded;

FIG. 20A depicts a top view of a second embodiment of a second substrate lowering onto the first substrate causing a capillary effect on the fill material;

FIG. 25 depicts a perspective view embodiment of a machine having an embodiment of an end effector and an embodiment of an adhesive application valve;

FIG. 30A depicts a top view of an embodiment of the end effector as the first substrate and the second substrate are bonded;

FIG. 30B depicts a perspective view of an embodiment of the end effector as the first substrate and the second substrate are bonded;

FIG. 30C depicts a front view of an embodiment of the end effector as the first substrate and the second substrate are bonded;

FIG. 30D depicts a side view of an embodiment of the end effector as the first substrate and the second substrate are bonded;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
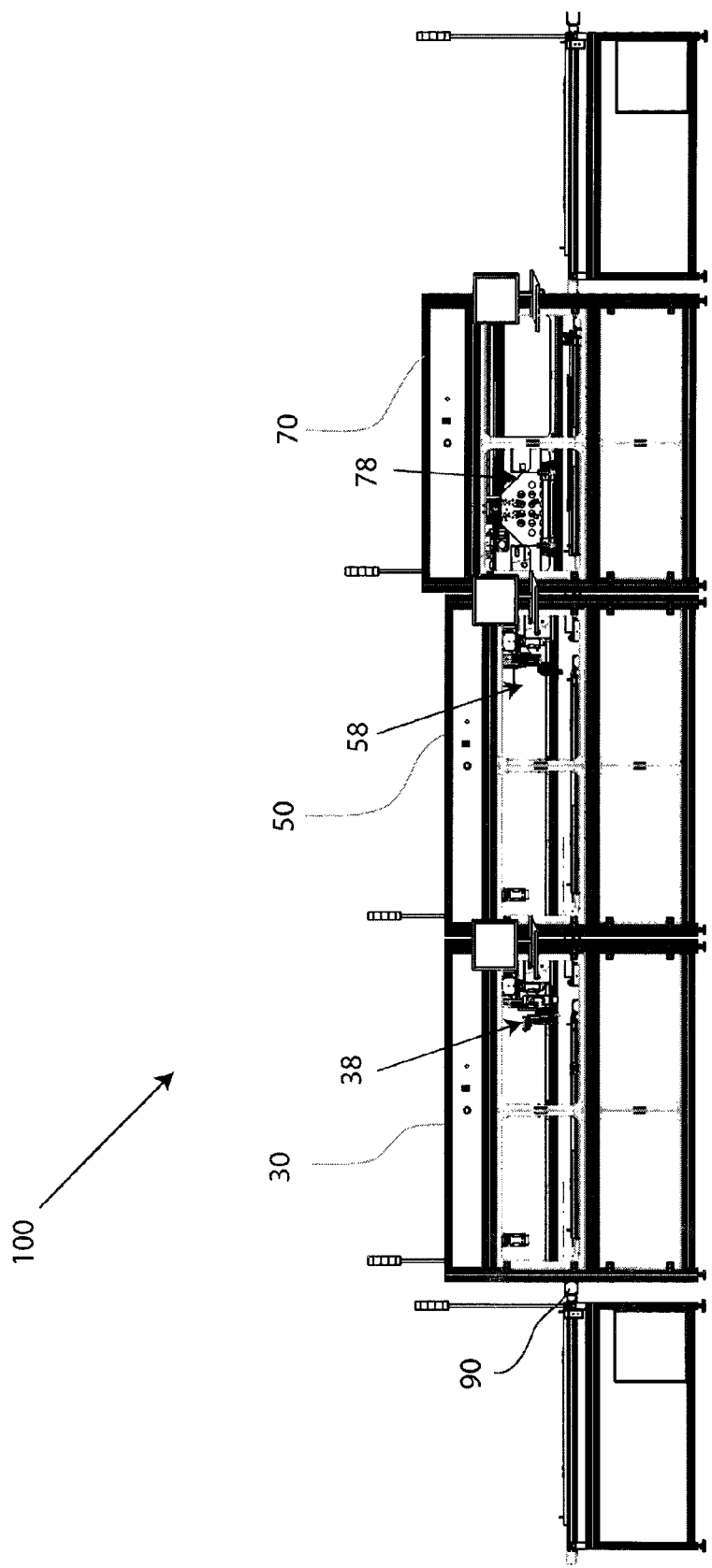
FIG. 1 depicts a front view of an embodiment of a system having an embodiment of a first system, second system, and a third system.
Figure 3A:
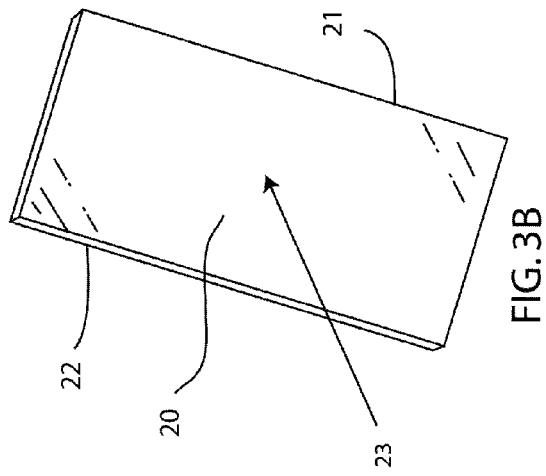
FIG. 3A depicts a top view of an embodiment of a second substrate.
Figure 3B:
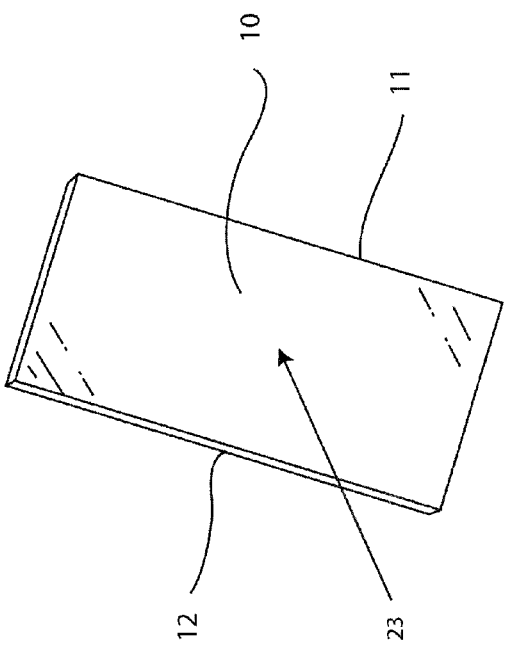
FIG. 3B depicts a perspective view of the second substrate.
Figure 2A:
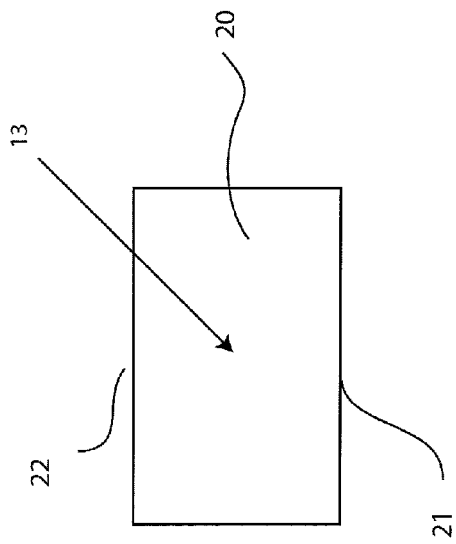
FIG. 2A depicts a top view of an embodiment of a first substrate.
Figure 2B:
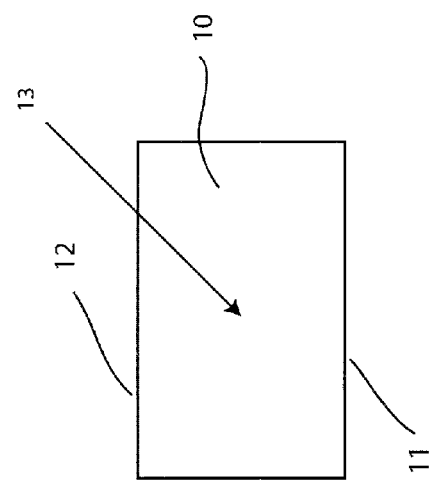
FIG. 2B depicts a perspective view of an embodiment of the first substrate.

Referring to the drawings, FIG. 1 depicts an embodiment of system 100. System 100 may be an optical bonding system, liquid bonding system, liquid optical bonding system, glass lamination system, a system for bonding two transparent substrates together, and the like. System 100 may include a first machine 30, a second machine 50, a third machine 70, and a conveyor system 90 connecting the first machine 30, the second machine 50, and the third machine 70. Each machine 30, 50, 70 may perform one or more tasks to accomplish the bonding of two substrates. However, embodiments of system 100 may include less than three machines and may include more than three machines depending on the number of tasks to be performed by each machine. System 100 also includes a first substrate 10 and a second substrate 20, wherein the second substrate 20 is bonded to the first substrate 10. The first substrate 10 has a front edge 11 (first end), a middle portion 13, and a rear edge 12 (second end), as shown in FIGS. 2A and 2B. The second substrate 20 has a front edge 21 (first end), a middle portion 23, and a rear edge 22 (second end), as shown in FIGS. 3A and 3B. The first and second substrates 10, 20 may be transparent substrates. Embodiments of the first and second substrates 10, 20 may be sheets of glass of varying size (e.g. small and large), plastic, and the like. Further embodiments of the second substrate 20 may be a protective, transparent sheet of glass to be placed onto the first substrate 10, for example, the first substrate 10 may be a glass display of an electronic device, such as a cell phone screen/cover or flat screen television screen. The first and second substrates 10, 20 may also be opaque or other than transparent, or one of the first and second substrates 10, 20 may be transparent while the other is opaque or other than transparent. The first and second substrates 10, 20 are bonded together with a fill material 5. Fill material 5 may be an optically clear adhesive, such as DuPont® Vertak family of adhesives, or any clear adhesive that may quickly cure under UV and efficiently adhere to glass and similar surfaces.

Figure 4:
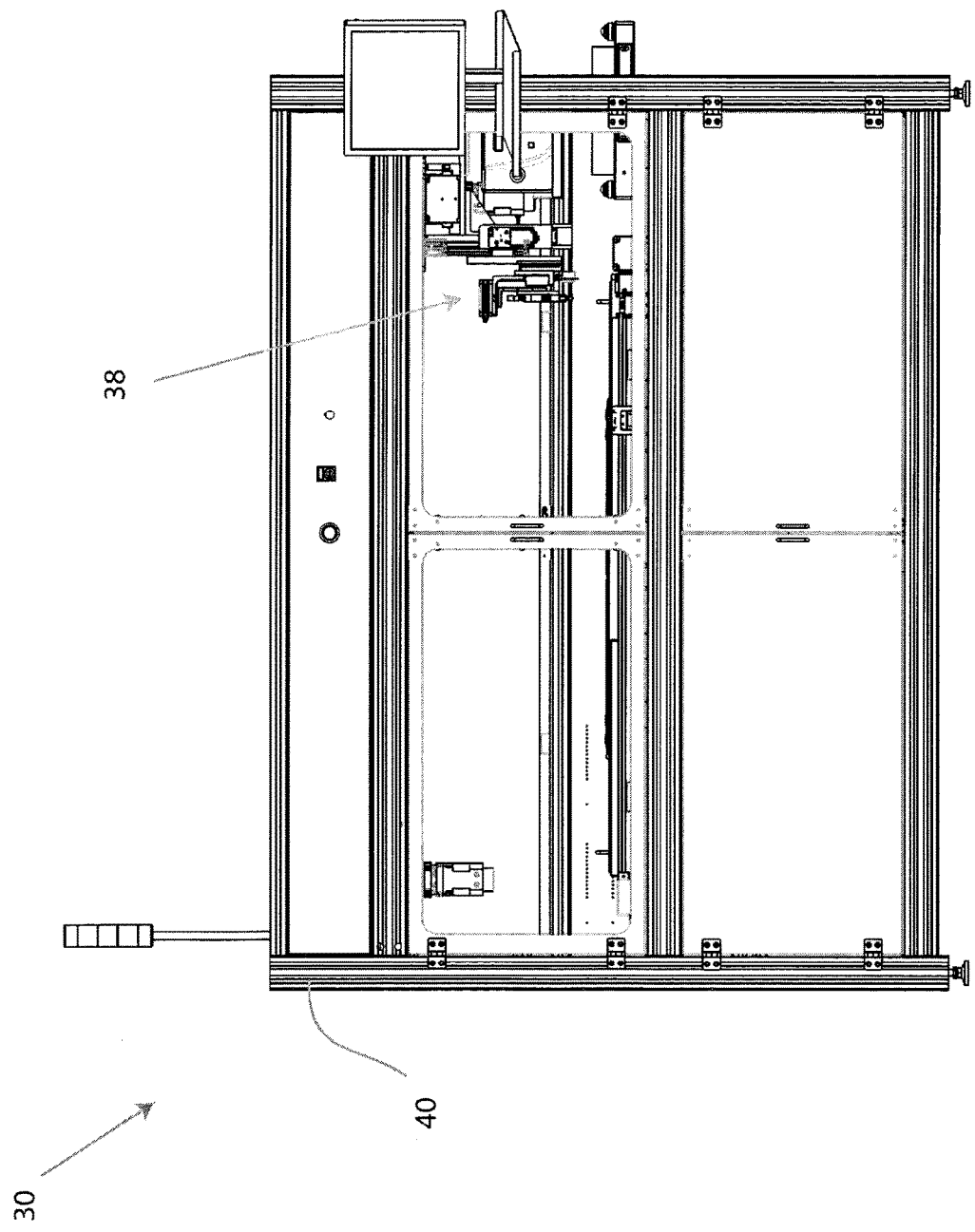
FIG. 4 depicts a front view of an embodiment of the first machine.
Figure 5:
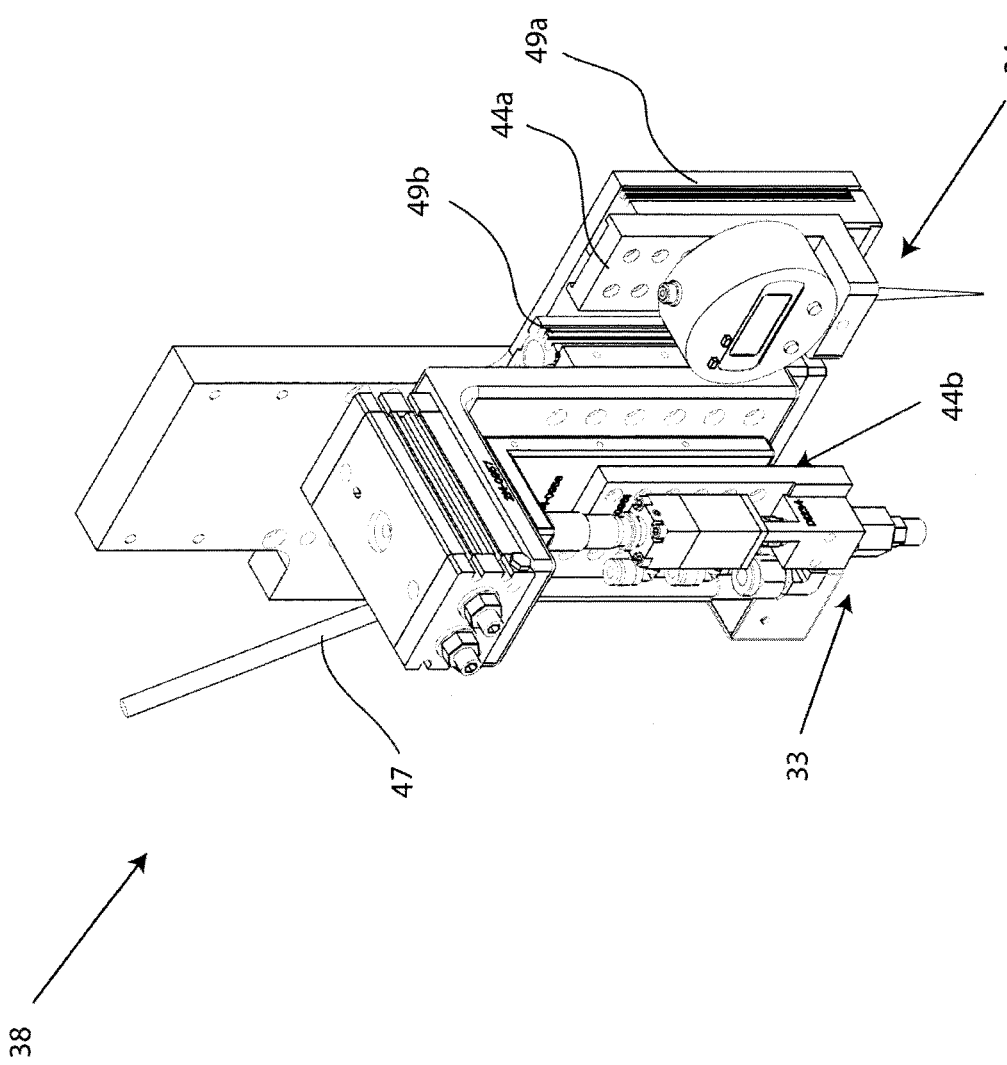
FIG. 5 depicts a perspective view of an embodiment of a first end effector.
Figure 6A:
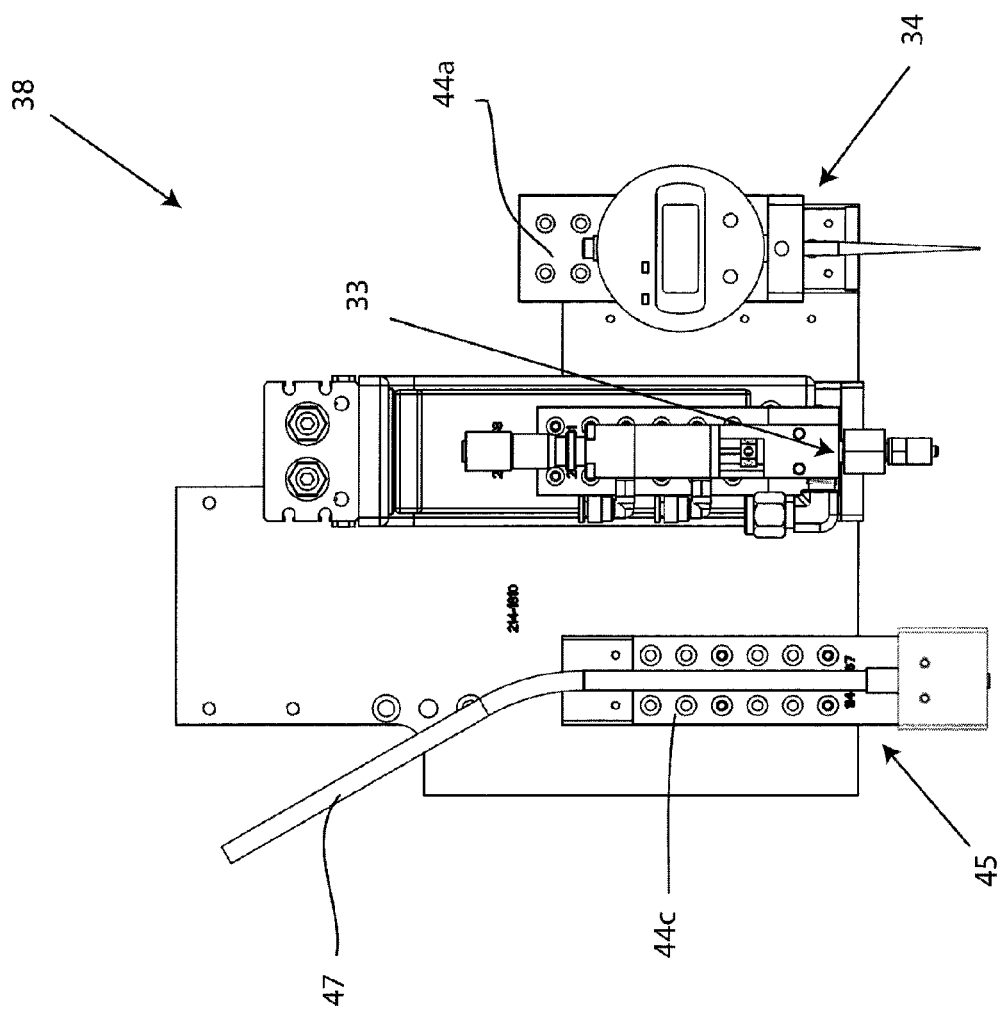
FIG. 6A depicts a front view of an embodiment of the first end effector.
Figure 6C:
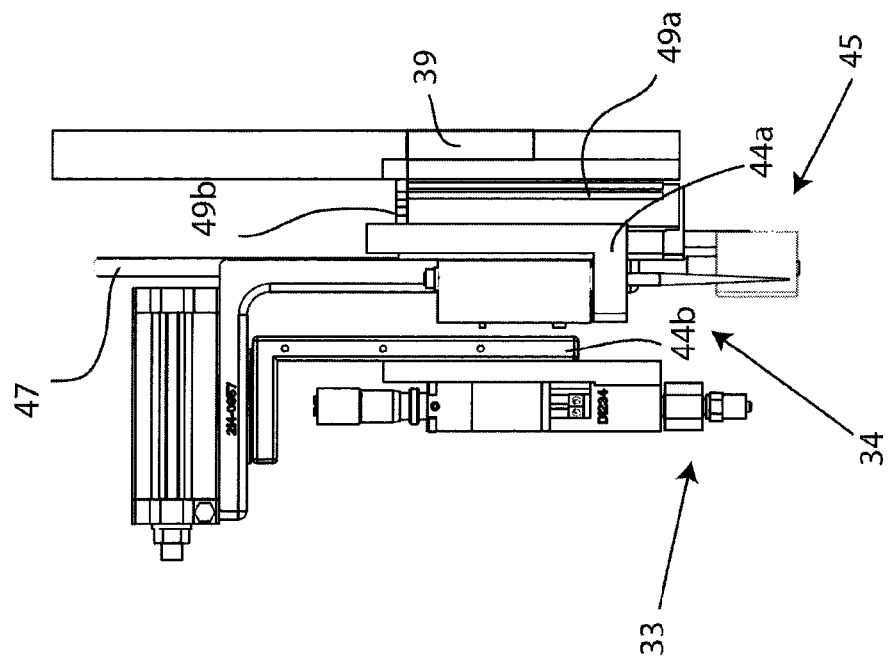
FIG. 6C depicts a side view of an embodiment of the first end effector.
Figure 6B:
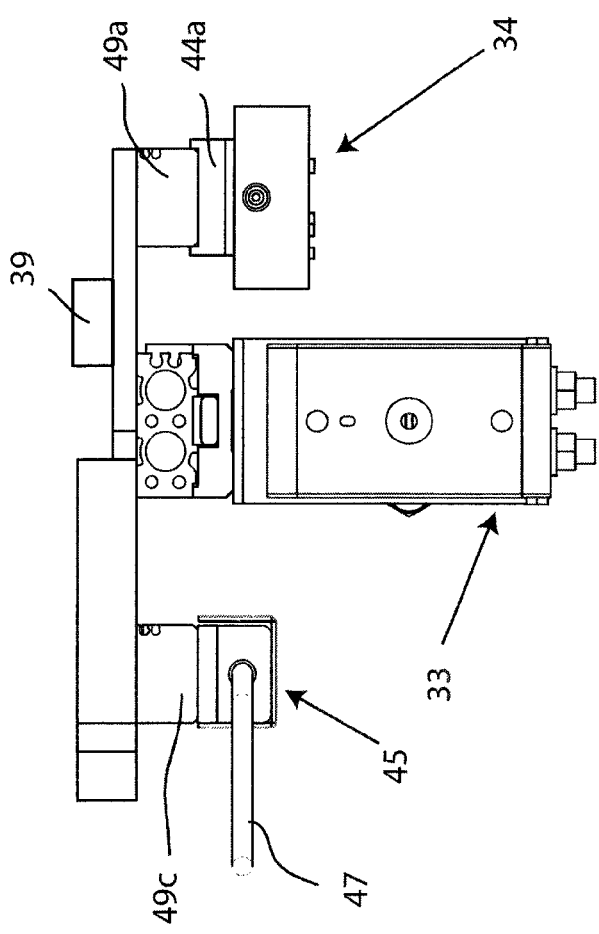
FIG. 6B depicts a top view of an embodiment of the first end effector.

Referring now to FIG. 4, embodiments of a first machine 30 of system 100 may include a frame 40, an X-axis actuator, a Y-axis actuator, a Z-axis actuator, and a first end effector 38. The first machine 30 may utilize a robotic platform to perform automated tasks with accuracy, precision, and repeatability. For example, the first machine 30 may be a Gantry robot having three principal axes (Cartesian coordinates) controlling linear motion, wherein the horizontal member(s) may be supported at both ends. The first machine 30 may also be any robotic manipulator such as a selective compliant assembly robot arm (SCARA) system, linear robot, multi-axis robot arm system, and the like. However, an embodiment of the first machine 30 will now be described as utilizing a Gantry robot for exemplary purposes. The first end effector 38 may refer to any device(s) attached to a X, Y, Z or other axis of movement to perform a variety of tasks, such as dispensing, picking and placing, routing, and the like. For instance, the first end effector 38 is capable of rotation about the Z axis, and may move left and right along the Y axis by sliding along the Y axis actuator, and move back and forth along the X axis by sliding with the Y axis actuator as it slides along the X axis actuator. Embodiments of the first end effector 38 may be comprised of a metal, such as stainless steel, or a combination of metal and composite materials, plastics, etc. Additionally, the first end effector 38 may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame 40 may provide a structure surrounding the components of the first machine 30. The frame 40 may allow for panels to be attached providing an enclosure for the first machine 30. The panels attached to the frame 40 may be a combination of both solid panels and see-through panels, such as Plexiglas®, glass, plastic, and the like, to allow viewing of the operation of the first machine 30.

FIGS. 4-6C depict an embodiment of a first machine 30 including at least one vacuum plate 31 coupled to an underside 32, a first end effector 38, a height sensor 34 coupled to the first end effector, at least one valve 33 coupled to the first end effector 38, a UV wand 45 coupled to the first end effector 38, a light source proximate the first end effector 38, a vision system 39, and a conveyor system 90 for moving the first substrate 10 to and from the first machine 30. As the first substrate 10 enters the first machine 30 on conveyor system 90, a vacuum plate coupled to an underside, or support substrate, may be raised up to the first substrate 10. Alternatively, the first substrate 10 may be lowered to the vacuum plate coupled to the underside. Other methods known to those skilled in the art may be used to place the first substrate 10 into physical contact with the vacuum plate of the first machine 30. When the first substrate 10 is positioned above the vacuum plate, the vacuum plate may secure the first substrate 10 in a flat position and prevent translational movement, sliding, shifting, etc., of the first substrate 10. The underside of the first machine 30 may include one or more vacuum plates, depending on the size of the first substrate 10. Once the first substrate 10 is held in place by the vacuum plate, a height sensor 34 coupled to the first end effector 38 may engage the first substrate 10 to probe the surface of the first substrate 10, such as a target fill area and the perimeter of the first substrate 10. The height sensor 34 may probe the surface height of the first substrate 10 to detect warpage or other deformities in the surface of the first substrate 10. In one embodiment, the height sensor 34 may be a contact/touch probe relying on physical interaction between a probe arm and the surface of the first substrate 10. In another embodiment, the height sensor 34 may be a laser probe which avoids physically contacting the surface of the first substrate 10.

The height sensor 34 may be connected to a mounting plate 44a, wherein the mounting plate 44a is connected to an independent Z actuator 49a, such as a ball screw slide, to allow for movement up and down along a Z axis. The independent Z actuator 49a may be connected to the general structure of the first end effector 38. Thus, the height sensor 34 may be able to move up and down independent of the first end effector 38 through actuation of the independent Z actuator 49a associated with the height sensor 34. A mounting plate, such as mounting plates 44a, 44b, may be any component(s), rigid or otherwise, that may be used to connect, secure, attach, etc., a component of the first machine 30 to the first end effector 38. Likewise, embodiments of a first machine 30 may include at least one valve 33 coupled to the first end effector 38. The first valve 33 (and/or valve assembly) may be connected directly or indirectly to a mounting plate 44b, wherein the mounting plate 44b is connected to an independent Z actuator 49b, such as a ball screw slide, to allow for movement up and down along a Z axis. The independent Z actuator 49b may be connected to the general structure of the first end effector 38. Thus, the valve 33 may be able to move up and down independent of the first end effector 38 through actuation of the independent Z actuator 49b associated with valve 33. Embodiments of the first valve 33 may be comprised of a metal, such as stainless steel, or a combination of metal and composite materials, plastics, etc.

Figure 7:
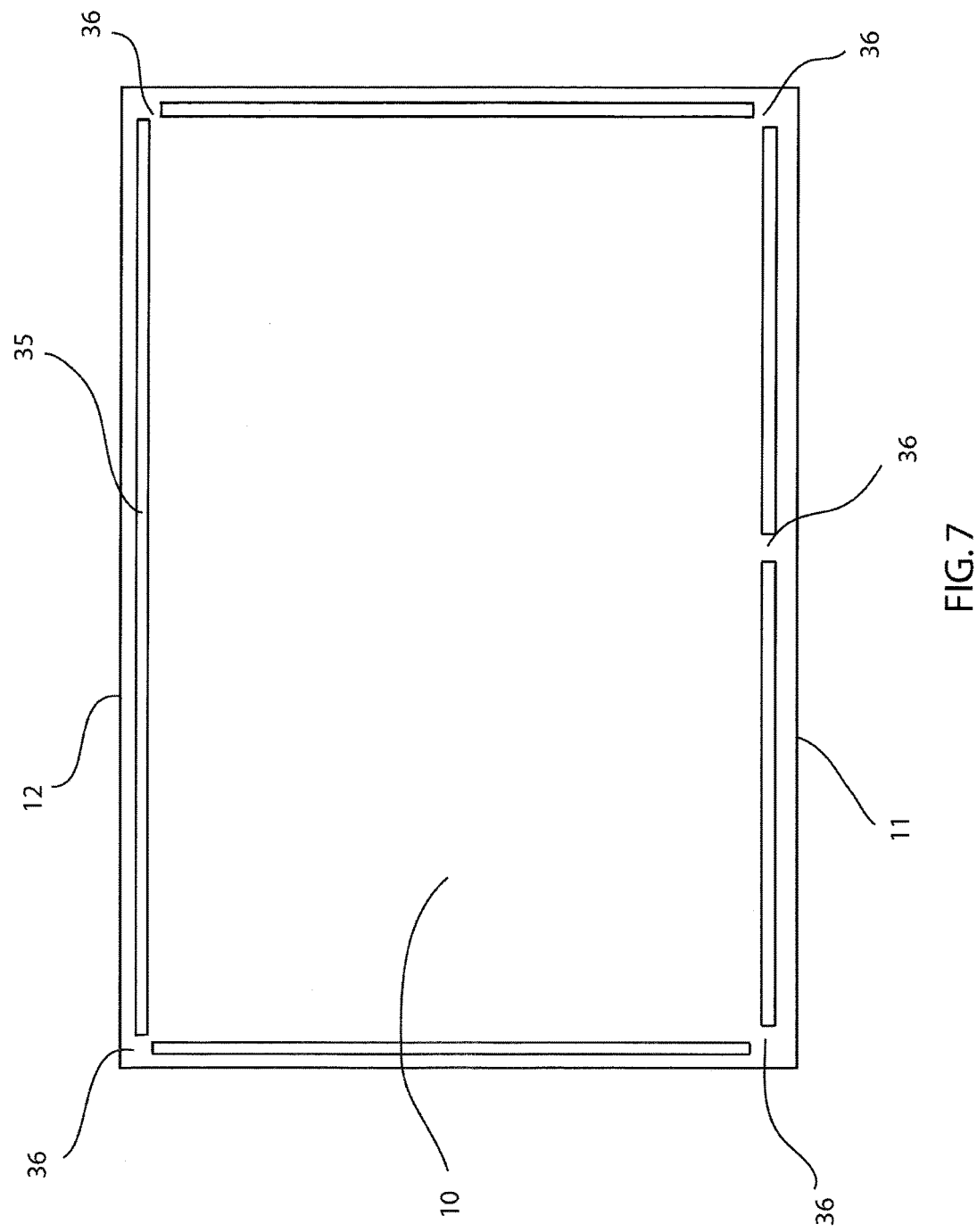
FIG. 7 depicts a top view of an embodiment of a first substrate having a dam.

Referring still to FIGS. 4-6C, at least one valve 33 may be coupled to the first end effector 38 to create a dam 35 along a perimeter of the first substrate 10. In other words, the dam 35 may be applied along a perimeter of a predefined area where fill material 5 may be dispensed from a custom head 53 of the second machine 50, as shown in FIG. 7. The dam 35 may extend to the edges of the first substrate 10 or may be a distance from the edges of the first substrate 10. The valve 33 may be a single dispensing valve. Moreover, movement of the first end effector 38 along the perimeter of the first substrate 10 while valve 33 is coupled to the first end effector 38 allows valve 33 to dispense an amount of dam material necessary to create a dam 35 according to the required/desired properties and specifications. Dam 35 material may include UV (ultraviolet) cure adhesive or material. The dam 35 may act as a spacer between the first substrate 10 and the second substrate 20 when the first and second substrates 10, 20 are bonded together. Thus, the height, girth, curvature, etc. of the dam 35 may vary according to the space desired/required between the first and the second substrates 10, 20 when bonded. Embodiments of dam 35 include a height ranging from 0.1 mm and 0.7 mm high, and a width ranging from 0.2 mm to 0.5 mm. The dam 35 may be applied as a bead along the perimeter of the first substrate 10 or may be applied flat along the perimeter of the first substrate 10, depending on the desired/required properties and specifications. Additionally, the dam 35 may act as a retainer, barrier, wall, boundary, and the like, for the fill material 5 dispensed on the surface of the first substrate 10 in the second machine 50. The dam 35 may also include vents 36 to allow air to escape during the placement of the second substrate 20 onto the first substrate 10. In addition, excess fill material 5 may also escape through vents 36 during some applications. Vents 36 may be a gap, break in the dam 35, aperture, slot, hole, opening, and the like. The number and placement of vents 36 may vary according to required/desired specifications. In one embodiment, vents 36 may be placed at the two corners and at the middle of the dam 35 adjacent to the front edge 11 of the first substrate 10. In another embodiment, a single vent 36 may be placed at some point between the corners of the dam 35 adjacent to the front edge 11. Other embodiments include a combination of vents 36 at the corners of the dam 35 and at points between the corners of the dam 35. Vents 36 may also be located on the dam 35 adjacent to the sides of the first substrate 10 to assist the escape of air and excess fill material 5 if the flow of fill material 5 is irregular during placement of the second substrate 20.

Embodiments of the first machine 30 may also include a light source in communication with an ultraviolet (UV) wand 45 coupled to the first end effector 38. The UV wand 45 may be connected, directly or indirectly, to a mounting plate 44c, wherein the mounting plate 44c is connected to an independent Z actuator 49c, such as a ball screw slide, to allow for movement up and down along a Z axis. The independent Z actuator 49c may be connected to the general structure of the first end effector 38. Thus, the UV wand 45 may be able to move up and down independent of the first end effector 38 through actuation of the independent Z actuator 49c associated with UV wand 45. A mounting plate, such as mounting plates 44a, 44b, 44c may be any component(s), rigid or otherwise, that may be used to connect, secure, attach, etc., a component of system 100 to the first end effector 38. The UV wand may emit ultraviolet light to semi-cure, stabilize, seal, and/or freeze the dam 35 material after application to the surface of the first substrate 10. The dam 35 material may slump or otherwise need to be stabilized after application; therefore, movement of the first end effector 38 along the perimeter of the first substrate 10 (i.e.

along the dam 35) while the UV wand 45 is coupled to the first end effector 38 allows the UV wand to emit UV light to stabilize the dam 35 material. The emitted/transmitted light from the UV wand 45 may come from a light source, wherein the UV wand 45 is in communication with and/or connected to the light source with a guide cable 47. Guide cable 47 may connect the UV wand 45 coupled to the first end effector 38 to a light source that may be proximate the first end effector 38. The light source may be a source of ultraviolet radiation. Embodiments of first machine 30 include a light source suspended from the frame 40 or other structural component of the first machine 30 proximate the first end effector 38. Other embodiments include a light source external to the first machine 30, wherein the guide cable 47 connects the UV wand 45 to the external light source. Even further embodiments include a light source coupled directly to the first end effector 38. Those skilled in the art should appreciate that the guide cable 47 may be a liquid filled cable, fiber optic cable, or similar cables associated with UV wands and UV light sources.

Further embodiments of the first machine 30 of system 100 may include a vision system 39 coupled to the first end effector 38. The vision system 39 may be a camera or other suitable vision system capable of detecting the orientation, location, position, etc. of parts, such as the first substrate 10, within the first machine 30.

After one or more tasks associated with the first machine 30 are completed, the vacuum plate may release the first substrate 10, and then the first substrate 10 may be forwarded to the second machine 50 via conveyor system 90, such as a conveyor belt. Those skilled in the art should appreciate that the first substrate 10 may be manually loaded in and out of the first machine 30. Furthermore, it should be understood that each task/component associated with the first machine 30, including, inter alia, height sensor 34 detecting surface height of first substrate 10, valve 33 dispensing dam material to create a dam 35, UV wand 45 to stabilize the dam 35, vision system 39 to monitor orientation of components, may be performed in separate machines. For instance, the tasks/components associated with the first machine 30 may be performed in two or more machines, wherein the first substrate 10 is transferred to each machine accordingly.

Figure 8:
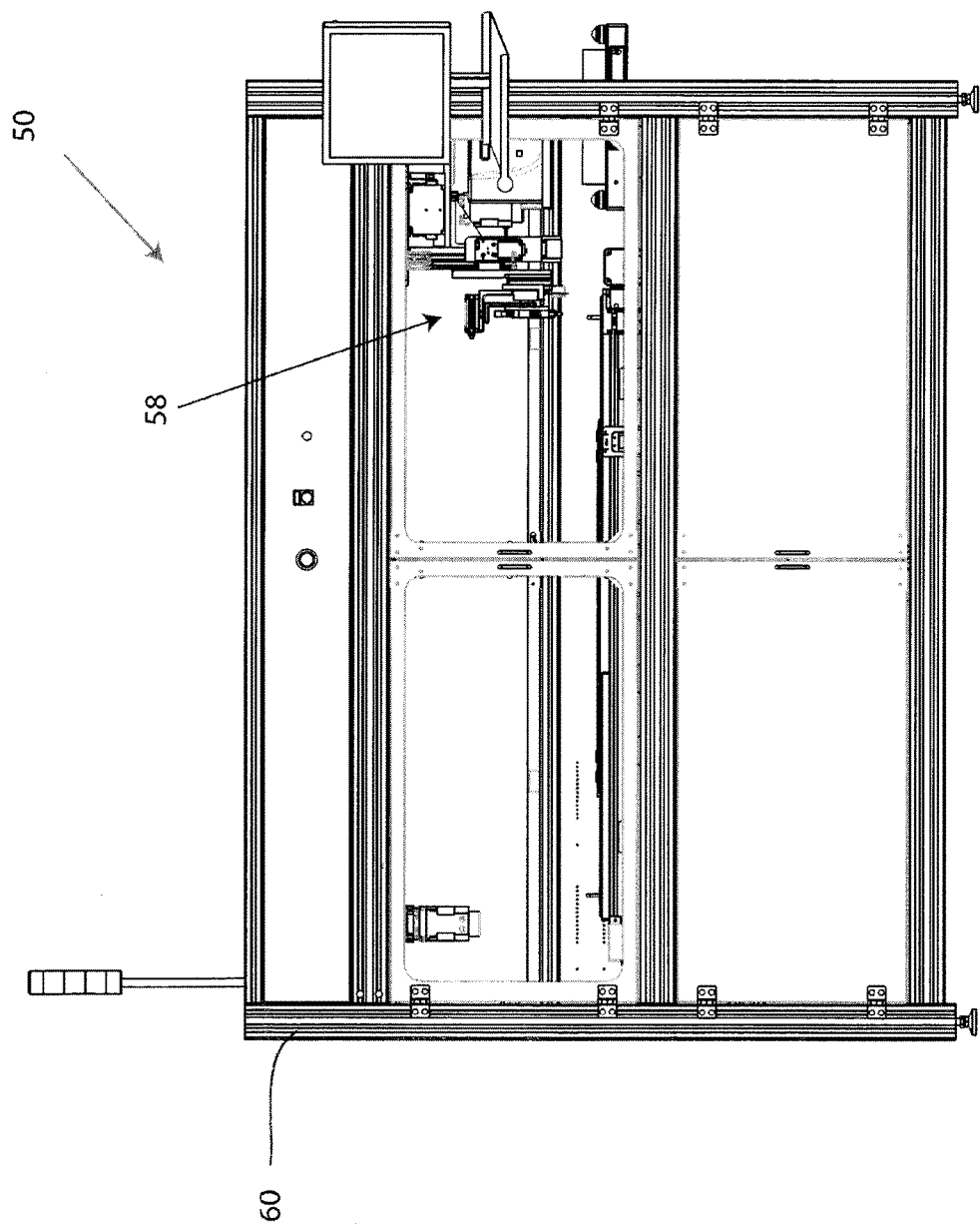
FIG. 8 depicts a front view of an embodiment of a second machine.

Referring now to FIG. 8, embodiments of a second machine 50 of system 100 may include a frame 60, an X-axis actuator, a Y-axis actuator, a Z-axis actuator, and a second end effector 58. The second machine 50 may utilize a robotic platform to perform automated tasks with accuracy, precision, and repeatability. For example, the second machine 50 may be a Gantry robot having three principal axes (Cartesian coordinates) controlling linear motion, wherein the horizontal member(s) may be supported at both ends. The second machine 50 may also be any robotic manipulator such as a selective compliant assembly robot arm (SCARA) system, linear robot, multi-axis robot arm system, and the like. However, an embodiment of the second machine 50 will now be described as utilizing a Gantry robot for exemplary purposes. The second end effector 58 may refer to any device(s) attached to a X, Y, Z or other axis of movement to perform a variety of tasks, such as dispensing, picking and placing, routing, and the like. For instance, the second end effector 58 is capable of rotation about the Z axis, and may move left and right along the Y axis by sliding along the Y axis actuator, and move back and forth along the X axis by sliding with the Y axis actuator as it slides along the X axis actuator. Embodiments of the second end effector 58 may be comprised of a metal, such as stainless steel, or a combination of metal and composite materials, plastics, etc. Additionally, the second end effector 58 may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame 60 may provide a structure surrounding the components of the second machine 50. The frame 60 may allow for panels to be attached providing an enclosure for the second machine 50. The panels attached to the frame 60 may be a combination of both solid panels and see-through panels, such as Plexiglas®, glass, plastic, and the like, to allow viewing of the operation of the second machine 50.

Embodiments of the second machine 50 may include at least one vacuum plate coupled to an underside, or support frame, a second end effector 58, a treatment head 54 coupled to the second end effector 58, a custom head 53 coupled to the second end effector 54, a vision system 59, and a conveyor system 90 for moving the first substrate 10 to and from the second machine 50. As the first substrate 10 enters the second machine 50 on conveyor system 90, a vacuum plate coupled to an underside may be raised up to the first substrate 10. Alternatively, the first substrate 10 may be lowered to the vacuum plate coupled to the underside. Other methods known to those skilled in the art may be used to place the first substrate 10 into physical contact with the vacuum plate. When the first substrate 10 is positioned above the vacuum plate, the vacuum plate may secure the first substrate 10 in a flat position and prevent translational movement, sliding, shifting, etc., of the first substrate 10. The underside of the second machine 50 may include one or more vacuum plates, depending on the size of the first substrate 10.

Figure 9:
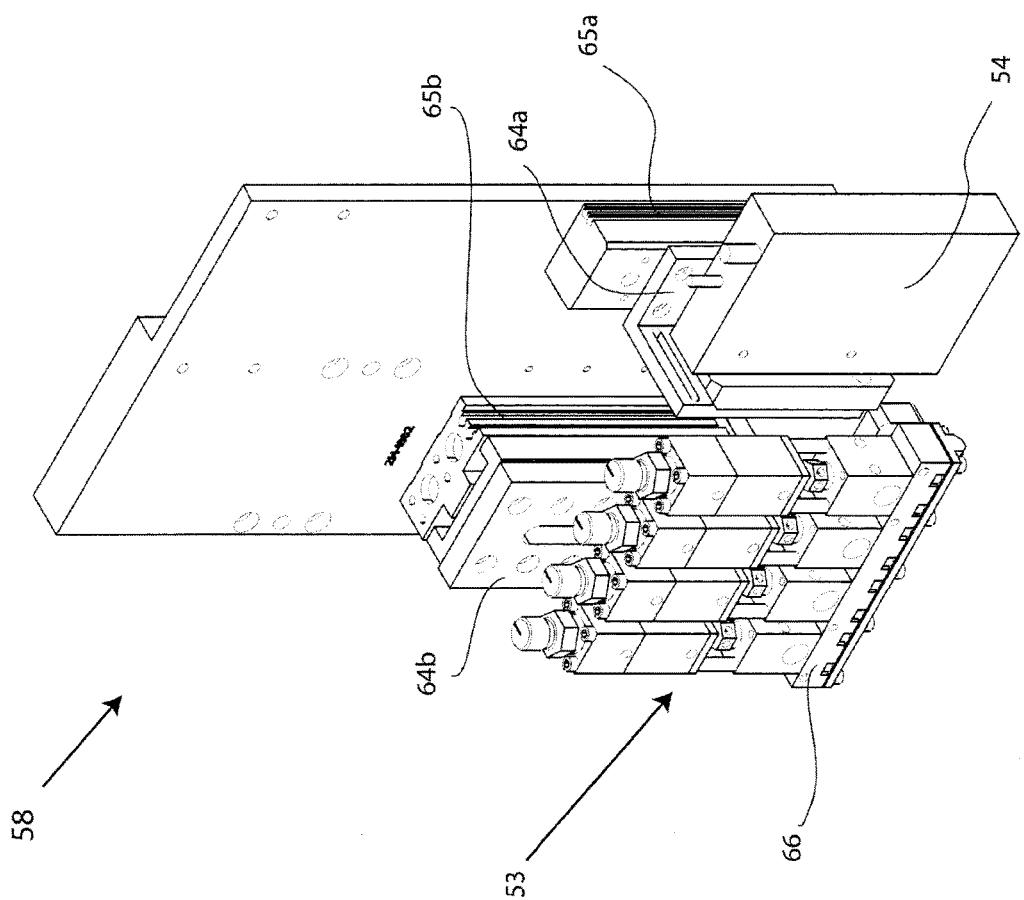
FIG. 9 depicts a perspective view of an embodiment of a second end effector.

With continued reference to FIG. 8, and additional reference to FIGS. 9-10C, the first substrate 10 is held in place by the vacuum plate, a treatment head 54 coupled to the second end effector 58 may treat the surface of the first substrate 10. In most embodiments, the treatment head 54 treats only the target fill area, wherein the target fill area may be defined as the surface area inside/within the dam 35, or the majority of the surface area of the first substrate 10. Treating the surface of the first substrate 10 may require plasma treatment of the surface of the first substrate 10 to change the surface energy of the first substrate 10 to improve wetting and adhesion properties of the surface of the first substrate 10. The treatment head 54 may be referred to as a plasma head or surface treatment head. Embodiments of the treatment head 54 may be comprised of a metal, such as stainless steel, or a combination of metal and composite materials, plastics, etc. Moreover, movement of the second end effector 58 back and forth across the target area may treat the surface of the first substrate with the treatment head 54 coupled to the second end effector 58. The treatment head 54 may be up to 4 inches wide. Moreover, the treatment head 54 may be connected to a mounting plate 64a, wherein the mounting plate 64a is connected to an independent Z actuator 65a, such as a ball screw slide, to allow for movement up and down along a Z axis. The independent Z actuator 65a may be connected to the general structure of the second end effector 58. Thus, the treatment head 54 may be able to move up and down independent of the second end effector 58 through actuation of the independent Z actuator 65a associated with the treatment head 54. A mounting plate, such as mounting plates 64a, 64b, may be any component(s), rigid or otherwise, that may be used to connect, secure, attach, etc., a component of second machine 50 to the second end effector 58. Likewise, embodiments of a second machine 50 may include a custom head 53 coupled to the second end effector 58. The custom head 53 (and/or valve(s) assembly) may be connected directly or indirectly to a mounting plate 64b, wherein the mounting plate 64b is connected to an independent Z actuator 65b, such as a ball screw slide, to allow for movement up and down along a Z axis. The independent Z actuator 65b may be connected to the general structure of the second end effector 58. Thus, the custom head 53 may be able to move up and down independent of the second end effector 58 through actuation of the independent Z actuator 65b associated with the custom head 53. Embodiments of the custom head 53 may be comprised of a metal, such as stainless steel, or a combination of metal and composite materials, plastics, etc. A fluid reservoir may be operably attached to the custom head 53 through various means, such as a hose or other tube. The fluid reservoir may contain fill material 5, such as optically clear adhesive.

Furthermore, the custom head 53 may include a single dispensing valve or a plurality of dispensing valves for dispensing a fill material 5 onto the first substrate 10. The custom head 53 having a plurality of valves may speed up the fill process over a larger substrate due to a wider fill pattern, while a single dispensing valve may be helpful over smaller substrates due to a narrower fill pattern. Embodiments of the custom head 53 may include four, one inch-wide dispensing valves positioned in a side-by-side configuration, wherein each valve of the plurality of valves is level or substantially level with respect to the other valves forming the custom head 53. Those skilled in the art should appreciate that the configuration and placement of the valves of the custom head 53 may include other configurations and placement locations, but may typically remain proximate each other coupled to the second end effector 58. Further embodiments of custom head 53 may include an outlet block 66 positioned at the nozzle end of the dispensing valves to help generate the dispense pattern through each pass across the first substrate 10. Moreover, the second machine 50 may selectively operate the custom head 53 such that only one or more of the plurality of valves forming the custom head 53 dispense fill material 5, while the other valves remain unused. The selective operation of the custom head 53 (e.g. 2 of 4 valves dispensing fill material 5) may be performed prior to operation of the second machine 50 and/or during the operation of the second machine 50. For instance, an embodiment of a custom head 53 having four or more dispensing valves may operate only three of the four or more valves of the custom head 53, without the need for disassembly, and without the need to stop the functioning/operation of the second machine 50. Because the second machine 50 can selectively operate individual components of the custom head 53, the fill pattern may be narrowed or widened depending on the requirement/specification of the first substrate 10 (e.g. size, fill area, time, etc).

Figure 11:
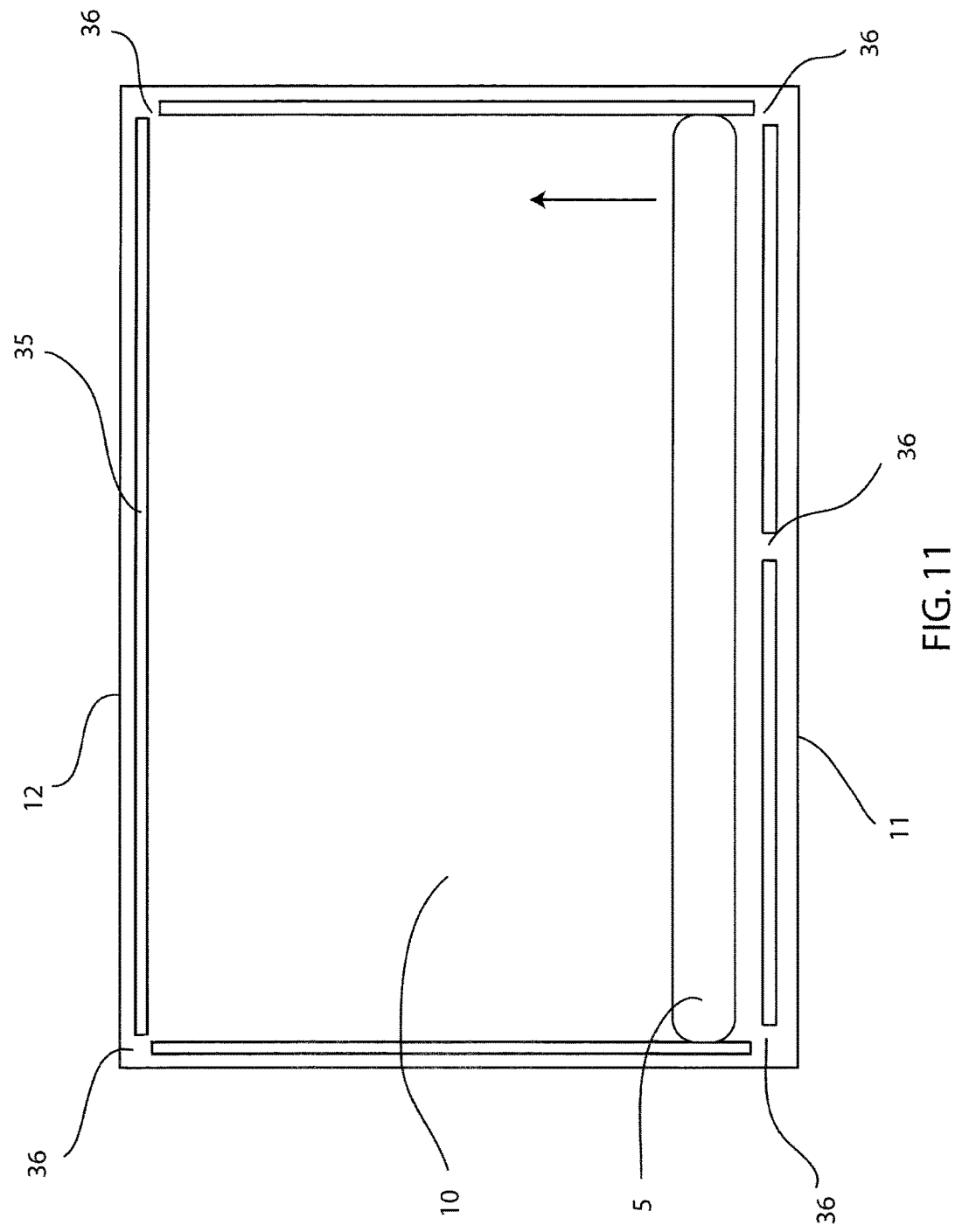
FIG. 11 depicts a top view of an embodiment of the first substrate having some fill material dispensed within the dam.
Figure 12:
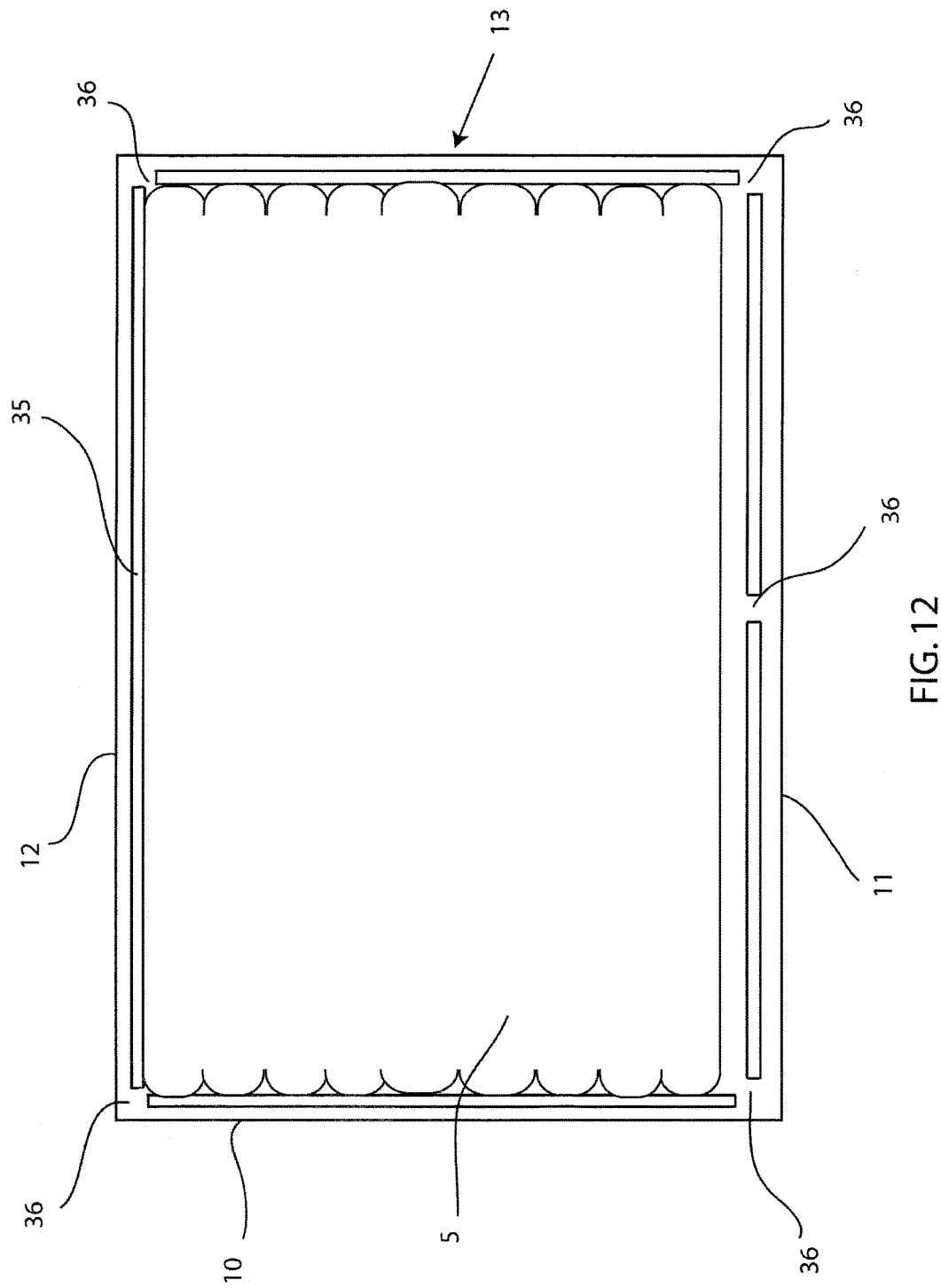
FIG. 12 depicts a top view of an embodiment of the first substrate after fill material has been dispensed across its surface.

Furthermore, movement of the second end effector 58 following a fill pattern across the first substrate 10 may dispense the fill material 5 across the fill area of the first substrate 10. The fill pattern of the fill material 5 may start proximate the front edge 11 of the first substrate 10, as shown in FIG. 11. The fill material 5 dispensed by the custom head 53 may start a distance from the dam 35 proximate or otherwise near the front edge 11, and a distance from the sides of the first substrate 10. The direction of the fill pattern may be from the front edge 11 to the rear edge 12 of the first substrate 10, and generally, the surface of the fill material 5 on the first substrate 10 should not contain waves, divots, or other surface irregularities (i.e. the surface of the fill material 5 may be smooth and continuous). Additionally, the movement of the second end effector 58 may be to dispense a rectangular and/or linear pattern from one side to the other side, wherein one trip by the second end effector 58 from side to side may be referred to as a pass. After a pass by the second end effector 58, the second end effector 58 may move a distance towards the rear edge 12, and make a pass back across (e.g. laterally) the first substrate 10. The patterned movement of the second end effector 58 may continue until reaching the dam 35 proximate the rear edge 12. Those having skill in the requisite art should appreciate that the second end effector 58 may follow various patterns and movements to apply the fill material 5. Accordingly, the fill material 5 may cover a large majority of the surface of the first substrate 10. For example, the fill material 5 may cover 85% to 95% of the first substrate 10, as shown in FIG. 12. Each pass of the second end effector 58 may dispense fill material 5 across (e.g. side-to-side) the first substrate 10, between the dam 35 or general target area in embodiments where no dam 35 is formed, at a width corresponding to the number of operating valves and type of dispensing valve of the custom head 53. Thus, the custom head 53 may determine the width of fill material 5 being dispensed each pass of the second end effector 58.

Figure 13A:
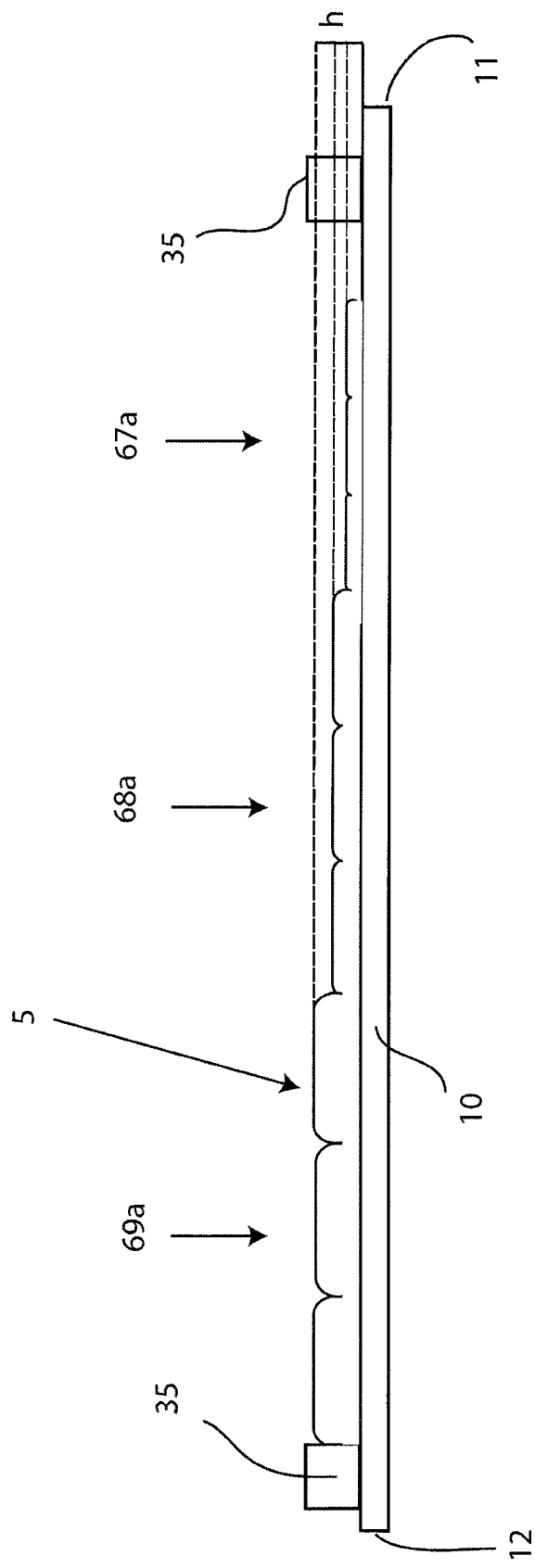
FIG. 13A depicts a cross-section view of a first embodiment of the first substrate after fill material has been dispensed across its surface.

Moreover, with reference to FIGS. 11-13A, the fill material 5 may be dispensed at a certain fill height, h. Fill height, h, may refer to the height of the fill material 5 from the surface of first substrate 10, once dispensed from the custom head 53. The fill height, h, may be controlled by the speed of the second end effector 58 during each pass across the first substrate 10. For example, the slower the second end effector 58 moves as it passes across the first substrate 10, the more fill material 5 may be dispensed at that location. The fill height, h, may also be controlled by the flow rates associated with the custom head 53 (e.g. size of the outlets, types of valves, etc.) and ultimately by the amount of fill material 5 dispensed from the custom head 53. In most embodiments, the fill material 5 is dispensed at a varying or variable fill height, h. In one embodiment, the variable fill height, h, may increase from the front edge 11 of the first substrate 10 to a rear edge 12 of the first substrate 10. In other words, the dispensed fill material 5 may have a largest fill height, h, proximate or otherwise near the rear edge 12 of the first substrate 10 and a lowest fill height, h, at the front edge 11 of the first substrate 10. Embodiments of the varying fill height, h, may require the second end effector 58 to make a first set of passes across the first substrate 10 at a consistent first fill speed, then a second set of passes across the first substrate 10 at a consistent second fill speed, and a third set of passes across the first substrate 10 at a consistent third fill speed, wherein the first set of passes begins proximate the front edge 11, the third set of passes occurs proximate the rear edge 12, further wherein the first fill speed is faster than the second fill speed, and the third fill speed is the slowest fill speed. Further embodiments of the varying fill height, h, may include a plurality of fill zones 67a, 68a, 69a. A fill zone 67a, 68a, 69a may refer to a portion of the target fill area having a certain fill height, h, of fill material 5 depending on the fill rate of the custom head 53. Each fill zone 67a, 68a, 69a may have the same fill height, h. Alternatively, each fill zone 67a, 68a, 69a may have a fill height, h, which slightly increases in a direction toward the rear edge 12, as shown in FIG. 13A. Although only three fill zones 67a, 68a, 69a are shown, those skilled in the art should appreciate that there may be more or less than three fill zones 67a, 68a, 69a. Fill zone 67a, the fill zone closest to the front edge 11, should have the lowest fill height, h. Fill zone 68a should have a fill height, h, greater than the fill zone 67a, but less than fill zone 69a. Accordingly, fill zone 69a, or fill zone closes to the rear edge 12 should have the greatest fill height, h. Those in the art should appreciate that first, second, and third set of passes by the end effector 58 do not necessarily have to be in any particular order, for example, the third set of passes may be associated with fill zone 67a, while the first set of passes may be associated with fill zone 69a, or vice versa.

Figure 13B:
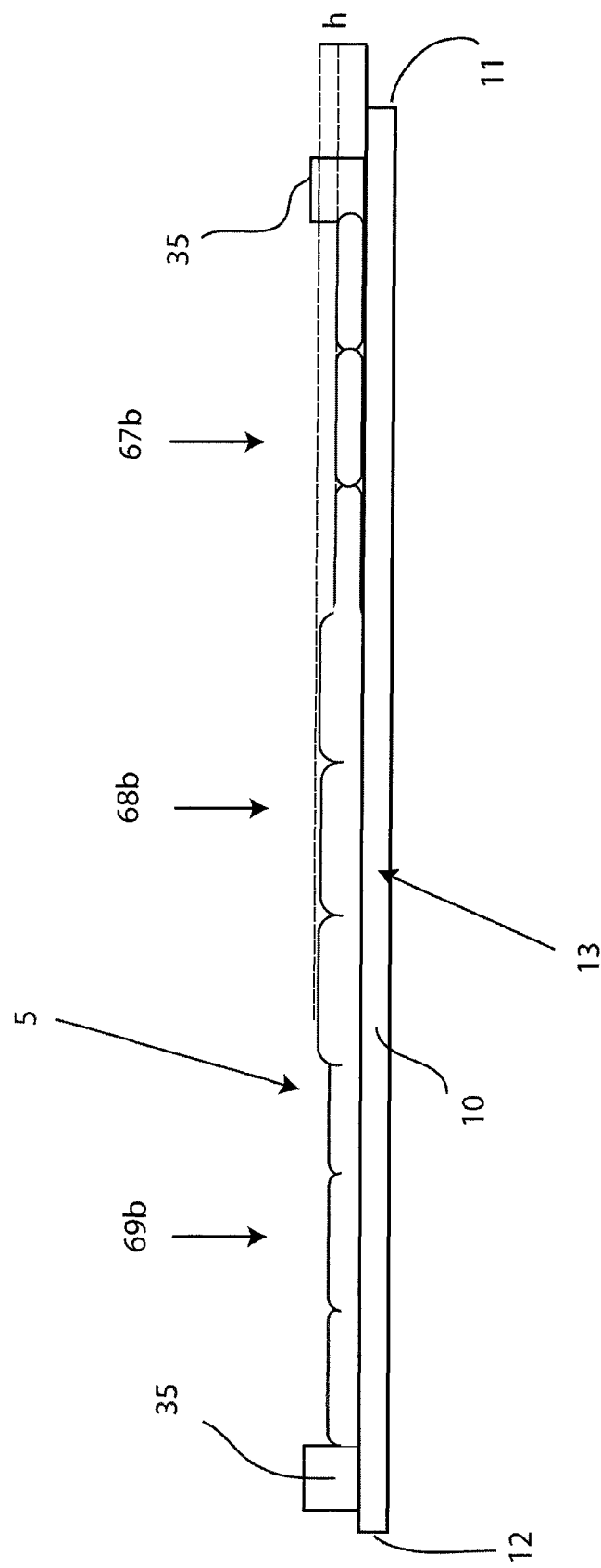
FIG. 13B depicts a cross-section view of a second embodiment of the first substrate after fill material has been dispensed across its surface.

In another embodiment, with reference to FIG. 13B, the variable fill height, h, may be a constant height from the front edge 11 of the first substrate 10 to a middle portion 13 of the first substrate 10, and constant from the rear edge 12 to the middle portion 13, wherein the fill height, h, at the middle portion 13 is larger. In other words, the dispensed fill material 5 may have a largest fill height, h, proximate or otherwise near middle portion 13 of the first substrate 10 and a lowest fill height, h, proximate or otherwise near the front edge 11 and rear edge 12 of the first substrate 10. Embodiments of the varying fill height, h, may require the second end effector 58 to make a first set of passes across the first substrate 10 at a consistent first fill speed, then a second set of passes across the first substrate 10 at a consistent second fill speed, and a third set of passes across the first substrate 10 at a consistent third fill speed, wherein the first set of passes begins/occurs proximate or otherwise near the front edge 11, the second set of passes occurs proximate or otherwise near the middle portion 13, the third set of passes occurs proximate or otherwise near the rear edge 12, further wherein the first fill speed and the third fill speed is faster than the second fill speed. Further embodiments of the varying fill height, h, may include a plurality of fill zones 67b, 68b, 69b, as shown in FIG. 13B. A fill zone 67b, 68b, 69b may refer to a portion of the target fill area having a certain fill height, h, of fill material 5 depending on the fill rate of the custom head 53. Although only three fill zones 67b, 68b, 69b are shown, those skilled in the art should appreciate that there may be more or less than three fill zones 67b, 68b, 69b. Fill zone 67b, can be the fill zone closest to the front edge 11. Fill zone 68b can be the fill zone proximate a middle portion 13. Fill zone 69b can be the fill zone closest to the rear edge 12. The fill zone 68b should have a fill height, h, greater than the fill height, h, of fill zone 67b and fill zone 69b. Accordingly, a fill zone proximate or otherwise near the middle portion 13 of the first substrate 10, such as fill zone 68b, should have the greatest fill height, h. Those in the art should appreciate that first, second, and third set of passes by the end effector 58 do not necessarily have to be in any particular order, for example, the third set of passes may be associated with fill zone 67b, while the first set of passes may be associated with fill zone 69b, or vice versa.

Further embodiments of the second machine 50 of system 100 may include a vision system 59 coupled to the second end effector 58, and a heating system to heat the fill material 5. The vision system 59 may be a camera or other suitable vision system capable of detecting the orientation, location, position, etc. of parts, such as the first substrate 10, within the second machine 50. Moreover, the heating system may include a heated valve(s) coupled to the second end effector 58, a heated fluid hose through which the fill material 5 travels from the fluid reservoir, or a heated fluid reservoir. Heating the fill material 5 may help improve the wetting of the fill material 5 by lowering the viscosity. The temperature range for heating the fill material may be between 30° C. to 50° C.

After one or more tasks associated with the second machine 50 are completed, the vacuum plate may release the first substrate 10, and then the first substrate 10 may be forwarded to the third machine 70 via conveyor system 90, such as a conveyor belt. Those skilled in the art should appreciate that the first substrate 10 may be manually loaded in and out of the second machine 50. Furthermore, it should be understood that each task/component associated with the second machine 50, including, inter alia, treatment head 54 treating the surface of first substrate 10, custom head 53 dispensing fill material onto the first substrate 10, vision system 39 to monitor orientation of components, may be performed in separate machines. For instance, the tasks/components associated with the second machine 50 may be performed in two or more machines, wherein the first substrate 10 is transferred to each machine accordingly.

Figure 14:
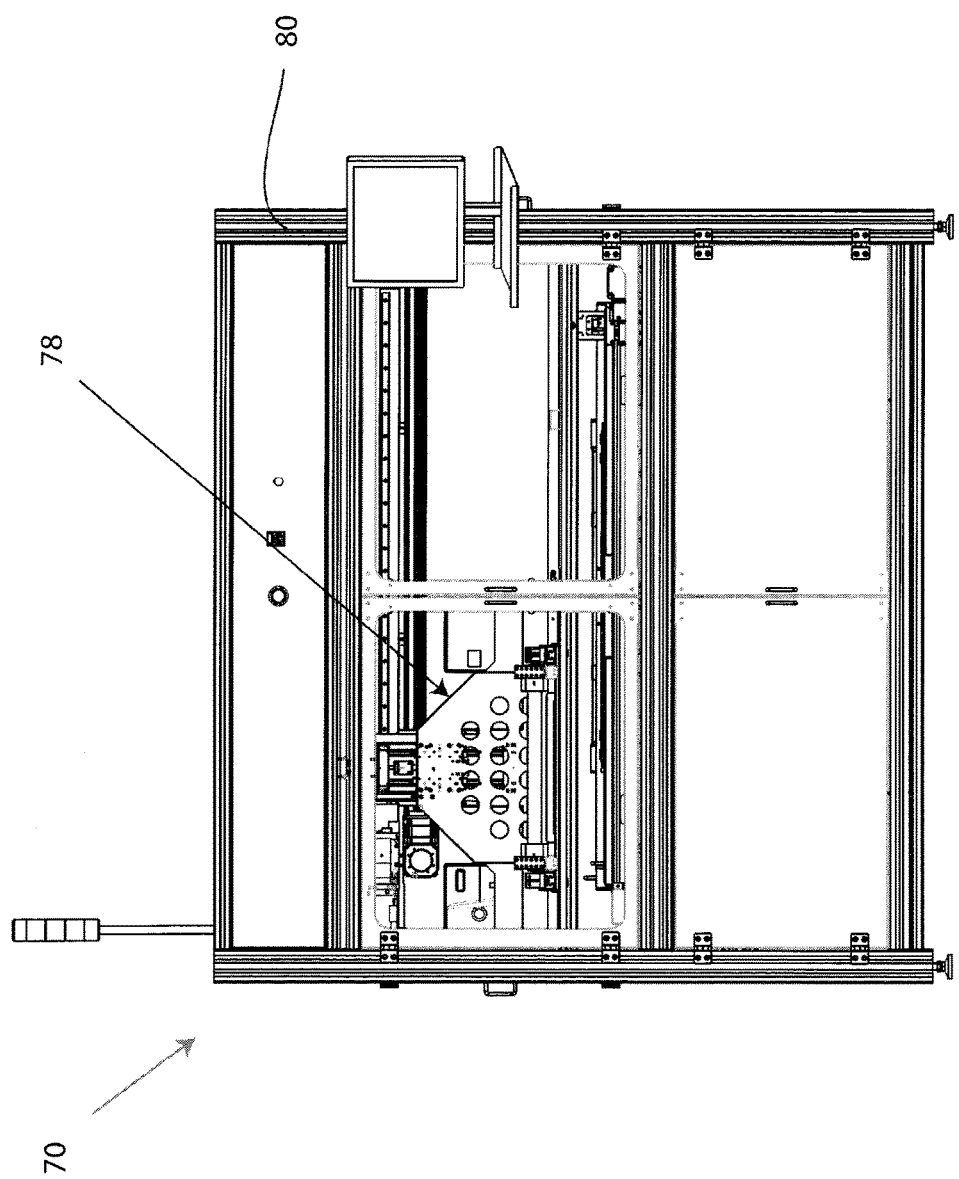
FIG. 14 depicts a front view of an embodiment of a third machine.
Figure 15:
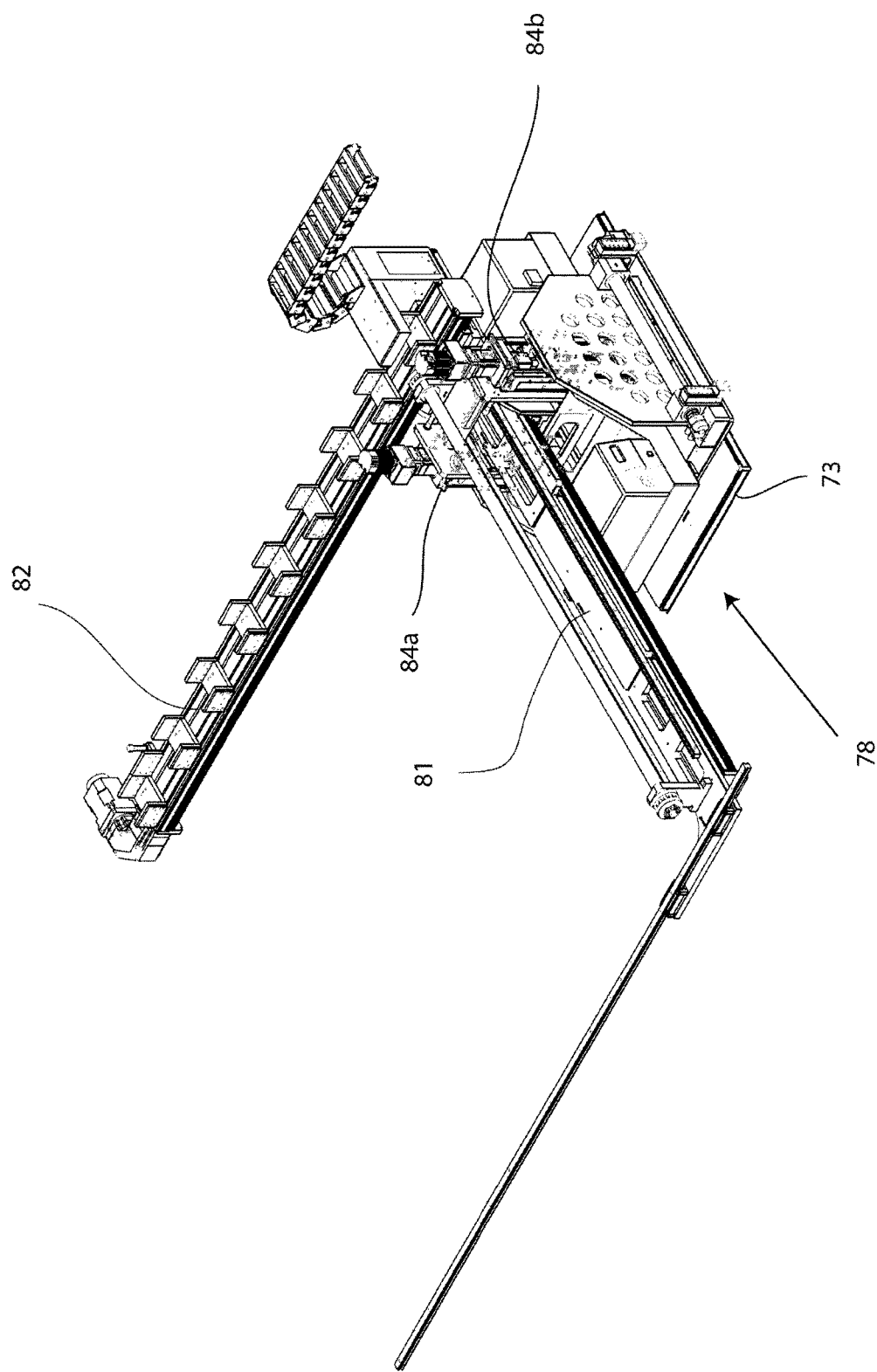
FIG. 15 depicts a perspective view of an embodiment of a third end effector.

Referring now to FIGS. 14 and 15, embodiments of a third machine 70 of system 100 may include a frame 80, an X axis actuator 81, a Y axis actuator 82, and a third end effector 78 having at least two independent Z actuators 84a, 84b. The third machine 70 may utilize a robotic platform to perform automated tasks with accuracy, precision, and repeatability. For example, the third machine 70 may be a Gantry robot having three principal axes (Cartesian coordinates) controlling linear motion, wherein the horizontal member(s) may be supported at both ends. The third machine 70 may also be any robotic manipulator such as a selective compliant assembly robot arm (SCARA) system, linear robot, multi-axis robot arm system, and the like. However, an embodiment of the third machine 70 will now be described as utilizing a Gantry robot for exemplary purposes. The third end effector 78 may refer to any device(s) attached to a X, Y, Z or other axis of movement to perform a variety of tasks, such as dispensing, picking and placing, routing, and the like. Embodiments of the third end effector 78 may be a robotic placement system/machine, as described infra. For instance, the third end effector 78 may move left and right along the Y axis by sliding along the Y axis actuator 82, and move back and forth along the X axis by sliding with the Y axis actuator 82 as it slides along the X axis actuator 81. Embodiments of the third end effector 78 may be comprised of a metal, such as stainless steel, or a combination of metal and composite materials, plastics, etc. Additionally, the third end effector 78 may move up and down on the Z axis by simultaneously actuating the first independent Z actuator 84a and the second independent Z actuator 84b. The X axis actuator 81, the Y axis actuator 82, and the first and second independent Z actuators 84a, 84b may be a ball screw slide, linear motion slide, a linear actuator, and the like. Moreover, the frame 80 may provide a structure surrounding the components of the third machine 70. The frame 80 may allow for panels to be attached providing an enclosure for the third machine 70. The panels attached to the frame 80 may be a combination of both solid panels and see-through panels, such as Plexiglas®, glass, plastic, and the like, to allow viewing of the operation of the third machine 70.

Embodiments of the third machine 70 may include at least one vacuum plate coupled to an underside assembly 72, or support assembly, a third end effector 78 including a height sensor 74 coupled to the third end effector 78, a pick and place plate 73 coupled to the third end effector 78, a vision system 59, and a conveyor system 90 for moving the first substrate 10 to the third machine 70, and for moving the bonded substrates to a cure oven, such as UV cure oven. As the first substrate 10 enters the third machine 70 on conveyor system 90, a vacuum plate coupled to an underside assembly 72 may be raised up to the first substrate 10. Alternatively, the first substrate 10 may be lowered to the vacuum plate coupled to the underside assembly 72. Other methods known to those skilled in the art may be used to place the first substrate 10 into physical contact with the vacuum plate. When the first substrate 10 is positioned above the vacuum plate, the vacuum plate may secure the first substrate 10 in a flat position and prevent translational movement, sliding, shifting, etc., of the first substrate 10. The underside assembly 72 of the third machine 70 may include one or more vacuum plates, depending on the size of the first substrate 10.

A second substrate 20 may enter system 100, in particular, the third machine 70 for optical bonding with the first substrate 10. The second substrate 20 may be manually loaded in a slide table proximate or otherwise near the third machine 70 to introduce the second substrate 20 into system 100. Alternatively, the loading of the second substrate 20 may be automated, such as a second conveyor system (e.g. conveyor belt). The location of the slide table for loading the second substrate 20 may correspond to the location of the pick and place plate 73 of the third end effector 78. For instance, the slide table may be positioned such that the second substrate 20 is loaded into the third machine 70 directly underneath or substantially underneath the pick and place plate 73 of the third end effector 78. In one embodiment, the slide table is positioned perpendicular to the third machine 70, wherein entry into the third machine 70 via slide table is proximate the third end effector 78. Once the second substrate 20 is loaded proximate the pick and place plate 73, the third end effector 78 may lower down to engage the second substrate 20 with the pick and place plate 73, wherein the pick and place plate 73 utilizes a vacuum force to secure (i.e. pick) the second substrate 20. Alternatively, the second substrate 20 may be raised to the pick and place plate 73; however, an automated or mechanical lift may be needed in addition to the manual loading, especially if the second substrate is a large sheet of glass. Accordingly, the third end effector 78 may be configured to pick the second substrate 20 via the pick and place plate 73, wherein the pick and place plate 73 is coupled to the third end effector 78.

Moreover, a height sensor 74 coupled to the third end effector 78 may be used to locate and monitor alignment the second substrate 20 as it enters the third machine 70. For example, the height sensor 74 may engage the second substrate 20 to locate and align the second substrate 20 with the pick and place plate 73. The height sensor 74 may probe the surface of the second substrate 20, and more specifically, the edges of the second substrate 20 to ensure proper engagement with the pick and place plate 73. Furthermore, the height sensor 74 may be used to probe the surface (to determine the height) of the first substrate 10 to locate the leading edge (i.e. rear edge 12) of the first substrate 10 and may determine the spatial location of the contact point between the second substrate 20 and the first substrate 10 (i.e. initial contact between the rear edge 12 of the first substrate 10 and the front edge 21 of the second substrate 20). Alternatively, the height sensor 74 may be used to probe the surface (to determine the height) of the first substrate 10 to locate at least one the rear edge 12 and the middle portion 13 of the first substrate 10 and may determine the spatial location of the contact point between the second substrate 20 and the first substrate 10 (i.e. initial contact between the middle portion 13 of the first substrate 10 and the middle portion 23 of the second substrate 20). In one embodiment, the height sensor 74 may be a contact/touch probe relying on physical interaction between a probe arm and the surface of the first substrate 10. In another embodiment, the height sensor 74 may be a laser probe which avoids physically contacting the surface of the first substrate 10.

Referring now to FIGS. 16A-19D, the third end effector 78 may be configured to pick and place a second substrate 20 onto the first substrate 10 and controllably lower the second substrate 20 onto the first substrate. As shown in FIG. 17D, the third end effector 78 may be configured to place a second substrate 20 onto the first substrate 10 at a placement angle, Ø, and controllably lower the second substrate 20 onto the first substrate 10, wherein an initial contact between the first and second substrate 10, 20 occurs proximate the rear edge 12 of the first substrate 10. As shown in FIG. 16D, the third end effector 78 may be configured to place the second substrate 10 onto the first substrate 10, wherein the second substrate 20 is parallel or substantially parallel to the first substrate 10 (i.e. controllably descend from position shown in FIG. 16D).

With reference to FIGS. 16A-16D, an embodiment of a third end effector 78 positioned a distance above an underside assembly 72 is shown. In this position, the third end effector 78 has picked the second substrate 10 and has moved into position proximate the first substrate 10, which may be secured to a vacuum plate. FIGS. 17A-17D show an embodiment of a third end effector 78 tilting to engage the first substrate 10 at an angle. Through simultaneous actuation of at least two independent Z axis actuators 84a, 84b, the third end effector 78 may move up and down along a Z axis to descend towards the first substrate 10 (or ascend away from the first substrate 10). Through independent actuation of at least two Z-axis actuators 84a, 84b, the third end effector 78 may be able to tilt to achieve the desired angle of placement in embodiments where the contact between the first substrate 10 and the second substrate 20 is not parallel. Because the pick and place plate 73 is coupled to the third end effector 78, the pick and place plate 73 may also tilt according to the movement of the third end effector 78. Likewise, because the second substrate 20 is secured to the pick and place plate 73, the second substrate 20 may also tilt according to the movements of the third end effector 78. Therefore, the initial contact between the first substrate 10 and the second substrate 20 may be proximate the rear edge 12 of the first substrate 10, at an angle of placement, Ø, between 0° and 20°. However, the angle of placement may be larger than 20° if required, and the capabilities of the two independent Z-axis actuators 84a, 84b may be adjusted accordingly.

Once the second substrate 20 has initially engaged the first substrate 10, the third end effector 78 may controllably lower the second substrate 20 onto the first substrate 10, as shown in FIGS. 18A-18D. For instance, from the initial point of contact, the second substrate 20 may be lowered at a calculated speed/velocity and angle. Controllably lowering the second substrate 20 onto the first substrate 10 may be gradual or proportional as the second substrate 20 is placed onto the first substrate 10. In other embodiments, controllably lowering the second substrate 20 onto the first substrate 10 may mean that the speed of placement may vary according to requirements/specifications of the substrates 10, 20 and/or fill material 5 being used. For example, as the angle between the second substrate 20 and the first substrate 10 decreases and nears zero degrees, the second substrate 20 may be controllably slowed to allow proper contact between the second substrate 20 and the first substrate 10, and to control flow of fill material 5. Generally, the speed of placement is slow to avoid disrupting the fill material 5 and inviting air bubbles to form between the substrates 10, 20 during the bonding process. Alternatively, controllably lowering the second substrate 20 onto the first substrate 10 may include a controlled descent of the third end effector 78 while the second substrate 20 is operably attached to the third end effector 78 at an angle parallel to the first substrate 10.

Figure 17B:
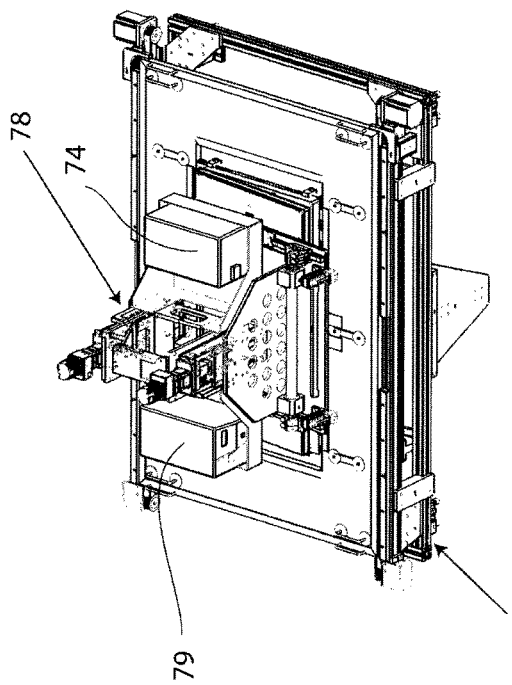
FIG. 17B depicts a perspective view of an embodiment of the third end effector at initial contact with the first substrate.
Figure 17D:
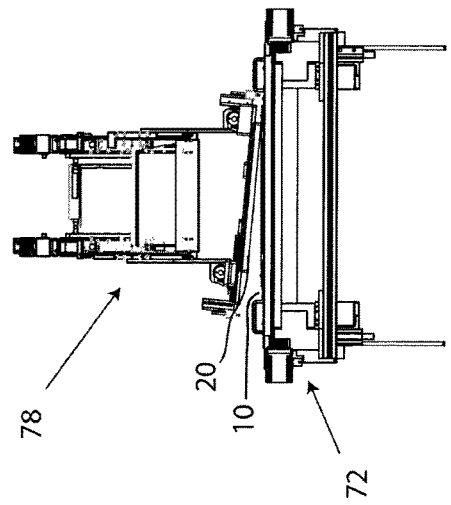
FIG. 17D depicts a side view of an embodiment of the third end effector at initial contact with the first substrate.
Figure 17A:
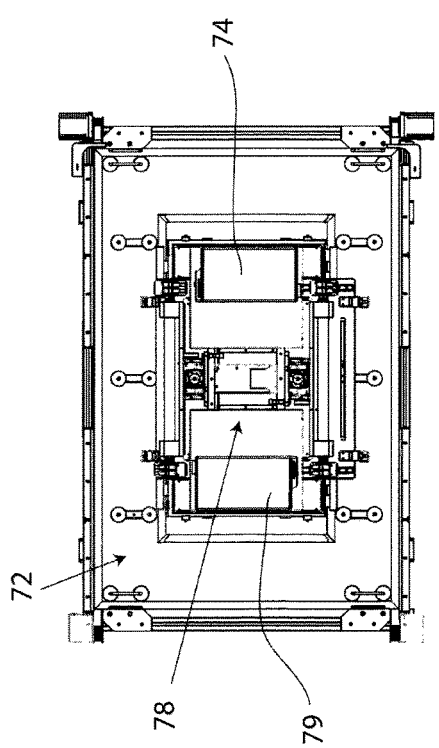
FIG. 17A depicts a top view of an embodiment of the third end effector at initial contact with the first substrate.
Figure 17C:
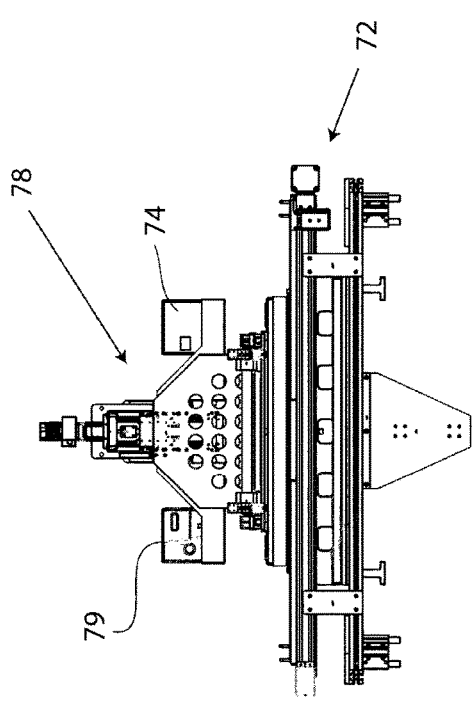
FIG. 17C depicts a front view of an embodiment of the third end effector at initial contact with the first substrate.
Figure 18B:
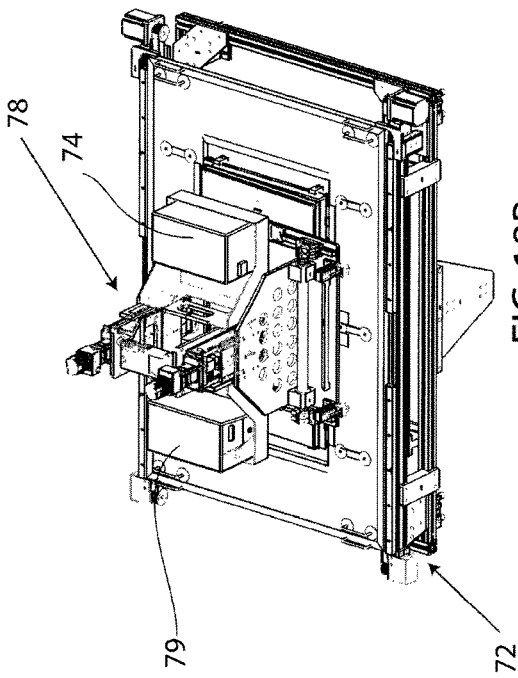
FIG. 18B depicts a perspective view of an embodiment of the third end effector lowering at an angle onto the first substrate.
Figure 18D:
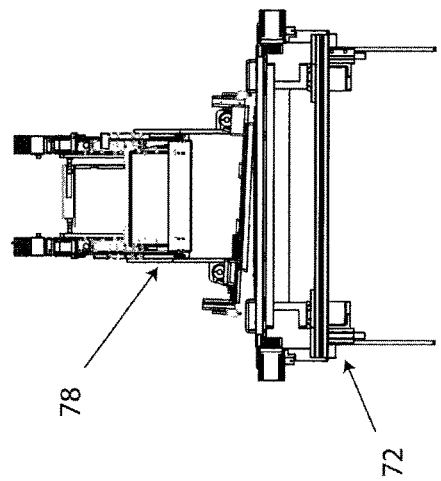
FIG. 18D depicts a side view of an embodiment of the third end effector lowering at an angle onto the first substrate.
Figure 18A:
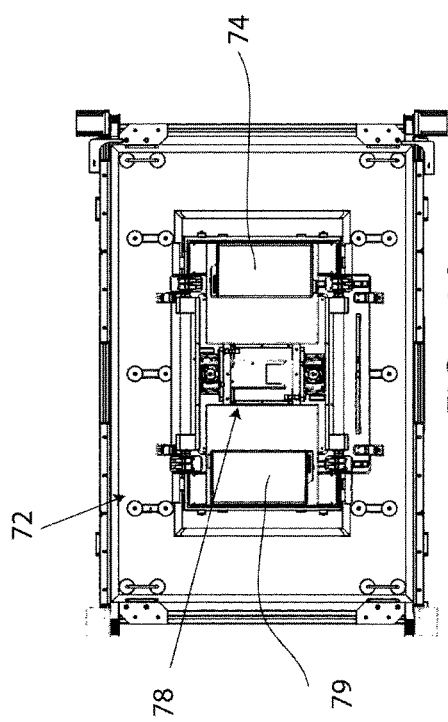
FIG. 18A depicts a top view of an embodiment of the third end effector lowering at an angle onto the first substrate.
Figure 18C:
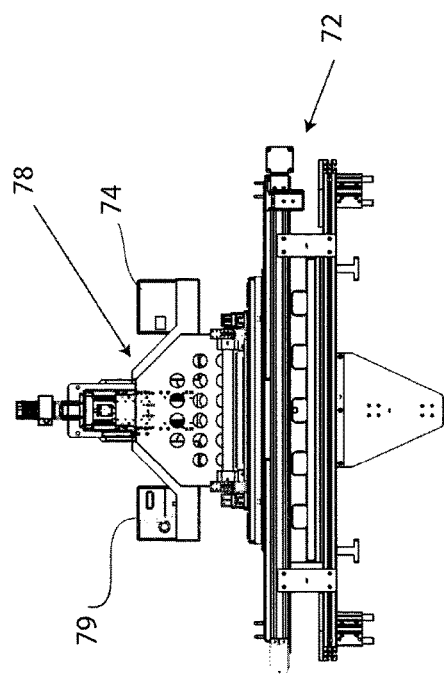
FIG. 18C depicts a front view of an embodiment of the third end effector lowering at an angle onto the first substrate.
Figure 20A:
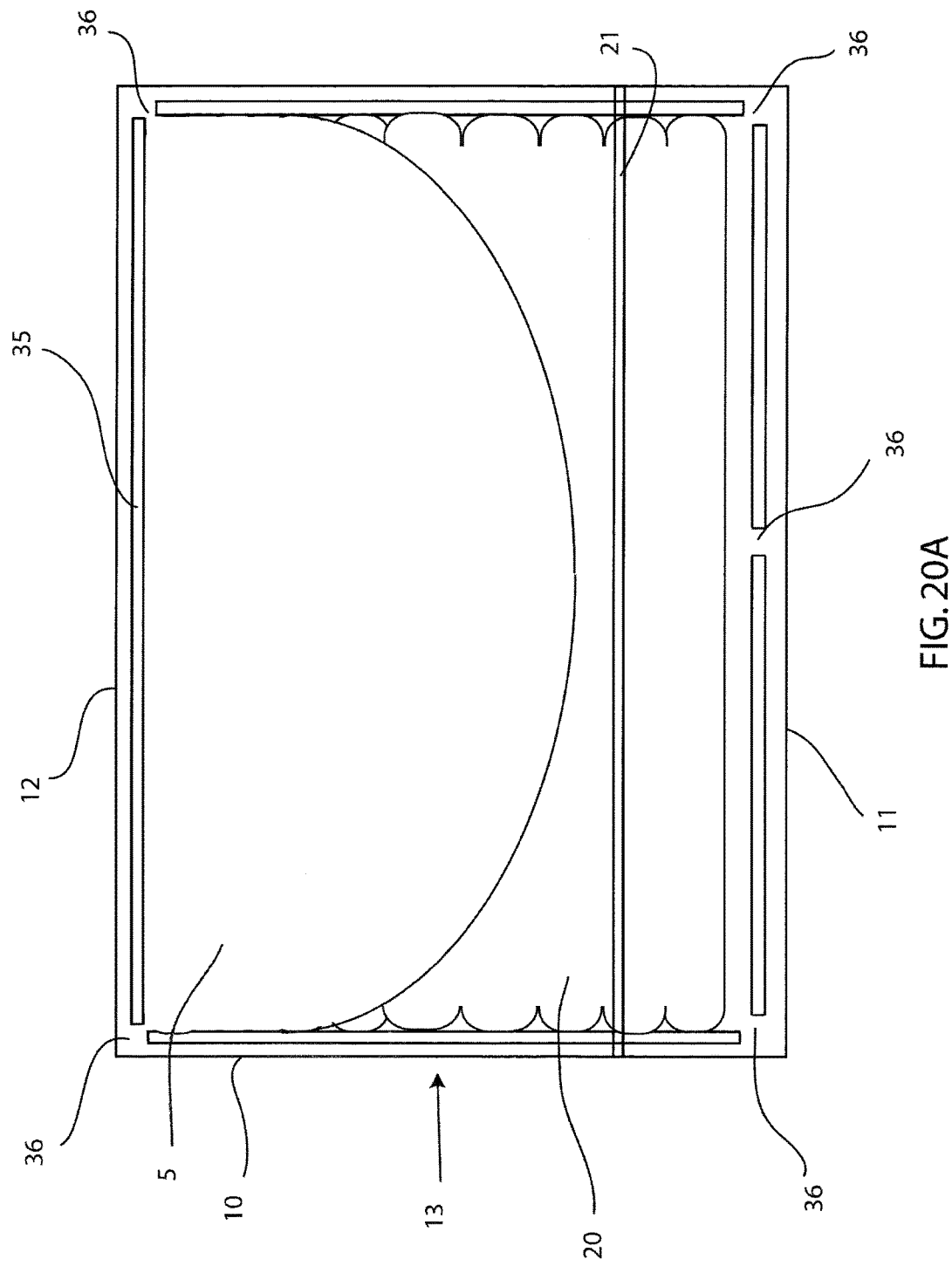
FIG. 20A depicts a top view of a first embodiment of a second substrate lowering onto the first substrate causing a capillary effect on the fill material.

Moreover, controllably lowering the second substrate 20 onto the first substrate 10 may force the fill material 5 to create a capillary or wave effect as it flows across the surface of the first substrate 10 and/or second substrate 20, as shown in FIG. 20A. In a first embodiment, air bubbles, formations, pockets, etc., may be prevented or eliminated because at the initial point of contact between the rear edge 12 of the first substrate 10 and the front edge 21 of the second substrate 20, the second substrate 20 may immediately contact the fill material 5. Contact with the fill material 5 may be ensured because the largest fill height, h, is proximate the rear edge 12 of the first substrate 10. Thus, the fill height, h, proximate the rear edge 12 of the first substrate 10 may equal the height necessary to make immediate contact with the second substrate 20 as the third end effector 78 places the second substrate 20 into an initial contact position, as shown in FIG. 17D. As the second substrate 20 is controllably lowered onto the first substrate 10, the fill material 5 may immediately begin flowing outward and towards the front edge 11 of the first substrate 10. The varying (or declining fill height, h, from rear edge 12 to front edge 11) fill height, h, across the surface of the first substrate 10 may allow the smooth, wavelike flow of the fill material 5, and may avoid overflow over the dam or fill material 5 passing through the vents 36 in unnecessary excess.

In a second embodiment, air bubbles, formations, pockets, etc., may be prevented or eliminated because at the initial point of contact between the first substrate 10 and the second substrate 20, the second substrate 20 may immediately contact the fill material 5 at a middle portion 13, 23 of the substrates 10, 20. Contact with the fill material 5 may be ensured because the largest fill height, h, is proximate or otherwise near the middle portion 13 of the first substrate 10. Thus, the fill height, h, proximate the middle portion 13 of the first substrate 10 may equal the height necessary to make immediate contact with the second substrate 20 as the third end effector 78 places the second substrate 20 into an initial contact position, as shown in FIG. 16D. As the second substrate 20 is controllably lowered onto the first substrate 10, the fill material 5 may immediately begin flowing outwards towards the front edge 11 and rear edge 12, the edges, of the first substrate 10. The varying (or declining fill height, h, from the middle portion 13 to the front edge 11 in one direction and to the rear edge 12 in an opposite direction) fill height, h, across the surface of the first substrate 10 may allow the smooth, wavelike flow of the fill material 5, and may avoid overflow over the dam or fill material 5 passing through the vents 36 in unnecessary excess.

Accordingly, the capillary effect, or wavelike flow, of the fill material 5 may prevent and eliminate the formation of air pockets during the bonding process, regardless of the size of the substrates 10, 20, as shown in FIG. 20B. The third end effector 78 may controllably lower the second substrate 20 onto the first substrate 10 until the first and second substrates 10, 20 are bonded, as shown in FIGS. 19A-19D. In other words, the third end effector 78 may lower the second substrate 20 onto the first substrate 10 until the angle between the first substrate 10 and the second substrate 20 is 0° (i.e. flat), or until no space exists between the first and second substrates 10, 20.

Further embodiments of the third machine 70 of system 100 may include a vision system 79 coupled to the third end effector 78 and a heating system. The vision system 79 may be a camera or other suitable vision system capable of detecting the orientation, location, position, etc. of parts, such as the first substrate 10 and the second substrate 20, within the third machine 70. Moreover, the heating system may include a heated valve(s) or other device for applying heat to the first and second substrates 10, 20.

Figure 21:
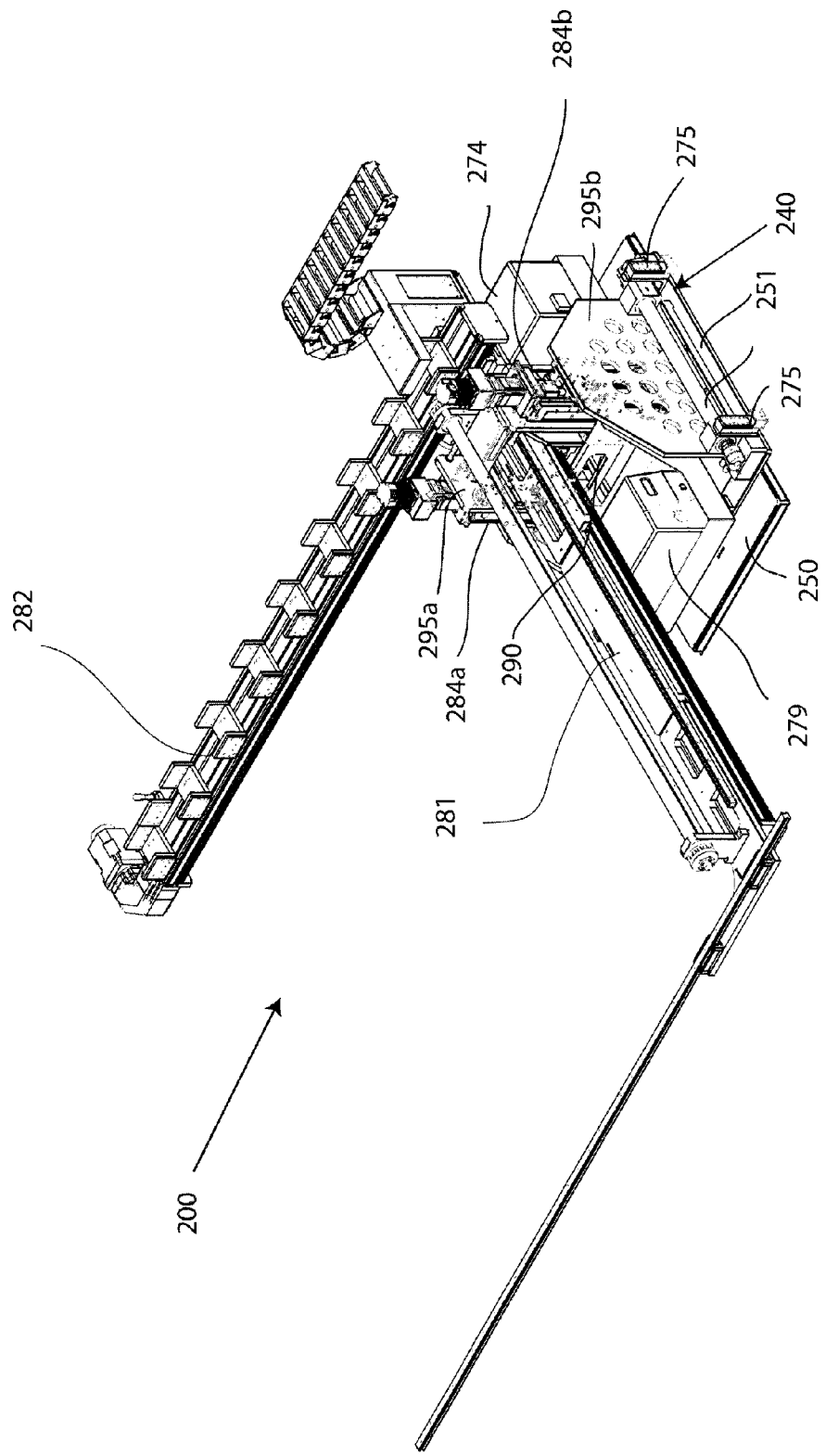
FIG. 21 depicts a perspective view of an embodiment of a robotic placement machine.
Figure 22:
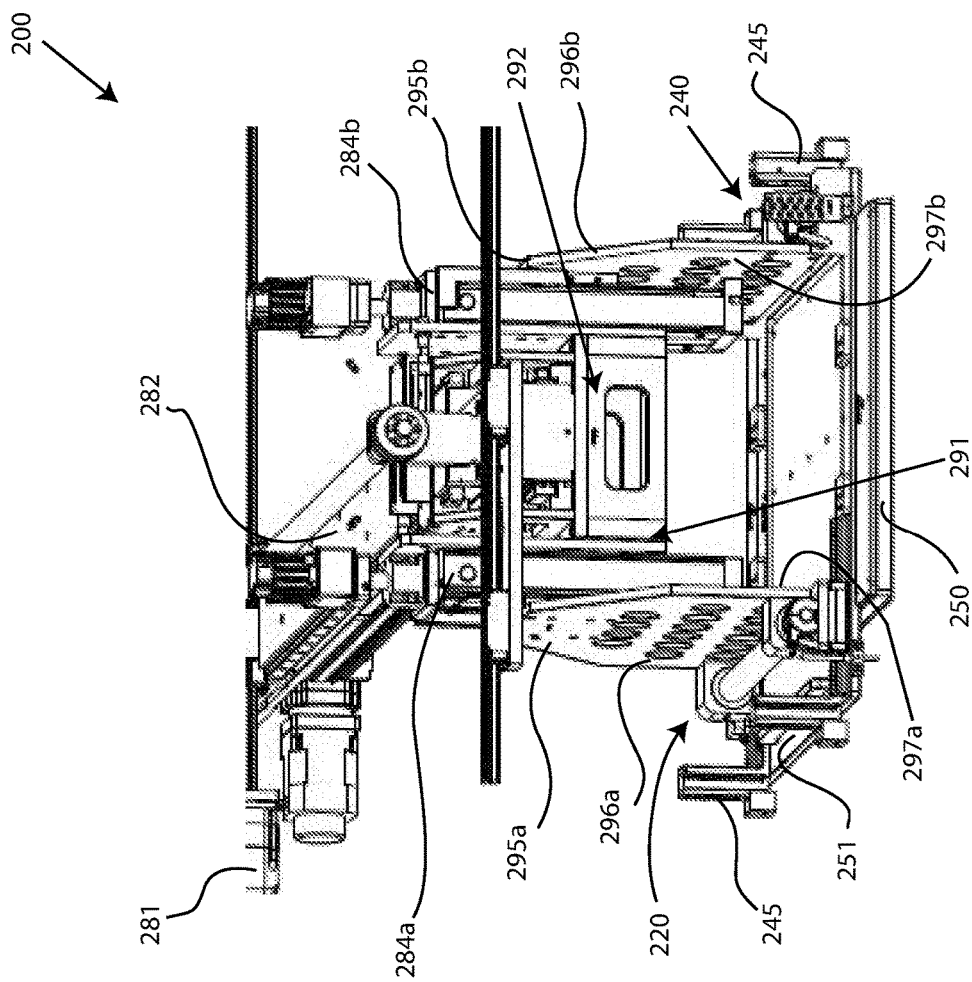
FIG. 22 depicts a perspective view of an embodiment of the robotic placement machine, wherein the pick and place plate is in a horizontal position.
Figure 23:
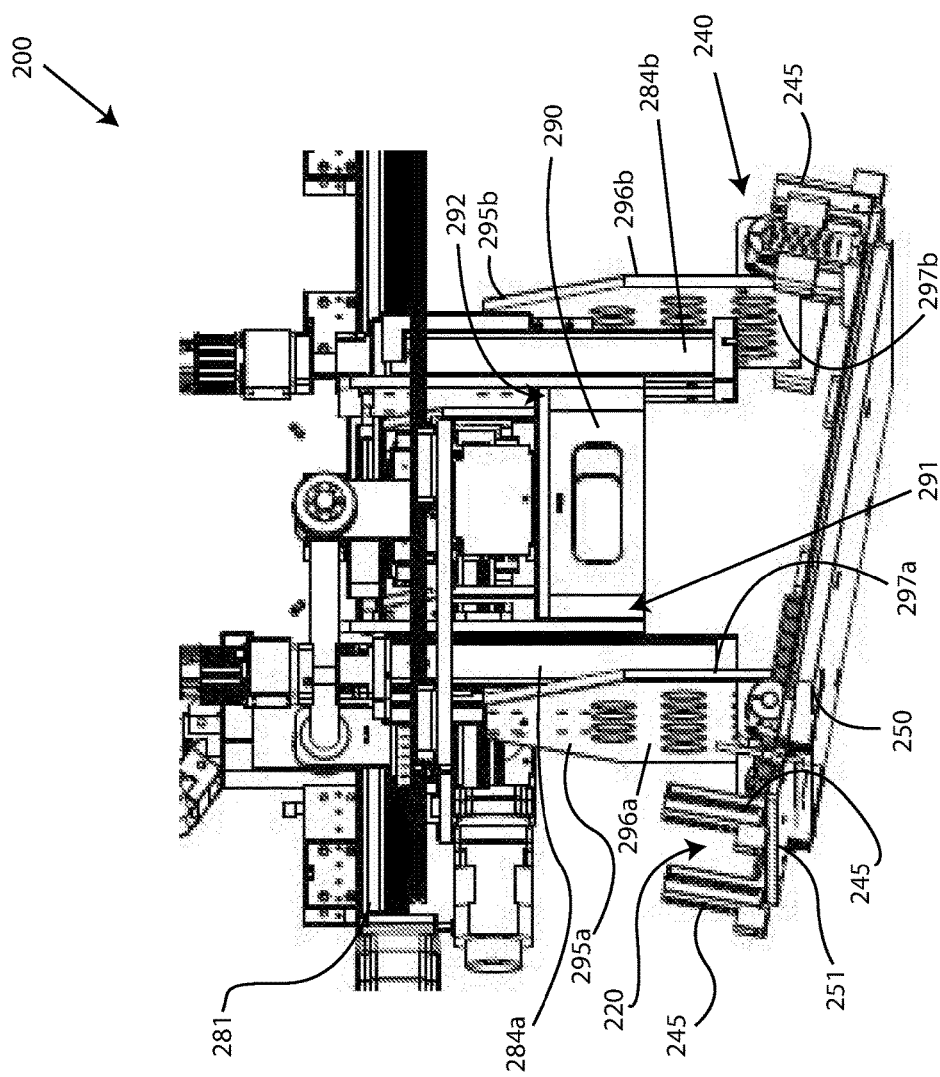
FIG. 23 depicts a perspective view of an embodiment of the robotic placement machine, wherein the pick and place plate is in a tilted position.
Figure 24:
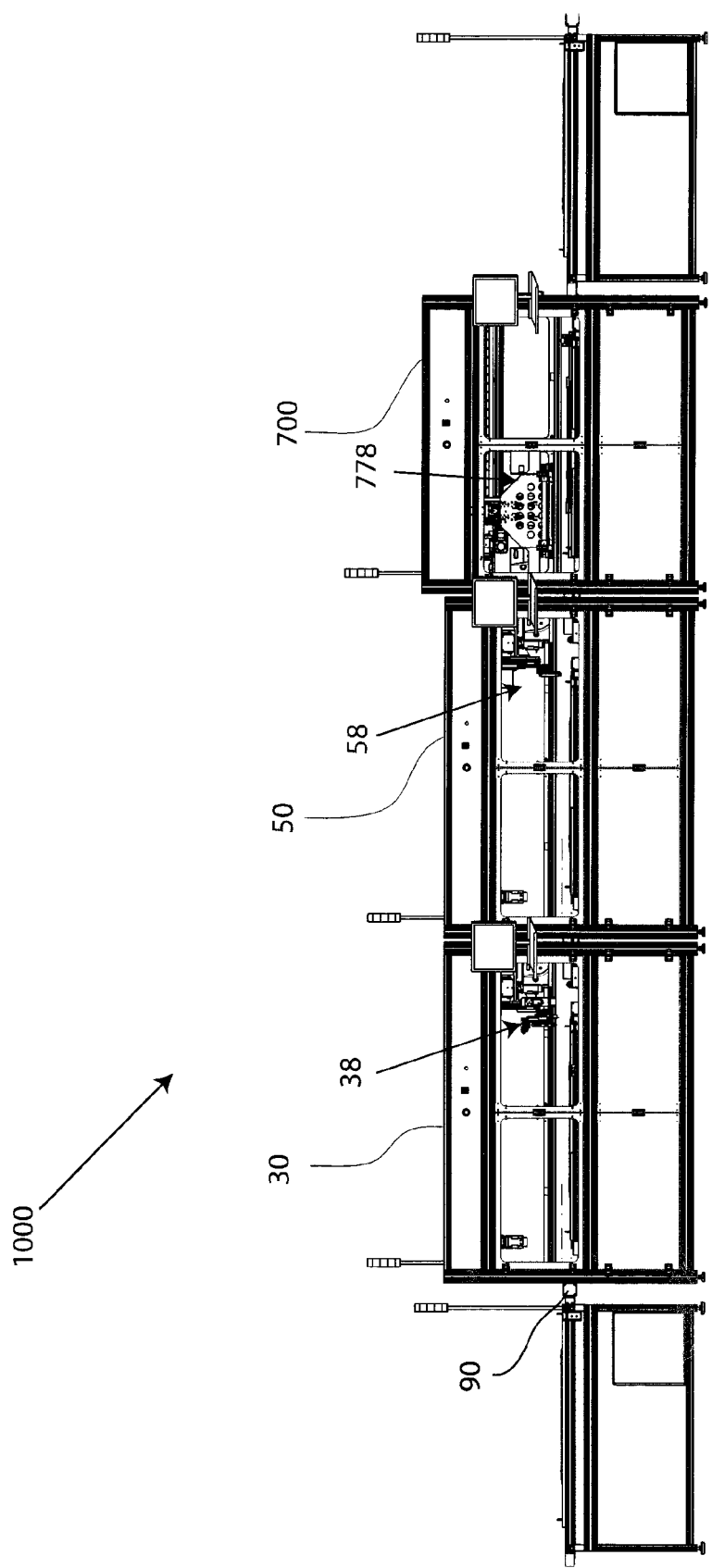
FIG. 24 depicts a front view of an embodiment of a system having an embodiment of more than one machine.

Referring now to FIGS. 21-23, an embodiment of a robotic placement machine 200 is shown. The robotic placement machine 200 may be used to place a first substrate 10, including a transparent substrate, onto a second substrate 20. Generally, robotic placement machine 200 is used for optical bonding and similar glass lamination methods and systems. The robotic placement machine 200 may be configured to attach to a robotic platform capable of performing automated tasks with accuracy, precision, and repeatability. For example, robotic placement machine 200 may be attached to a Gantry robot, or other robotic manipulator such as a selective compliant assembly robot arm (SCARA) system, linear robot, multi-axis robot arm system, and the like. Furthermore, the robotic placement machine 200 may move left and right along the Y axis by sliding along the Y axis actuator 282, and move back and forth along the X axis by sliding with the Y axis actuator 282 as it slides along the X axis actuator 281. The X axis actuator 281 may be interchangeable with the Y axis actuator 282. The X axis actuator 81 and the Y axis actuator 82 may be a ball screw slide, linear motion slide, a linear actuator, and the like. Embodiments of the robotic placement machine 200 may be comprised of a metal, such as stainless steel, or a combination of metal and composite materials, plastics, etc.

Embodiments of the robotic placement machine 200 may further include a base 290 operably connected to the Y axis actuator 282, at least two independent Z actuators 284a, 284b, at least two mounting plates 295a, 295b, at least two bearing systems 220, 240, a pick and place plate 250, an underside 251, at least one UV wand 275, a height sensor 274, and a vision system 279. Further embodiments of the robotic placement machine 200 may be configured to attach, or may have, a Y-axis actuator 282 for moving left and right along an Y axis and a X-axis actuator 281 for moving back and forth along an X axis, and a base 290 operably connectable to at least one of the Y-axis actuator 281 and the X-axis actuator 281, the base 290 having a first end 291 and a second end 291, a first Z axis actuator 284a coupled to the first end 291 of the base 290, the first Z-axis actuator 284a capable of moving up and down a first Z axis, a second Z axis actuator 284b coupled to the second end 292 of the base 290, the second Z axis actuator 284b capable of moving up and down a second Z axis, and a pick and place plate 250 operably connected to the first Z axis actuator 284a and the second Z axis actuator 284b, wherein the first Z axis actuator 284a and the second Z axis actuator 284b are each capable of moving independently of each other to tilt the pick and place plate 250.

Referring still to FIGS. 21-23, embodiments of a robotic placement machine 200 may include a base 290 operably connected to the Y axis actuator 282. The base 290 may be directly or indirectly connected to the Y axis actuator 282. The base 290 may be rigidly fixed to the Y axis actuator 282 or dynamically coupled to the Y axis actuator 282. Alternatively, the base 290 may be suspended from the Y axis actuator 282. The base 290 may be a single structural component or a combination of structural components formed by rigid materials or by a combination of rigid and flexible materials that may provide structural integrity to the robotic placement machine 200. The base 290 may have a first end 291 and a second end 292. The first Z axis actuator 284a may be coupled to the first end 291 of the base 290.

Similarly, the second Z axis actuator 284*b* may be coupled to the second end 292 of the base 290. Embodiments of the first and second Z axis actuators 284*a*, 284*b* may be a ball screw slide, linear motion slide, a linear actuator, and the like. The first Z-axis actuator 284*a* may operate independently of the second Z-axis actuator 284*b*, but may function in unison as required. Accordingly, each Z axis actuator 284*a*, 284*b* may be actuated at different times, different speeds, etc. Thus, the first Z axis actuator 284*a* and the second Z axis actuator 284*b* are each capable of moving independently of each other to tilt the pick and place plate 250, and return the pick and place plate 250 back to a horizontal or substantially horizontal position.

Through simultaneous actuation of the first and second Z axis actuators 284*a*, 284*b*, the robotic placement machine 200 may move up and down, while keeping the pick and place plate 250 horizontal or substantially horizontal. Additionally, simultaneous actuation of the first and second Z axis actuators 284*a*, 284*b* may move the robotic placement machine 200 up and down, while the pick and place plate 250 is tilted at an angle, maintaining the tilt angle during movement. Through independent actuation of the first and second Z axis actuators 284*a*, 284*b*, the robotic placement machine 200 may move or tilt the pick and place plate 250 from 0° to 20° with respect to a horizontal position. In some embodiments, independent actuation of the first and second Z axis actuators 284*a*, 284*b* may achieve tilt of the pick and place plate 250 and movement up and down along a Z axis.

Embodiments of robotic placement machine 200 may also include a first mounting plate 295*a* coupled to the first Z-axis actuator 284*a*, wherein the first Z-axis actuator 284*a* is coupled to a second surface 297*a* of the mounting plate 295*a*. Similarly, embodiments of robotic placement machine 200 may include a second mounting plate 295*b* coupled to the second Z-axis actuator 284*b*, wherein the second Z-axis actuator 284*b* is coupled to a second surface 297*b* of the second mounting plate 295*b*. A mounting plate, such as mounting plates 295*a*, 295*b* may be any component(s), rigid or otherwise, that may be used to connect, secure, attach, etc., the first and second Z axis actuator 284*a*, 284*b* to a first and second bearing system 220, 240, respectively. For instance, a first bearing system 220 may be coupled to a first surface 296*a* of the first mounting plate 295*a*. Similarly, a second bearing system 240 may be coupled to a first surface 296*b* of the second mounting plate 295*b*. The operable communication between the first and second Z-axis actuators 284*a*, 284*b* may allow the robotic placement machine 200 to tilt as a single unit. In other words, the first and second bearing systems 220, 240 may mechanically allow and/or facilitate the tilt of the pick and place plate 250. Furthermore, first and second bearing systems 220, 240 may improve the efficiency and reduce the friction resulting from the actuation of the first and second Z axis actuators 284*a*, 284*b*. Embodiments of the first and second bearing systems 220, 240 may include a bearing fitted within a housing fastened to the underside, capable of supporting a shaft to facilitate the tilt of the pick and place plate 250. Those skilled in the requisite art should appreciate that other bearing systems may be employed to facilitate the tilting of the robotic placement machine 200, and should not be limited to the embodiments disclosed herein.

Moreover, the first and second bearing systems 220, 240 may also be coupled to an underside 251 or support substrate of the robotic placement machine 200. The underside 251 may be coupled, or in mechanical communication with a pick and place plate 250. In some embodiments, the robotic placement machine 200 may include more than one pick and place plate 250 coupled to the underside 251. The pick and place plate 250 may be configured to pick, secure, grab, attach to, etc. a transparent substrate, such as second substrate 10. The pick and place plate 250 may be a vacuum plate configured to lock onto a substrate for controllable placement onto another substrate, such as first substrate 10.

Further embodiments of robotic placement machine 200 may include at least one UV wand 275 positioned on the underside 251. The UV wands 245 may have the same structure and function of UV wand 45, described supra. Embodiments of robotic placement machine 200 may include a plurality of UV wands 245 positioned proximate the edges of the underside 251 at locations where vents, such as vents 36, may exist on a dam, such as dam 35, wherein the dam is along a perimeter of a substrate configured to be bonded to another substrate placed by robotic placement machine 200. The UV wands 245 may stabilize UV material used as dam and/or fill material, and may function when the robotic placement machine 200 has placed a substrate onto another substrate having a dam, wherein the bonding may disrupt the dam material. Embodiments of robotic placement machine 200 may also include a height sensor 274 to detect a surface height of a substrate. Height sensor 274 may share the same function and structure as height sensor 74, described supra. Further embodiments of robotic placement machine 200 may include a vision system 279 to detect an orientation of components associated with the robotic placement machine 200. The vision system 279 may share the same function and structure as vision system 79, described supra.

With reference to FIGS. 1-23, a first method of optical bonding is now described. The method of optical bonding may include the steps of dispensing a fill material 5 across a surface of the first substrate 10 to achieve a largest fill height, h, proximate a rear edge 12 of the first substrate 10 and a lowest fill height, h, proximate a front edge 11 of the first substrate 10, placing a second substrate 20 into contact with the fill material 5 proximate the rear edge 12 of the first substrate 10 at an angle relative to the first substrate 10, and controllably lowering the second substrate 20 onto the first substrate 10 until the second substrate 20 is bonded to the first substrate 10 to prevent and eliminate air bubbles between the first and second substrates 10, 20. Further steps may include tracing providing a first substrate 10, dispensing dam material around a perimeter of the first substrate 10 to form a dam 35 (although some embodiments of the method may not include forming a dam; the frame may act as a dam), the dam material with a UV wand 45 to stabilize the dam material, treating the surface of the first substrate 10 with a treatment head 53 prior to dispensing fill material 5 onto the surface of the first substrate 10, locating and aligning the second substrate 20 for placement onto first substrate 10, locating the rear edge 12 of the first substrate 10 with a height sensor 74, and placing the bonded substrates into a cure oven.

Referring again to FIGS. 1-23, a second method of optical bonding is now described. The method of optical bonding may include the steps of dispensing a fill material 5 across a surface of the first substrate 10 to achieve a largest fill height, h, proximate a middle portion 13 of the first substrate 10, placing a second substrate 20 into contact with the fill material 5 proximate the middle portion 13 of the first substrate 10 substantially parallel or parallel to the first substrate 10, and controllably lowering the second substrate 20 onto the first substrate 10 until the second substrate 20 is bonded to the first substrate 10 to prevent and eliminate air bubbles between the first and second substrates 10, 20.

Further steps may include tracing providing a first substrate 10, dispensing dam material around a perimeter of the first substrate 10 to form a dam 35 (although some embodiments of the method may not include forming a dam; the frame may act as a dam), the dam material with a UV wand 45 to stabilize the dam material, treating the surface of the first substrate 10 with a treatment head 53 prior to dispensing fill material 5 onto the surface of the first substrate 10, locating and aligning the second substrate 20 for placement onto first substrate 10, locating a rear edge 12 of the first substrate 10 with a height sensor 74, and placing the bonded substrates into a cure oven.

With continued reference to the drawings, FIGS. 24-26B depict an embodiment of a machine 700 as a part of system 1000. Embodiments of system 1000 may include first machine 30, second machine 50, and machine 700. Embodiments of machine 700 may include a frame 780, an X axis actuator 781, a Y axis actuator 782, and an end effector 778 having at least two independent Z actuators 784a, 784b. The machine 700 may utilize a robotic platform to perform automated tasks with accuracy, precision, and repeatability. For example, the machine 700 may be a Gantry robot having three principal axes (Cartesian coordinates) controlling linear motion, wherein the horizontal member(s) may be supported at both ends. The machine 700 may also be any robotic manipulator such as a selective compliant assembly robot arm (SCARA) system, linear robot, multi-axis robot arm system, and the like. However, an embodiment of the machine 700 will now be described as utilizing a Gantry robot for exemplary purposes. The end effector 778 may refer to any device(s) attached to a X, Y, Z or other axis of movement to perform a variety of tasks, such as dispensing, picking and placing, routing, and the like. Embodiments of the end effector 778 may be a robotic placement system/machine, such as robotic placement machine 200 described supra. For instance, the end effector 778 may move left and right along the Y axis by sliding along the Y axis actuator 782, and move back and forth along the X axis by sliding with the Y axis actuator 782 as it slides along the X axis actuator 781. Embodiments of the end effector 778 may be comprised of a metal, such as stainless steel, or a combination of metal and composite materials, plastics, etc. Additionally, the end effector 778 may move up and down on the Z axis by simultaneously actuating the first independent Z actuator 784a and the second independent Z actuator 784b. The X axis actuator 781, the Y axis actuator 782, and the first and second independent Z actuators 784a, 784b may be a ball screw slide, linear motion slide, a linear actuator, and the like. Moreover, the frame 780 may provide a structure surrounding the components of the machine 700. The frame 780 may allow for panels to be attached providing an enclosure for the machine 700. The panels attached to the frame 780 may be a combination of both solid panels and see-through panels, such as Plexiglas®, glass, plastic, and the like, to allow viewing of the operation of the machine 700.

Embodiments of machine 700 may share the same structural and functional aspects of the third machine 70, as described supra. For example, the machine 700 may be operably connected to the first machine 30 and second machine 50 through a conveyor system, and may be configured to pick and place a second substrate into a bonding engagement with the first substrate 10. However, embodiments of machine 700 may also include an adhesive application valve 600, wherein the adhesive application valve 600 is configured to apply an amount of adhesive onto the second substrate 20 prior to being placed into a bonding engagement with the first substrate 10. The adhesive application valve 600, described in greater detail infra, may be disposed inside or outside the frame 780 of the machine 700, such that the adhesive application valve 600 is proximate the machine 700 and/or located sufficiently close for the end effector 778, or robotic placement machine 200, to facilitate the application of adhesive onto the second substrate 20.

With continued reference to FIGS. 24-26B, and additional reference to FIGS. 27A-27D, similar to the third machine 70, embodiments of machine 700 may include at least one vacuum plate coupled to an underside assembly 772, or support assembly, an end effector 778 including a height sensor 774 coupled to the end effector 778, a pick and place plate 773 coupled to the end effector 778, a vision system 759, and a conveyor system 90 for moving the first substrate 10 to the machine 700, and for moving the bonded substrates to a cure oven, such as UV cure oven. As the first substrate 10 enters the machine 700 on conveyor system 90, a vacuum plate coupled to an underside assembly 772 may be raised up to the first substrate 10. Alternatively, the first substrate 10 may be lowered to the vacuum plate coupled to the underside assembly 772. Other methods known to those skilled in the art may be used to place the first substrate 10 into physical contact with the vacuum plate. When the first substrate 10 is positioned above the vacuum plate, the vacuum plate may secure the first substrate 10 in a flat position and prevent translational movement, sliding, shifting, etc., of the first substrate 10. The underside assembly 772 of the machine 700 may include one or more vacuum plates, depending on the size of the first substrate 10.

A second substrate 20 may enter machine 700 for optical bonding with the first substrate 10. The second substrate 20 may be manually loaded in a slide table proximate or otherwise near the machine 700 to introduce the second substrate 20 into system 1000. Alternatively, the loading of the second substrate 20 may be automated, such as a second conveyor system (e.g. conveyor belt). The location of the slide table for loading the second substrate 20 may correspond to the location of the pick and place plate 773 of the end effector 778, or robotic placement machine 200. For instance, the slide table may be positioned such that the second substrate 20 is loaded into the machine 700 directly underneath or substantially underneath the pick and place plate 773 of the end effector 778. In one embodiment, the slide table is positioned perpendicular to the machine 700, wherein entry into the machine 700 via slide table is proximate the end effector 778. Once the second substrate 20 is loaded proximate the pick and place plate 773, the end effector 778 may lower down to engage the second substrate 20 with the pick and place plate 773, wherein the pick and place plate 773 utilizes a vacuum force to secure (i.e. pick) the second substrate 20. Alternatively, the second substrate 20 may be raised to the pick and place plate 773. However, an automated or mechanical lift may be needed in addition to the manual loading, especially if the second substrate is a large sheet of glass. Accordingly, the end effector 778 may be configured to pick the second substrate 20 via the pick and place plate 773, wherein the pick and place plate 773 is coupled to the end effector 778.

Moreover, a height sensor 774 coupled to the end effector 778 may be used to locate and monitor alignment the second substrate 20 as it enters the machine 700. For example, the height sensor 774 may engage the second substrate 20 to locate and align the second substrate 20 with the pick and place plate 773. The height sensor 774 may probe the surface of the second substrate 20, and more specifically, the edges of the second substrate 20 to ensure proper engagement with the pick and place plate 773. Furthermore, the height sensor 774 may be used to probe the surface (to determine the height) of the first substrate 10 to locate the leading edge (i.e. rear edge 12) of the first substrate 10 and may determine the spatial location of the contact point between the second substrate 20 and the first substrate 10 (i.e. initial contact between the rear edge 12 of the first substrate 10 and the front edge 21 of the second substrate 20). Alternatively, the height sensor 774 may be used to probe the surface (to determine the height) of the first substrate 10 to locate at least one the rear edge 12 and the middle portion 13 of the first substrate 10 and may determine the spatial location of the contact point between the second substrate 20 and the first substrate 10 (i.e. initial contact between the middle portion 13 of the first substrate 10 and the middle portion 23 of the second substrate 20). In one embodiment, the height sensor 774 may be a contact/touch probe relying on physical interaction between a probe arm and the surface of the first substrate 10. In another embodiment, the height sensor 774 may be a laser probe which avoids physically contacting the surface of the first substrate 10.

Figure 28A:
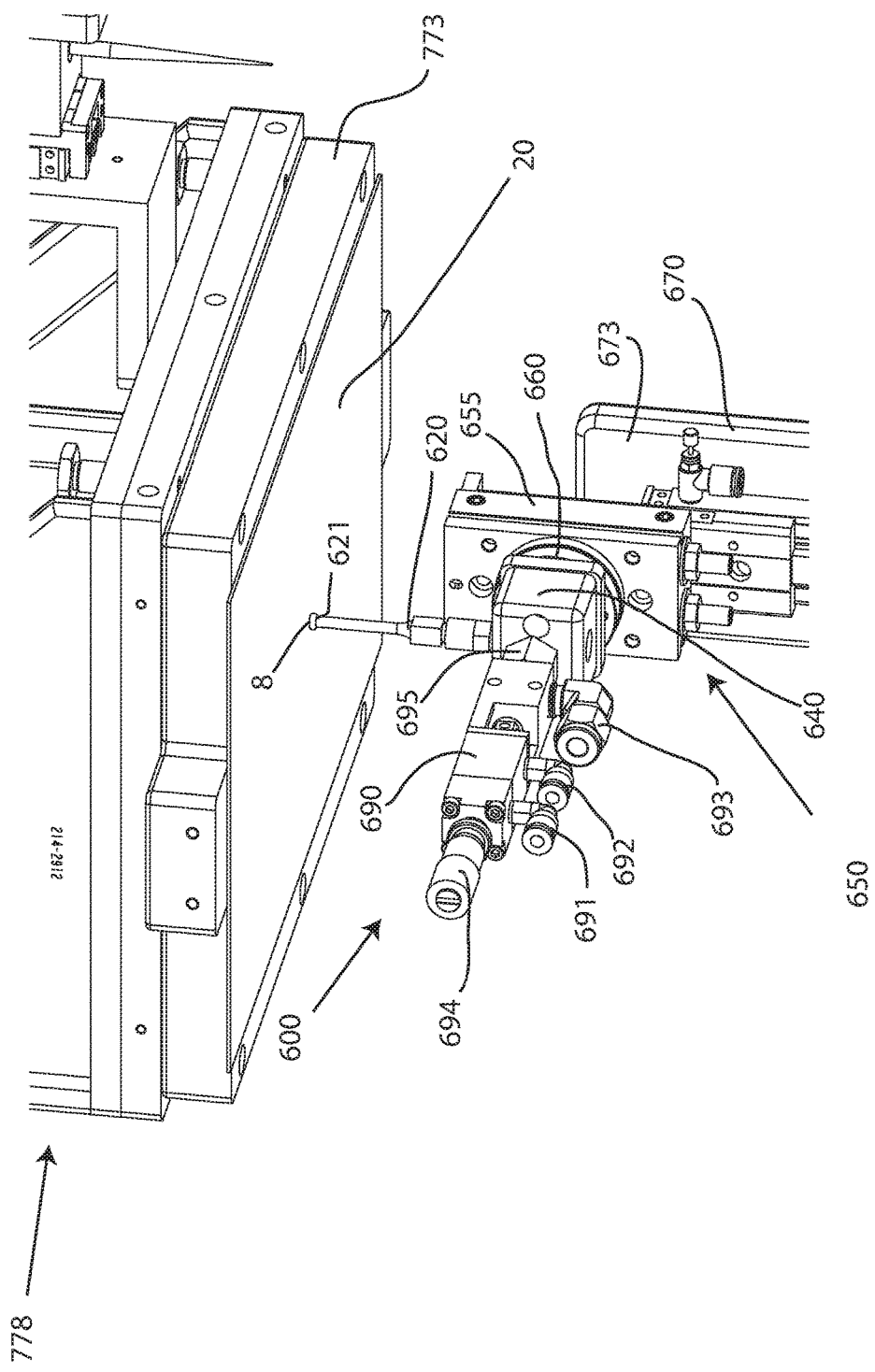
FIG. 28A depicts a perspective view of an embodiments of the end effector proximate an adhesive application valve.
Figure 28B:
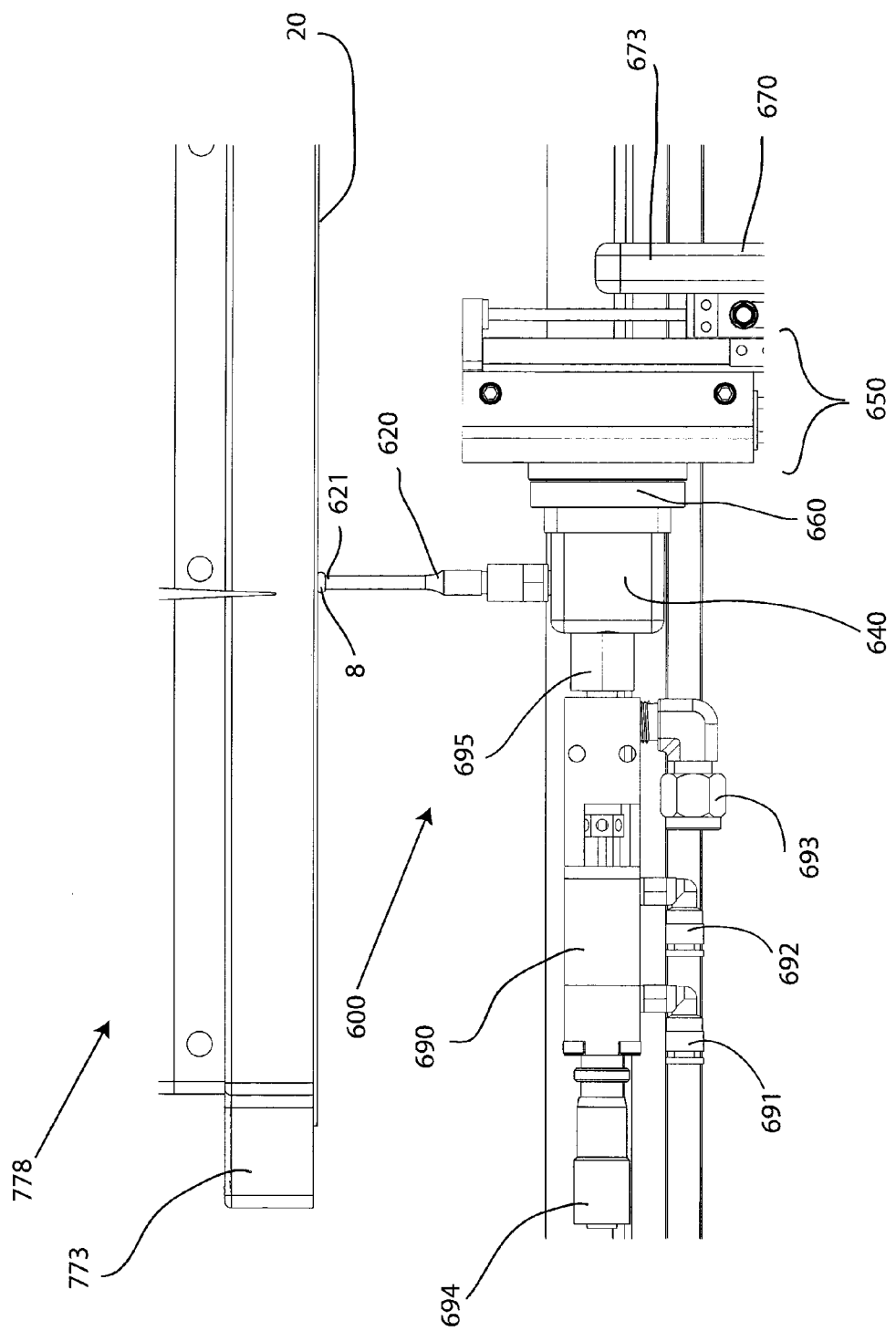
FIG. 28B depicts a front view of an embodiment of the adhesive application valve applying a bead of adhesive to an embodiment of the second substrate.
Figure 28C:
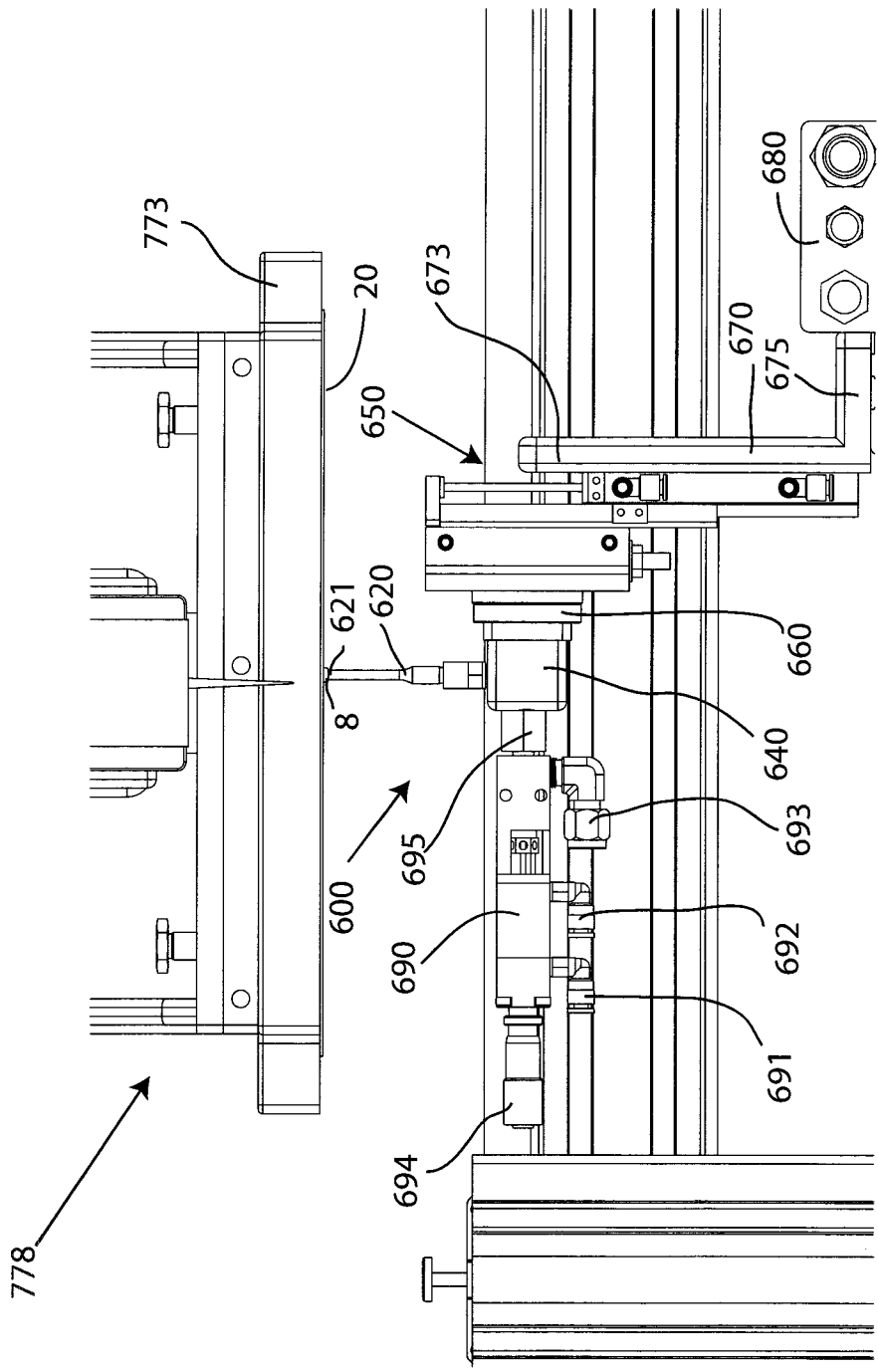
FIG. 28C depicts a front view of an embodiment of the end effector proximate an embodiment of the adhesive application valve.

Referring to FIGS. 28A-28C, the end effector 778 may be configured to pick and place a second substrate 20 into engagement with the adhesive application valve 600. For instance, the end effector 778 may bring the second substrate 20 proximate the adhesive application valve 600 to allow an application of an amount of adhesive onto a surface of the second substrate configured to engage the fill material 5 dispensed on the first substrate 10. The amount of adhesive 8 applied by the adhesive application valve 600 may be a bead of adhesive. Embodiments of the adhesive application valve may apply the bead of adhesive 8 proximate or otherwise near a center or middle portion 23 of the second substrate 20. The end effector 778 may lower or otherwise place the second substrate in a position of engagement with the applicator 620 of the adhesive application valve 600 for application of the adhesive 8. The position of engagement may be a distance from physical contact with the applicator 620 of the adhesive application valve 600, wherein the applicator 620 may automatedly protrude or extend the distance towards the second substrate 20 to apply an amount of adhesive 8 onto the second substrate 20, and then may retract to an original position. Because the adhesive application valve 600 may be moveable along a Z-axis, the location of the second substrate 20, via movement of the end effector 778, may vary with respect to the adhesive application valve 600. For example, the end effector 778 may place the second substrate 20 into a position of engagement with the adhesive application valve 600, which is a distance beyond the reach of the retractable applicator 620, and the Z-axis actuator 650 of the adhesive application valve 600 may be actuated to close the distance sufficient for the retractable applicator 620 to apply the adhesive 8. The adhesive application valve 600 may then apply the adhesive 8 directly (without extension) or through an automated and/or mechanical extension of the applicator 620 from the base portion 640. Furthermore, the angle of the second substrate 20 with respect to the adhesive application valve 600 may vary because the adhesive application valve 600 may tiltable or rotatable about a central axis 605 of the adhesive application valve 600. Because the adhesive application valve 600 is moveable along a Z-axis, and independently tiltable or rotatable about the central axis 605, various movements of the end effector 778 may be programmed according to the size of the second substrate 20, the size of the machine 700, or any other constraints of the machine 700, second substrate 20, or other components within the machine 700. Accordingly, spatial locations of the second substrate 20 in the machine 700 or proximate the machine 700 with respect to the adhesive application valve 600 may be achieved due to the versatility of the adhesive application valve 600. Alternatively, the adhesive application valve 600 may be remain in a fixed position, including the applicator 620 of the adhesive application valve 600, and allow the end effector 778 to advance the second substrate 20 into physical contact with the applicator 620 to apply the adhesive 8.

Figure 26A:
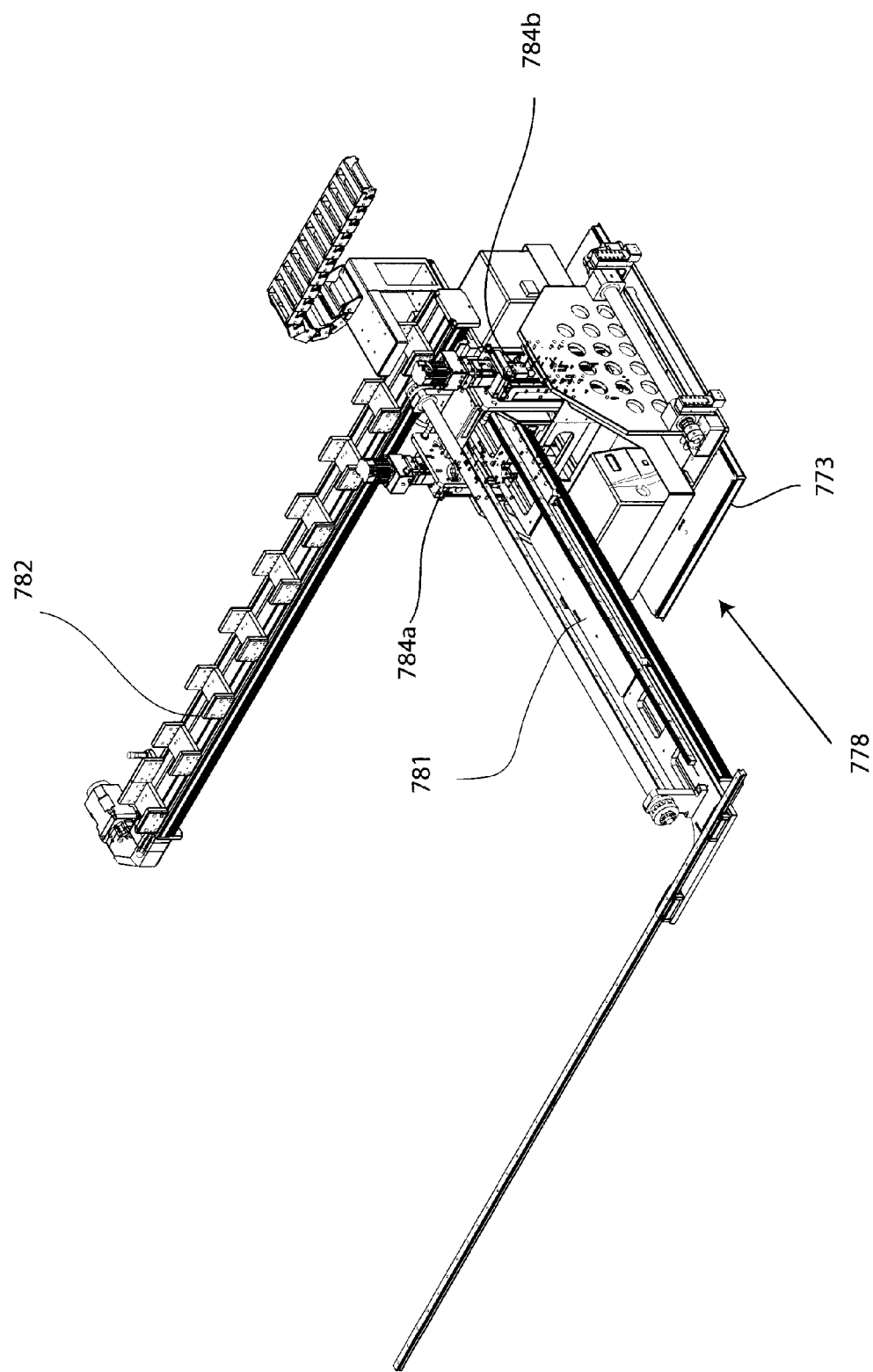
FIG. 26A depicts a perspective view of an embodiment of an end effector.
Figure 26B:
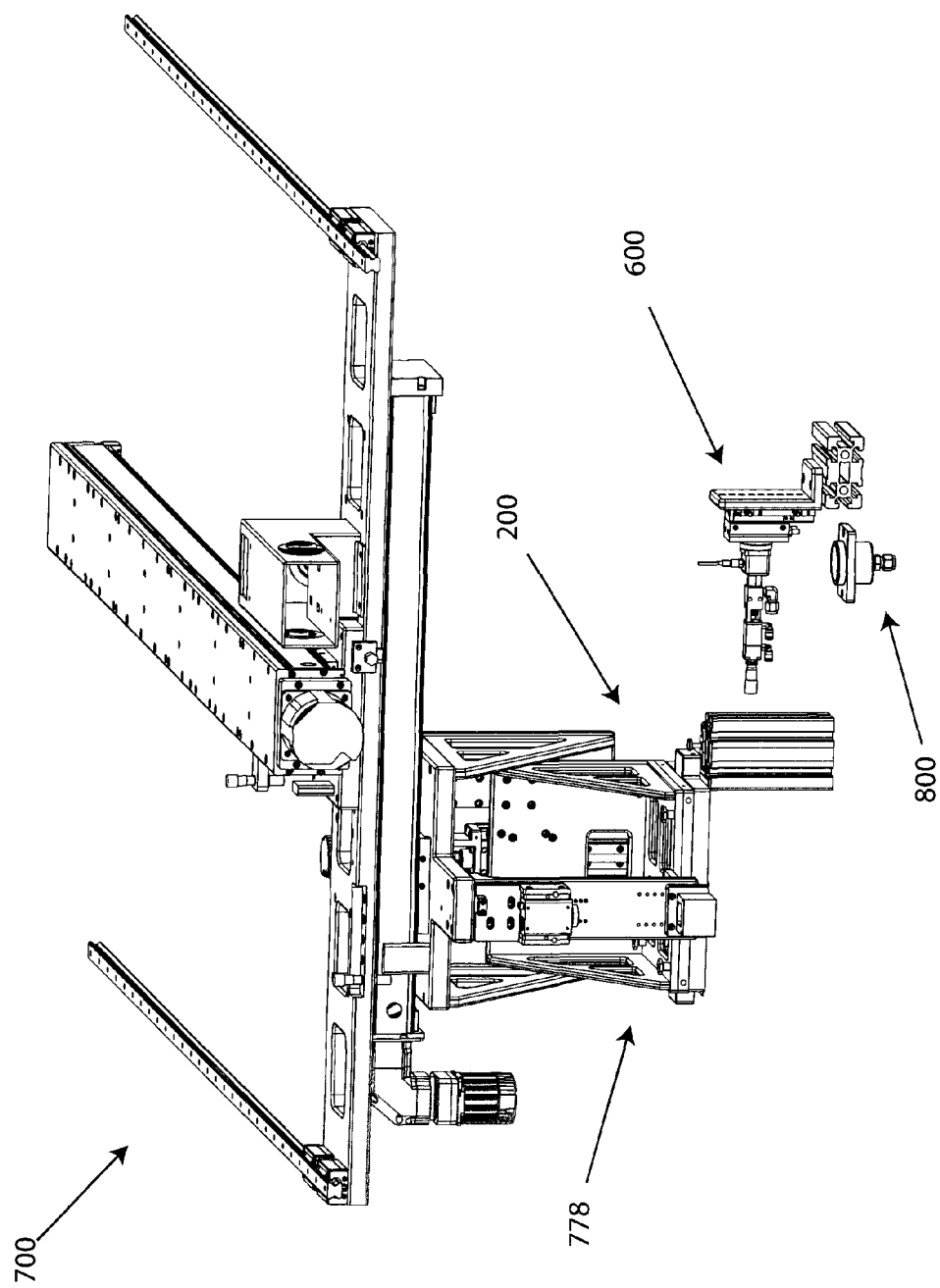
FIG. 26B depicts a perspective view of an embodiment of the end effector, an embodiment of the adhesive application valve, and an embodiment of the adhesive collecting device in the machine with the frame and other components removed for convenience.

Referring to FIG. 26B, with additional reference to FIG. 29, embodiments of machine 700 may further include an adhesive collecting device 800 proximate the adhesive application valve 600. Embodiments of the adhesive collecting device 800 may be placed underneath or approximately underneath the adhesive application valve 600, or in a position to collect dripping or excess adhesive 8 that may have fallen off of the second substrate 20 during application of the adhesive 8. Moreover, the adhesive application valve 600 may be tilted or rotated, after application of the adhesive 8 to the second substrate 20, until the applicator 620 may engage and/or enter the adhesive collecting device 800 to remove excess adhesive 8 from a tip of the applicator 620. Embodiments of the adhesive collecting device 800 may include a basin 830, a mounting plate 820, and a coupling element 840. Embodiments of the basin 830 may include an opening 810 through which the applicator 620, or tip of the applicator 620, may enter and dispose of the excess adhesive 8, or falling adhesive 8 may be collected. The basin 830 may be a cup, tub, container, and the like, and may include an opening at the bottom of the basin 830 to empty or displace the collected adhesive 8. Embodiments of the mounting plate 820 may be mounted to the frame 780 of the machine 700, and may secure the basin 830 in place. Embodiments of the coupling element 840 may be connected to a line, and positioned underneath the basin 830 to displace the collected adhesive 8 to another location through the line; the line may be in communication with the basin 830 via an opening on the bottom of the basin 830.

Figure 27A:
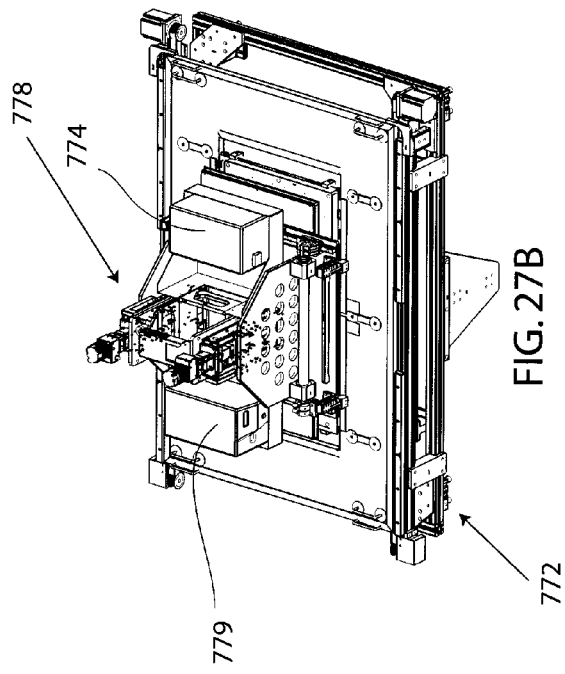
FIG. 27A depicts a top view of an embodiment of the end effector a distance above an underside assembly.
Figure 27B:
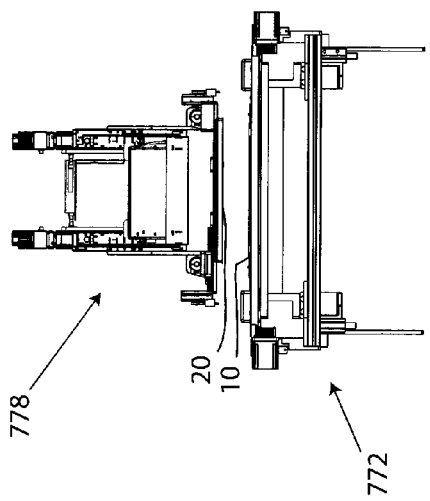
FIG. 27B depicts a perspective view of an embodiment of the end effector a distance above an underside assembly.
Figure 27C:
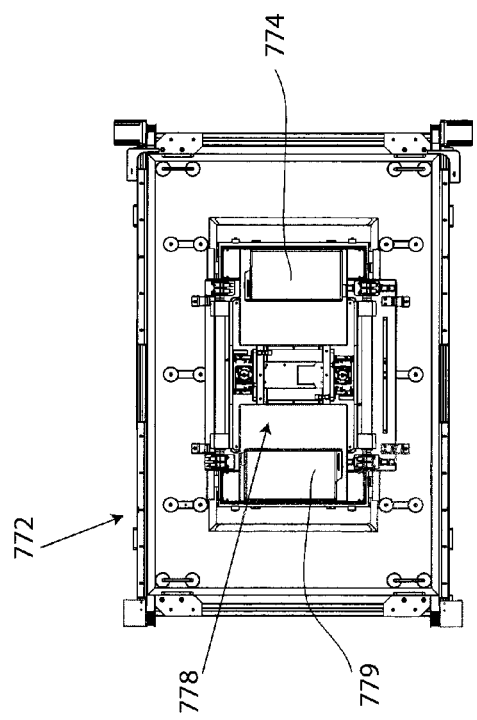
FIG. 27C depicts a front view of an embodiment of the end effector a distance above an underside assembly.
Figure 27D:
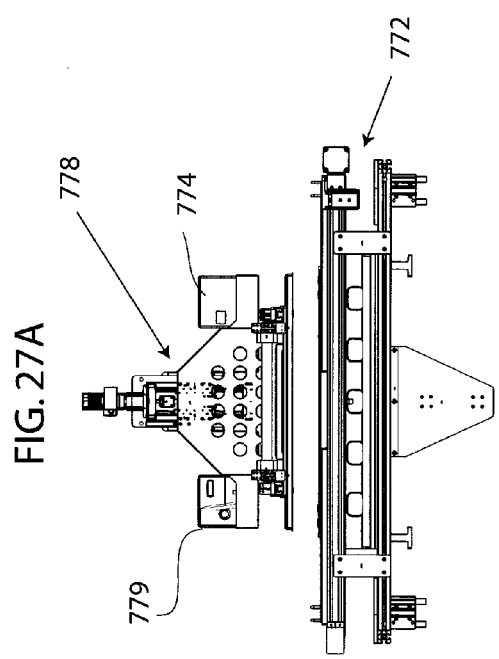
FIG. 27D depicts a side view of an embodiment of the end effector a distance above an underside assembly.
Figure 31:
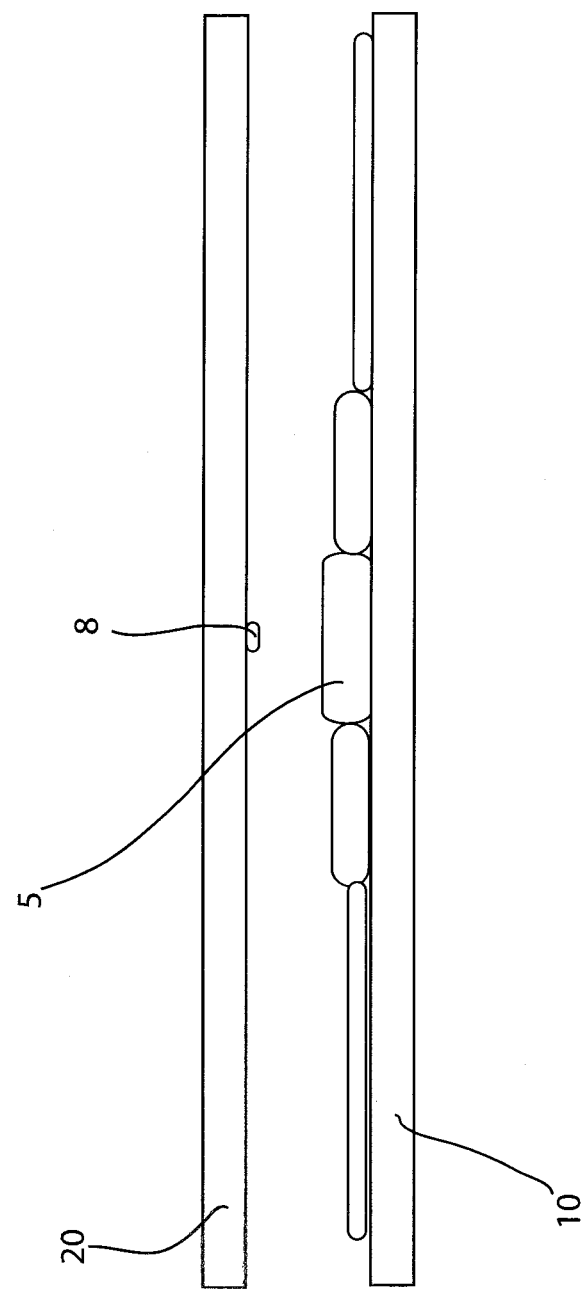
FIG. 31 depicts a side view of an embodiment of a top substrate having an amount of adhesive applied thereto, and an embodiment of a bottom substrate having fill material dispensed on it according to a fill pattern.
Figure 32:
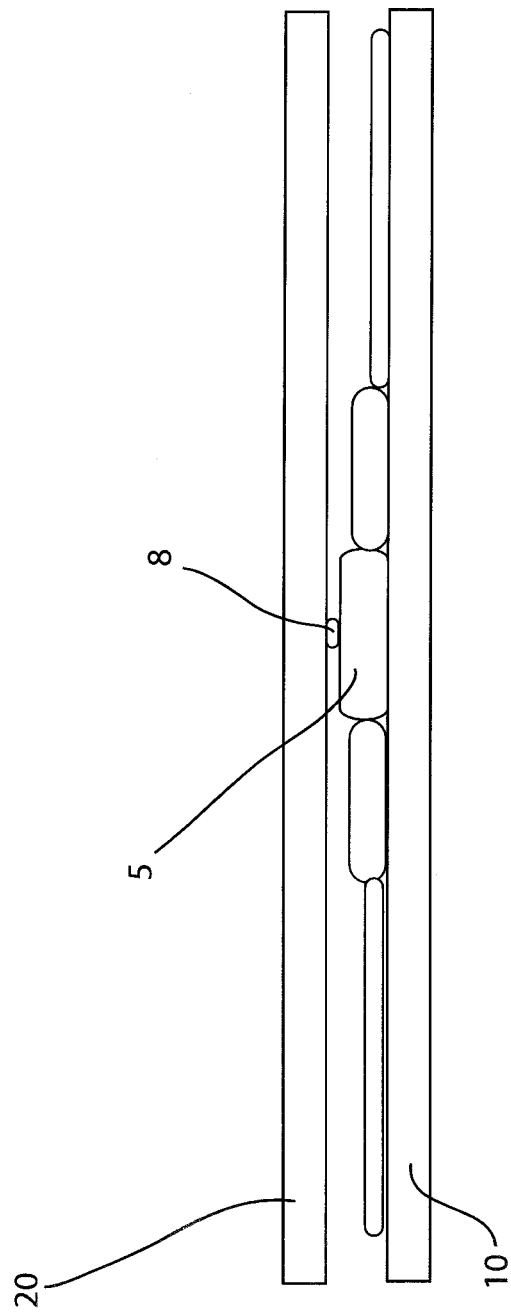
FIG. 32 depicts a side view of an embodiment of the adhesive applied to an embodiment of the top substrate contacting the fill material dispensed on an embodiment of the second substrate.

Referring back to FIGS. 27A-27D, and FIGS. 31-32, after an amount of adhesive 8 has been applied, dispensed, placed, etc., onto the second substrate 20, the end effector 778 may move, place, carry, etc., the second substrate 20 into a position within machine 700 to controllably lower the second substrate 20 onto the first substrate 10. As shown in FIG. 27D, the end effector 778 may be configured to place a second substrate 20 onto the first substrate 10 at a placement angle, Ø, and controllably lower the second substrate 20 onto the first substrate 10, facilitating initial contact between the adhesive 8 applied to the second substrate 20 and a fill material 5 applied to the first substrate 10. In other words, the end effector 778 may be configured to controllably lower the second substrate 20, or controllable descend from the position shown in FIG. 27D and FIG. 31, such that initial contact can be made between the amount of adhesive 8 applied on the second substrate 20 and the fill material 5 prior to engagement between a surface of the second substrate 20 and the fill material 5 on the first substrate 10, as shown in FIG. 32. The placement angle, Ø, may be 0°, approximately 0°, 180°, approximately 180°, such that the first and second substrates 10, 20 are parallel or substantially parallel with respect to each other.

With further reference to FIGS. 27A-27D, an embodiment of an end effector 778, such as robotic placement machine 200, is positioned a distance above an underside assembly 772. In this position, the end effector 778 has picked the second substrate 20 and has moved into position proximate the first substrate 10, which may be secured to a vacuum plate. Through simultaneous actuation of at least two independent Z axis actuators 784a, 784b, the end effector 778 may move up and down along a Z axis to descend towards the first substrate 10 (or ascend away from the first substrate 10) to position the adhesive 8 into contact with the fill material 5. Once the adhesive 8 on the second substrate 20 has initially engaged the fill material 5 on the first substrate 10, the end effector 778 may further controllably lower the second substrate 20 onto the first substrate 10 into a bonding engagement, as shown in FIGS. 30A-30D. For instance, from the initial point of contact, the second substrate 20 may be lowered at a calculated speed/velocity. Controllably lowering the second substrate 20 onto the first substrate 10 may be gradual or proportional as the second substrate 20 is placed onto the first substrate 10. In other embodiments, controllably lowering the second substrate 20 onto the first substrate 10 may mean that the speed of placement may vary according to requirements/specifications of the substrates 10, 20 and/or fill material 5 and adhesive 8 being used. For example, as the distance between the second substrate 20 and the first substrate 10 decreases and nears initial contact, the lowering of the second substrate 20 may be controllably slowed to allow proper contact between the adhesive 8 and the fill material 5, and to control flow of fill material 5 between the substrates 10, 20. Generally, the speed of placement can be slow to avoid disrupting the fill material 5 and inviting air bubbles to form between the substrates 10, 20 during the bonding process; the acceleration and deceleration rates may be variable, and custom to the specific project(s) requirement. Alternatively, controllably lowering the second substrate 20 onto the first substrate 10 may include a controlled descent of the end effector 778 while the second substrate 20 is operably attached to the third end effector 778 at an angle parallel to the first substrate 10, until the second substrate 20 is bonded to the first substrate 10.

Figure 33:
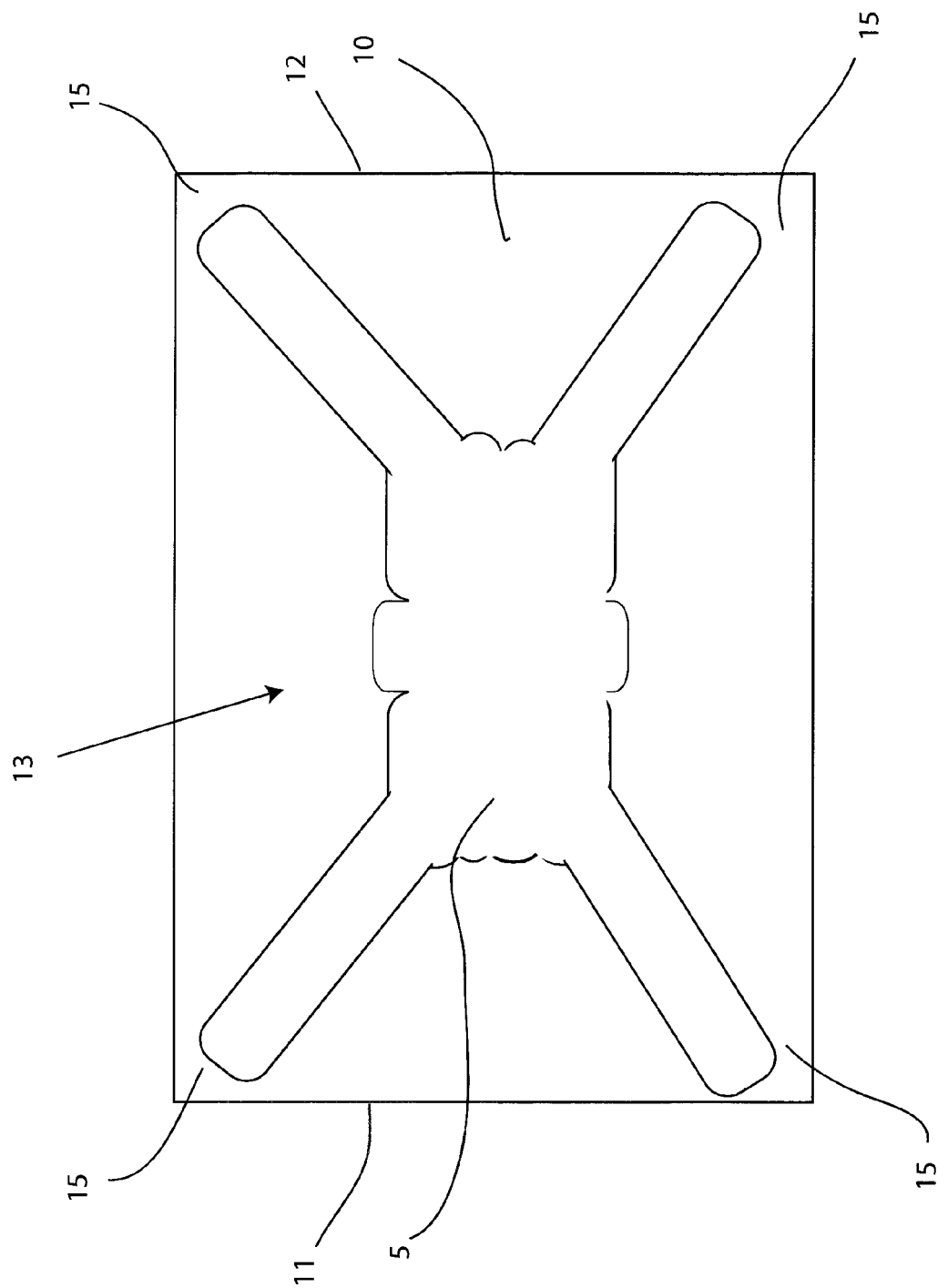
FIG. 33 depicts a top view of another embodiment of the first substrate after fill material has been dispensed across its surface according to an embodiment of a fill pattern.
Figure 34:
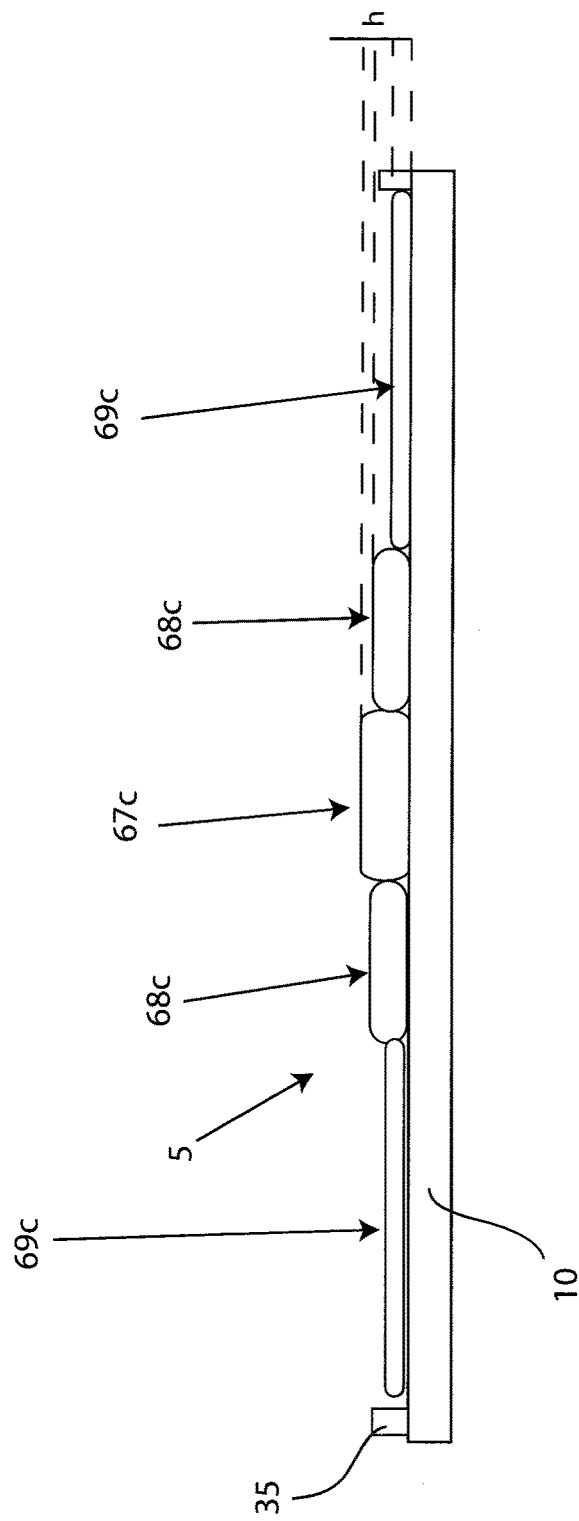
FIG. 34 depicts a cross-section view of another embodiment of the first substrate after fill material has been dispensed across its surface.

Referring now to FIGS. 33-34 an additional fill pattern may be performed by the movement of the second end effector 58 of the second machine 50, which may be operably connected to machine 700 or alternatively to the third machine 70. The second end effector 58, following an additional fill pattern across the first substrate 10, may dispense fill material 5 across a fill area of the first substrate 10. The fill pattern of the fill material 5 may start proximate the center or middle portion 13 of the first substrate 10, and may extend towards the corners 15 of the first substrate 10, as shown in FIG. 31. The fill material 5 dispensed by the custom head 53 may start a distance from the dam 35 proximate or otherwise near the edges of the first substrate proximate the middle portion 13. Generally, the surface of the fill material 5 on the first substrate 10 should not contain waves, divots, or other surface irregularities (i.e. the surface of the fill material 5 may be smooth and continuous). Those having skill in the requisite art should appreciate that the second end effector 58 may follow various patterns and movements to apply the fill material 5. The fill material 5 of the fill pattern, as shown in FIG. 31, may cover a less amount of the surface of the first substrate 10, which can save on material costs and time during operation, compared to the fill pattern shown in FIG. 12. Each pass of the second end effector 58 may dispense fill material 5 across (e.g. side-to-side) the first substrate 10, between the edges of the dam 35 or within a general target area in embodiments where no dam 35 is formed, at a width corresponding to the number of operating valves and type of dispensing valve of the custom head 53. Thus, the custom head 53 may determine the width of fill material 5 being dispensed each pass of the second end effector 58.

Moreover, with continued reference to FIGS. 33-34, the fill material 5 may be dispensed at a certain fill height, h. Fill height, h, may refer to the height of the fill material 5 from the surface of first substrate 10, once dispensed from the custom head 53. The fill height, h, may be controlled by the speed of the second end effector 58 during each pass across the first substrate 10. For example, the slower the second end effector 58 moves as it passes across the first substrate 10, the more fill material 5 may be dispensed at that location. The fill height, h, may also be controlled by the flow rates associated with the custom head 53 (e.g. size of the outlets, types of valves, etc.) and ultimately by the amount of fill material 5 dispensed from the custom head 53. In most embodiments, the fill material 5 is dispensed at a varying or variable fill height, h. In one embodiment, the variable fill height, h, may be a constant height proximate a middle portion 13 of the first substrate 10, wherein the fill height, h, at the middle portion 13 is largest, while the fill height may be constant proximate the corners of the substrate 10, but lower than the fill height at the middle portion 13. The dispensed fill material 5 may have a largest fill height, h, proximate or otherwise near middle portion 13 of the first substrate 10 and a lowest fill height, h, proximate or otherwise near the corners 15 of the first substrate 10. Embodiments of the varying fill height, h, may require the second end effector 58 to make a first set of passes across the first substrate 10 at a consistent or gradually increasing first fill speed, then a second set of passes across the first substrate 10 at a consistent or gradually increasing second fill speed, and a third set of passes across the first substrate 10 at a consistent or gradually increasing third fill speed, wherein the first set of passes begins/occurs proximate or otherwise near middle portion 13, the second set of passes occurs proximate or next to on either side of the fill material 5 dispensed at the middle portion 13, the third set of passes occurs as the end effector 58 moves from the middle portion 13 to the corners 15 of the first substrate 10, as shown in FIG. 31. The third set of passes, moving from the middle portion 13 towards the corners 15 of the first substrate 10 avoids covering large portions of the substrate while still dispensing enough fill material 5 at proper areas of the first substrate 10 to achieve a capillary, wave-like effect of the fill material when optically bonded to the second substrate 20. Further embodiments of the varying fill height, h, may include a plurality of fill zones 67c, 68c, 69c, as shown in FIG. 33. A fill zone 67c, 68c, 69c may refer to a portion of the target fill area having a certain fill height, h, of fill material 5 depending on the fill rate of the custom head 53. Although only three different types of fill zones 67c, 68c, 69c are shown, those skilled in the art should appreciate that there may be more or less than three types of fill zones 67c, 68c, 69c. Fill zone 67c can be the fill zone closest to the middle portion 13. Fill zone 68c can be the fill zone next to or side-by-side with fill zone 67c. Fill zone 69c can be the fill zone extending from fill zone 68c to the corners 15. The fill zone 67c should have a fill height, h, greater than the fill height, h, of fill zone 68c and fill zone 69c, and fill zone 68c may have a greater fill height, h, than fill zone 69c. Accordingly, a fill zone proximate or otherwise near the middle portion 13 of the first substrate 10, such as fill zone 67c, should have the greatest fill height, h. Those in the art should appreciate that first, second, and third set of passes by the end effector 58 do not necessarily have to be in any particular order, for example, the third set of passes may be associated with fill zone 67c, while the first set of passes may be associated with fill zone 69c, or vice versa.

Figure 35:
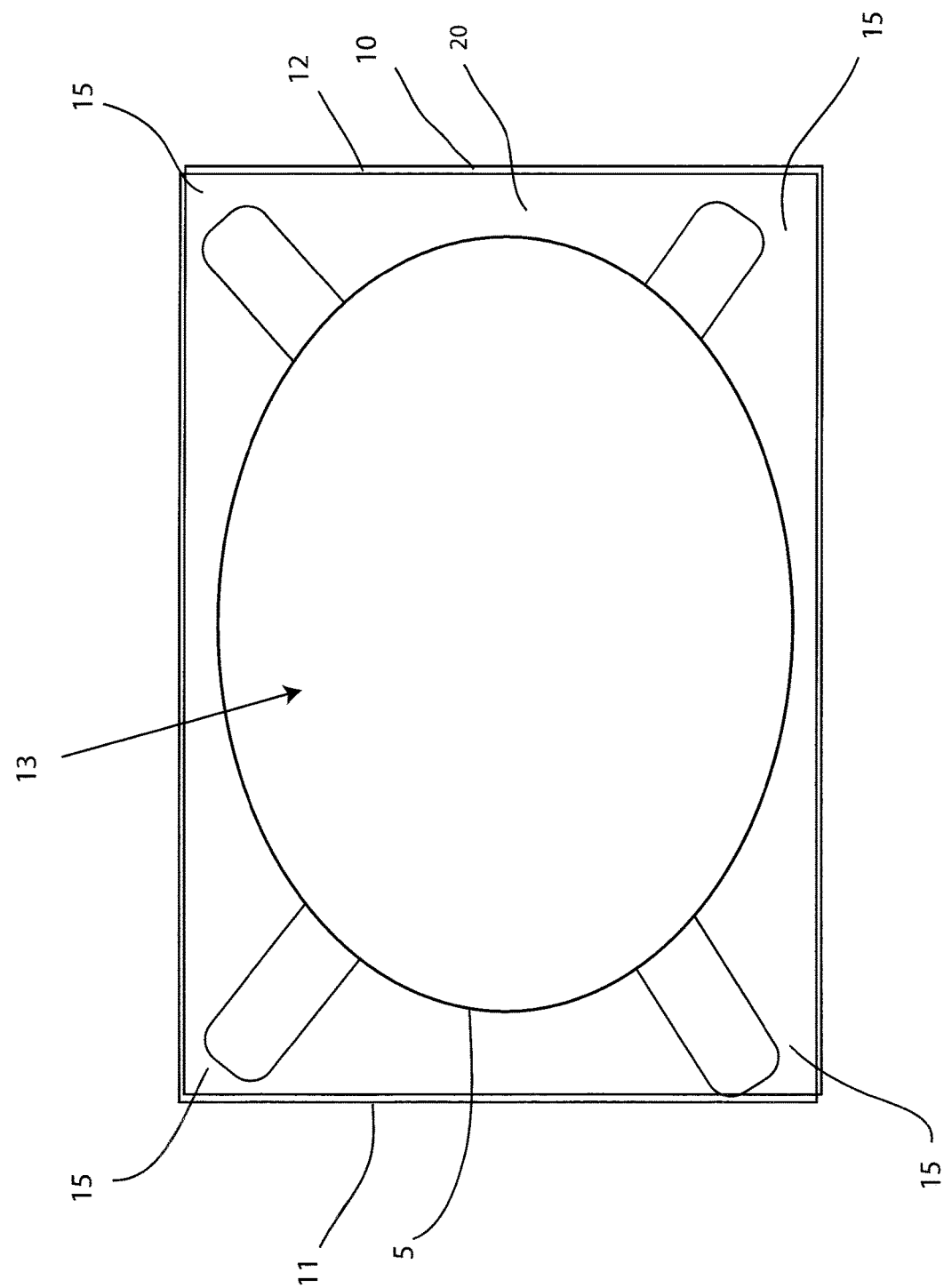
FIG. 35 depicts a top view of an embodiment of a capillary effect of the fill material between the first substrate and the second substrate when during bonding.

Referring back to FIGS. 27A-27D and 30A-30D, controllably lowering the second substrate 20 onto the first substrate 10 may force the fill material 5 to create a capillary or wave effect as it flows across the surface of the first substrate 10 and/or second substrate 20, as shown in FIG. 35. Because the fill material 5 first contacts an amount of adhesive 8 applied to the second substrate 20 air bubbles, formations, pockets, etc., may be prevented or eliminated. Contact between the adhesive 8 and the fill material 5 may be ensured because the largest fill height, h, may be proximate the middle portion 13 of the first substrate 10, while the adhesive 8 has been applied proximate the middle portion 23 of the second substrate 20. Thus, the fill height, h, proximate the middle portion 13 of the first substrate 10 may equal the height necessary to make immediate contact with the adhesive 8 applied on the second substrate 20 as the end effector 778 places the second substrate 20 into a bonding engagement. As the second substrate 20 is controllably lowered onto the first substrate 10, the fill material 5 may immediately begin flowing outwards towards the front edge 11 and rear edge 12, and corners 15, of the first substrate 10. The varying fill height (or declining fill height, h, from the middle portion 13 to the front edge 11 or corners 15 in one direction and to the rear edge 12 in an opposite direction), h, across the surface of the first substrate 10 may allow the smooth, wavelike flow of the fill material 5, and may avoid overflow over the dam or fill material 5 passing through the vents 36 in unnecessary excess. Accordingly, the capillary effect, or wavelike flow, of the fill material 5 may prevent and eliminate the formation of air pockets during the bonding process, regardless of the size of the substrates 10, 20, as shown in FIG. 33. The end effector 778 may controllably lower the second substrate 20 onto the first substrate 10 until the first and second substrates 10, 20 are bonded, as shown in FIGS. 30A-30D.

Further embodiments of machine 700 of system 1000 may include a vision correction system 779 coupled to the end effector 778 and a heating system. The vision correction system 779 may be a camera or other suitable vision system capable of detecting the orientation, location, position, etc. of parts, such as the first substrate 10 and the second substrate 20, within machine 700. Embodiments of the vision correction system 779 may correctly and precisely align both the top substrate 20 and the bottom substrate 10 prior to optically bonding the substrates 10, 20. Moreover, the heating system may include a heated valve(s) or other device for applying heat to the first and second substrates 10, 20.

Figure 29A:
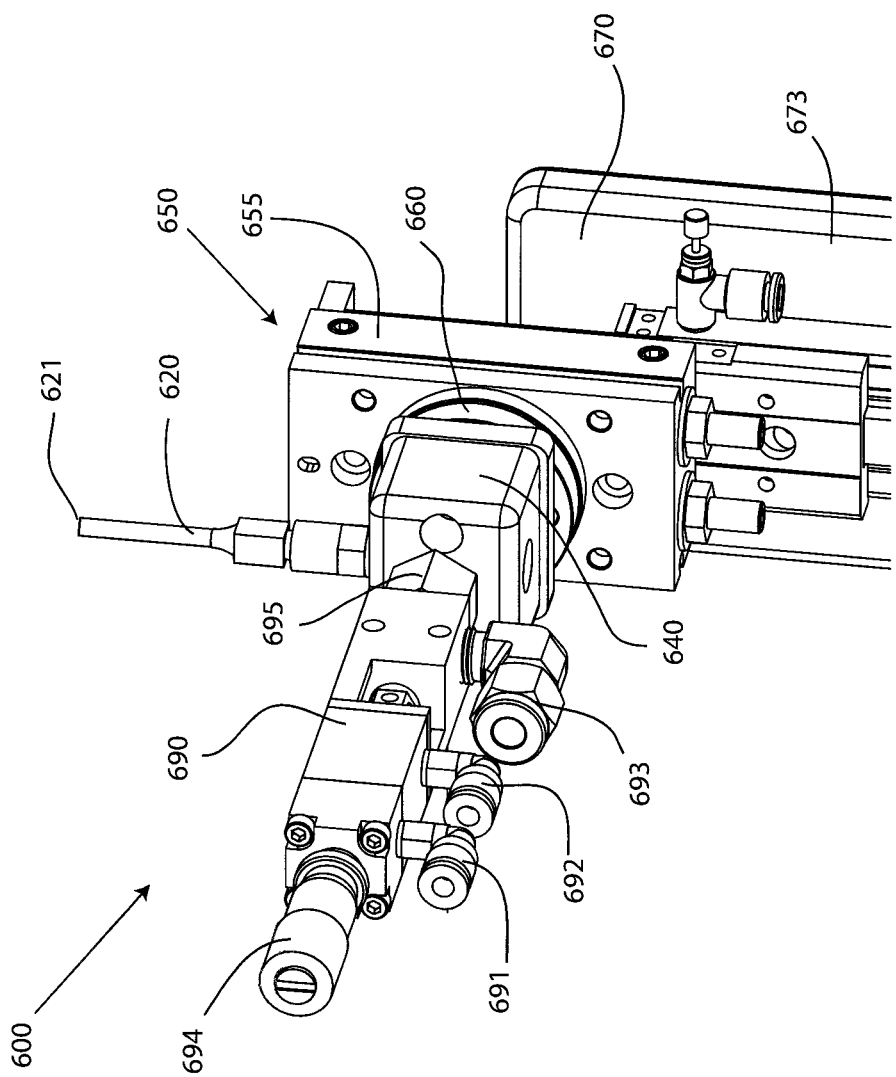
FIG. 29A depicts a perspective view of an embodiment of an adhesive application valve, wherein an embodiment of the a Z-axis actuator is actuated.
Figure 29B:
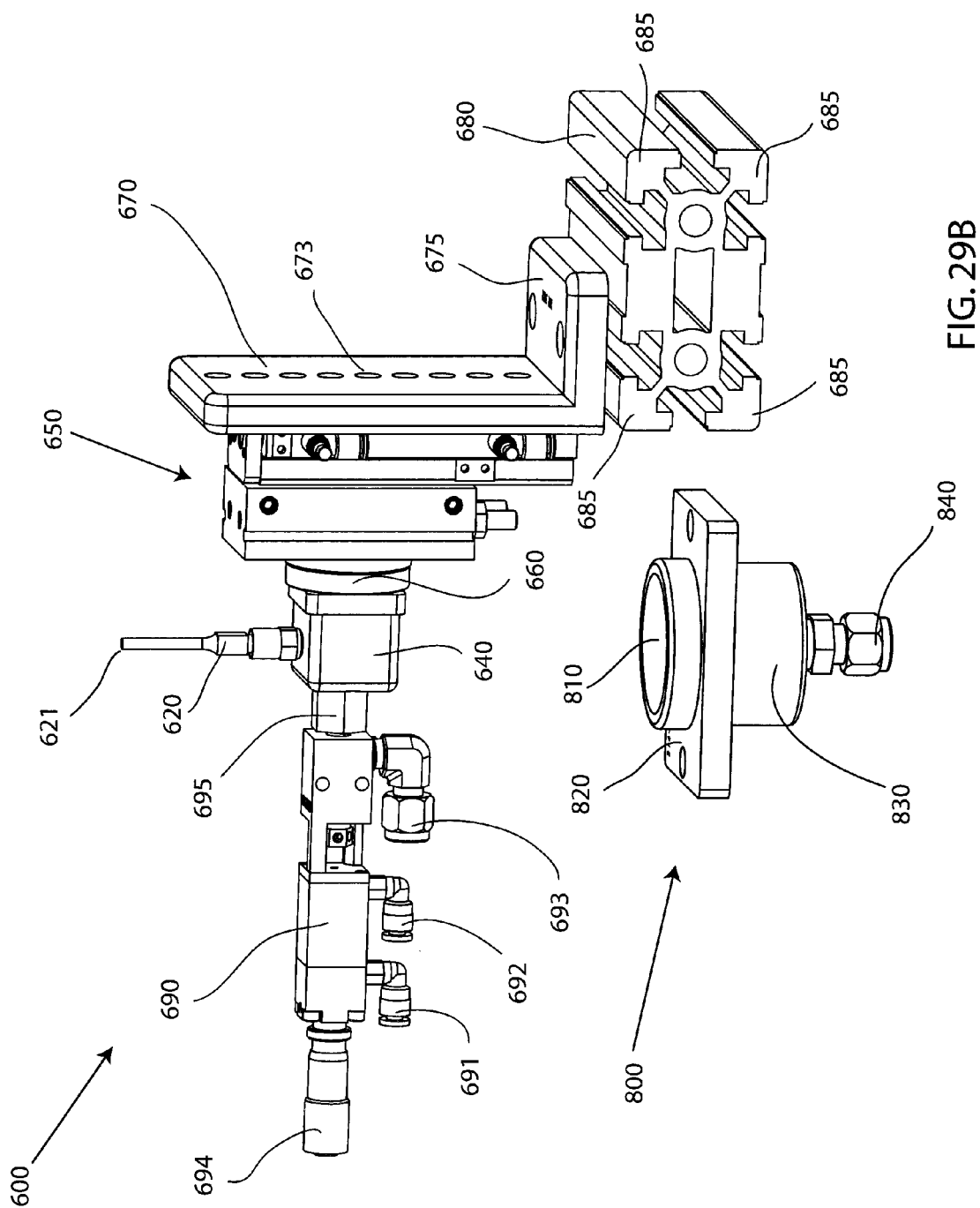
FIG. 29B depicts a side view of an embodiment of an adhesive application valve and an embodiment of an adhesive collecting device.

FIGS. 29A and 29B depicts an embodiment of an adhesive application valve 600. Embodiments of the adhesive application valve 600 may be a valve, dispenser, applicator, or comparable device that is configured to apply, dispose, introduce, provide, dispense, place, smear, etc., an amount of adhesive to a substrate. Adhesive, such as adhesive 8, may be an optically clear adhesive, such as DuPont® Vertak family of adhesives, or any clear adhesive that may quickly cure under UV and/or efficiently adheres a glass substrates, such as LCD display, and similar surfaces.

Generally, adhesive application valve 600 is used for optical bonding and similar glass lamination methods and systems. The adhesive application valve 600 may be configured to perform automated tasks with accuracy, precision, and repeatability. Embodiments of the adhesive application valve 600 may be disposed within machine 700, proximate machine 700, and/or proximate the end effector 778. Embodiments of the adhesive application valve 600 may include a mounting device 680, a mounting plate 670, a Z-axis actuator 650, a rotation device 660, a base portion 640, an applicator 620, and an extension 690. Embodiments of the adhesive application valve 600 may include a base portion 640 operably connected to a rotation device 660, an applicator 620 operably connected to the base portion 640, and a Z-axis actuator 650 operably connected to the rotation device 660, wherein the Z-axis actuator 650 and the rotation device 660 are each capable of moving independently of each other to position the applicator 620 in a position to apply an amount of adhesive 8 to a top substrate 20 prior to bonding with a bottom substrate 10. Moreover, embodiments of the adhesive application valve 600 may be comprised of a metal, such as stainless steel, or a combination of metal and composite materials, plastics, etc.

Embodiments of the mounting device 680 may be mounted to a frame of a machine, such as frame 780 of machine 700. The mounting device 680 may secure the adhesive application valve 600 to the frame 780 of machine 700, or to any other machine or frame that requires the use of the adhesive application valve 600. The mounting device 680 may include one or more rails 685 and one or more opening 683 for mounting to the frame 780 and for mounting/fastening the mounting plate 670 to the mounting device 680. Moreover, the mounting device 680 may be formed of a metal or rigidly formed plastic or composite for fixed securement to the frame 780. Embodiments of the mounting plate 670 may be any component(s), rigid or otherwise, that may be used to connect, secure, attach, etc., the Z-axis actuator 650 to the mounting device 680. Embodiments of the mounting plate 670 may be L-shaped, defined by a horizontal bottom plate 675 and a vertical plate 673 connected thereto. For instance, the horizontal bottom plate 675 may be configured to be fastened, secured, mounted to the mounting device 680, while the vertical plate 673 may be configured to be fastened, secured, mounted to the Z-axis actuator 650.

Embodiments of the Z axis actuator 650 may be coupled to the mounting plate 670. Embodiments of the Z-axis actuator 650 may be a ball screw slide, linear motion slide, a linear actuator, and the like. Embodiments of the Z-axis actuator 650 may include an attachment portion 655 which may be coupled to a rotation device 660. The Z-axis actuator 650 may be capable of up and down movement along a Z-axis, thus allowing up and down movement of the applicator 620 along a Z-axis during operation. In other words, through actuation of the Z-axis actuator 650, the applicator 620 may be raised or lowered into a position of engagement with the second substrate 20 to apply an amount of adhesive 8 during operation. Thus, the Z-axis actuator 650 can be operably connected to the applicator 620; vertical movement of the Z-axis actuator 650 may translate into vertical movement of the applicator 620.

In addition to movement up and down along a Z-axis, the adhesive application valve 600 may include a rotation device 660 configured to rotate or tilt the adhesive application valve 600, in particular, the applicator 620, the base portion 640, and the extension 690. The rotation device 600 may provide/allow for rotation or tilt to achieve a more efficient or more effective position of engagement between the second substrate 20 and the applicator 620, and/or more provide/allow for rotation to facilitate cooperation between the adhesive collecting device 800 and the applicator 620. Embodiments of the rotation device 660 may facilitate tilting and/or rotating action through use of a bearing system, or any similar or comparable mechanical or electromechanical device. Thus, the rotation device 660 may be operably connected to the applicator 620; rotation of the rotation device 660 may translate into rotation or tilting of the applicator 620.

Embodiments of the adhesive application valve 600 may further include a base portion 640, wherein the base portion 640 may be operably connected to at least one of the rotation device 660 and the Z-axis actuator 650. The applicator 620 may be coupled to the base portion 640 to enhance stability and damage resistance to the components. Embodiments of the applicator 620 may be a valve, an applicator, a dispensing valve, and the like, that may apply, dispense, etc. adhesive 8 to a substrate. For instance, the adhesive 8 may flow through the extension 690 and up through the applicator 620 to apply a bead of adhesive 8 onto the second substrate 20. The applicator 620 may include a tip 621, which can directly contact the second substrate 20 to apply the bead of adhesive 8. Furthermore, the applicator 620 may be retractable. For example, when the end effector 778 places the second, or top, substrate 20 into a position of engagement with the adhesive application valve 600, the applicator 620 may extend or protrude a distance toward the second substrate 20 to apply a bead of adhesive 8, and then may retract back to its original position. The applicator 620 may include an inner opening that can be in communication with an inner opening in the base portion 640 and the extension 690, which is ultimately in communication with a source of adhesive 8. The inner openings of the applicator 620, the base portion 640, and the extension 690 may be a flow path of the adhesive 8 from an adhesive source (not shown) to the tip 621 of the applicator 620. The inner openings, or the surfaces of the inner openings defining a flow path may be coated in a material that prevents or hinders adhesion of the adhesive to the surfaces of the inner openings, such as linear polyoxymethylene acetal resin, polyetherimide, and polytetrafluoroethylene; however, the adhesive 8, especially in liquid form, tends to not adhere in an adverse way to a stainless steel construction embodiment of the adhesive application valve 600, in particular the inner surfaces of the adhesive application valve 600, and no coating may be needed. Furthermore, embodiments of the adhesive application valve 600 may include an extension coupled to the base portion 640. The extension 690 may include a plurality of coupling members 691, 692, 693, 694, and 695. The coupling member 691, 692, and 693 may be coupled to various lines. Coupling members 691, 692, 692, 694 may be a coupled to a line that communicated with a source of adhesive. The various lines attached to the coupling members 691, 692, 693, 694 may be somewhat flexible and/or bendable to accommodate for the versatile movement of the adhesive application valve 600, and may also be coated with linear polyoxymethylene acetal resin, polyetherimide, and/or polytetrafluoroethylene. Coupling member 695 may couple the extension 690 to the base portion 640 and the applicator 620. Embodiments of the coupling members 691, 692, 693, 694, 695 may be fluid couplings or similar coupling element that is resistant to leaks and adhesion of the adhesive. Furthermore, having a plurality of coupling members 691, 692, 693, 694 can allow multiple different adhesives, or multiples sources of the same adhesive to accommodate various applications and project requirements.

Referring now to FIGS. 1-35, a third method of optical bonding is now described. Embodiments of the third method of optical bonding may include the steps of dispensing a fill material 5 across a surface of a first substrate 10 to achieve a largest fill height, h, proximate a center portion 13 of the first substrate 10 and a lowest fill height, h, proximate one or more corners 15 of the first substrate 10, placing a second substrate 20 into contact with the fill material 5 proximate the center portion 13 of the first substrate 10, and controllably lowering the second substrate 20 onto the first substrate 10 until the second substrate 20 is bonded to the first substrate 10 to prevent and eliminate air bubbles between the first substrate 10 and second substrate 20. Embodiments of the third method of optical bonding may be used in association with system 100 or with system 1000.

Referring now to FIGS. 1-35, a fourth method of optical bonding is now described. Embodiments of the fourth method of optical bonding may include the steps of dispensing a fill material 5 across a surface of the first substrate 10, applying an amount of adhesive 8 on a surface of a second substrate 20 configured to engage the fill material 5 on the surface of the first substrate 10, and contacting the adhesive 8 on the second substrate 20 with the fill material 5 on the first substrate 10 to optically bond the first substrate 10 and the second substrate 20. In embodiments of the fourth method of optical bonding, the adhesive 8 of the second substrate 20 can contact the fill material 5 of the first substrate 10 prior to contact between the first substrate 10 and the second substrate 20. Moreover, the step of dispensing the fill material 5 on the surface of the first substrate 10 can achieve a largest fill height proximate a center portion 13 of the first substrate 10, and a lower fill height proximate the corners 15 of the first substrate 10. Embodiments of the step of contacting may include controllably lowering, by an end effector 778 or robotic placement machine 200, the second substrate 20 onto the first substrate 10 to facilitate an initial engagement of the adhesive 8 and the fill material 5 to prevent and eliminate air bubbles between the first and second substrates 10, 20 when in a final, bonding engagement.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An optical bonding machine comprising:
   a robotic placement machine configured to attach to a gantry robot system having a Y-axis actuator for moving left and right along an Y-axis and a X-axis actuator for moving back and forth along an X-axis, the robotic placement machine comprising a base operably connectable to at least one of the Y-axis actuator and the X-axis actuator, the base having a first end and a second end, a first Z axis actuator coupled to the first end of the base, the first Z axis actuator capable of moving up and down a first Z axis, a second Z axis actuator coupled to the second end of the base, the second Z axis actuator capable of moving up and down a second Z axis, and a pick and place plate operably connected to the first Z axis actuator and the second Z axis actuator, wherein the first Z axis actuator and the second Z axis actuator are each capable of moving independently of each other to tilt the pick and place plate; and
   a moveable adhesive application valve configured to apply an amount of adhesive onto an underside of the top substrate, the underside of the top substrate facing down, wherein the moveable adhesive application valve is in a vertical orientation when applying the amount of adhesive to the underside of the top substrate;

wherein the pick-and-place plate of the robotic placement machine holds the top substrate in a position of engagement with the adhesive application valve, and the pick-and-place plate of the robotic placement machine further places the top substrate onto the bottom substrate to facilitate initial contact between the adhesive applied to the top substrate and a fill material applied to the bottom substrate;

wherein a movement of the robotic placement machine and the movable adhesive application valve is computer programmable over at least 3 axes.

2. The machine of claim 1, wherein the amount of adhesive applied to the top substrate is a bead of adhesive configured to contact the fill material on the bottom substrate prior to contact between the top substrate and the fill material.

3. The machine of claim 2, wherein initial contact between the adhesive applied to the top substrate and the fill material on the bottom substrate prevents the formation of bubbles between the top substrate and the bottom substrate when the top substrate is controllably lowered onto the bottom substrate.

4. The machine of claim 1, wherein the adhesive application valve is retractable.

5. The machine of claim 1, wherein the machine for optical bonding is a part of a system of optical bonding.

6. The machine of claim 1, further comprising:
an adhesive collecting device proximate the adhesive application valve.

7. The machine of claim 1, further comprising:
a vision correction system, the vision correction system configured to align the top substrate and the bottom substrate.

8. The machine of claim 1, further comprising a height sensor operably coupled to the robotic placement machine, the height sensor configured to locate and align the top substrate and the bottom substrate.

9. The machine of claim 1 wherein controllably lowering the top substrate into bonding engagement with the bottom substrate forces the fill material to create a capillary effect as it flows between the top substrate and the bottom substrate, wherein the capillary effect prevents and eliminates air bubbles between the top substrate and the bottom substrate.

10. The machine of claim 1, further including a UV cure oven, the UV cure oven configured to accept the bonded substrates.

11. The machine of claim 1, wherein the top substrate and the bottom substrates are transparent substrates.

12. The machine of claim 1, wherein the robotic placement machine controllably lowers the top substrate onto the bottom substrate to achieve a placement angle of at least one of 0°, 180°, approximately 0°, and approximately 180° at the initial contact between the adhesive and the fill material.

13. The machine of claim 1, wherein the robotic placement machine is tiltable.

14. The machine of claim 1, wherein the adhesive application valve applies a dot of the adhesive to the top substrate.

15. The machine of claim 1, wherein the adhesive application valve includes a Z-axis actuator to allow for movement up and down.

16. The machine of claim 1, wherein the adhesive application valve is mounted to the optical bonding machine by a mounting device, the Z-axis actuator being coupled to the mounting device.

17. The machine of claim 1, wherein the adhesive application valve includes an applicator, the applicator being retractable.

18. The machine of claim 1, wherein the adhesive application valve moves into the position of engagement from an initial position away from the top substrate.

* * * * *